United States Patent
Kamine et al.

(10) Patent No.: US 12,401,060 B2
(45) Date of Patent: Aug. 26, 2025

(54) NONAQUEOUS SECONDARY BATTERY

(71) Applicant: Asahi Kasei Kabushiki Kaisha, Tokyo (JP)

(72) Inventors: Hirokazu Kamine, Tokyo (JP); Naoki Matsuoka, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 598 days.

(21) Appl. No.: 17/269,630

(22) PCT Filed: Sep. 13, 2019

(86) PCT No.: PCT/JP2019/036216
§ 371 (c)(1),
(2) Date: Feb. 19, 2021

(87) PCT Pub. No.: WO2020/054866
PCT Pub. Date: Mar. 19, 2020

(65) Prior Publication Data
US 2021/0351437 A1    Nov. 11, 2021

(30) Foreign Application Priority Data

Sep. 14, 2018  (JP) .................................. 2018-173040
Sep. 3, 2019   (JP) .................................. 2019-160257
(Continued)

(51) Int. Cl.
H01M 10/0567   (2010.01)
H01M 4/134     (2010.01)
(Continued)

(52) U.S. Cl.
CPC ....... H01M 10/0567 (2013.01); H01M 4/134 (2013.01); H01M 4/382 (2013.01);
(Continued)

(58) Field of Classification Search
CPC ............. H01M 50/489; H01M 50/491; H01M 50/443; H01M 4/143; H01M 4/382; H01M 10/0567
See application file for complete search history.

(56) References Cited

U.S. PATENT DOCUMENTS 11,251,466 B2   2/2022   Park et al.
2006/0115739 A1 6/2006   Yamaguchi et al.
(Continued)

FOREIGN PATENT DOCUMENTS

CN   1979941 A    6/2007
CN   102224621 A  10/2011
(Continued)

OTHER PUBLICATIONS

"Materials for lithium-ion battery safety", Liu et al., Science Advances, 2018:4, Jun. 22, 2018.*
(Continued)

*Primary Examiner* — Kenneth J Douyette
(74) *Attorney, Agent, or Firm* — Morgan, Lewis & Bockius LLP

(57) ABSTRACT

Provided is a nonaqueous secondary battery including: a positive electrode that contains at least one positive electrode active material capable of occluding and releasing lithium ions; a negative electrode that contains a negative electrode active material which is at least one selected from the group consisting of lithium metals and materials capable of occluding and releasing lithium ions; and a nonaqueous electrolytic solution, wherein the negative electrode contains at least one compound selected from the group consisting of compounds represented by general formulas (1)-(3).
(Continued)

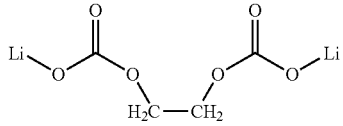

(1)

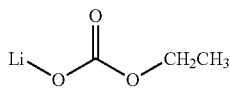

(2)

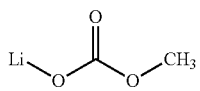

(3)

17 Claims, 1 Drawing Sheet

(30) Foreign Application Priority Data

| Sep. 3, 2019 | (JP) | 2019-160268 |
|---|---|---|
| Sep. 3, 2019 | (JP) | 2019-160441 |
| Sep. 3, 2019 | (JP) | 2019-160445 |
| Sep. 3, 2019 | (JP) | 2019-160613 |

(51) Int. Cl.

| H01M 4/38 | (2006.01) |
|---|---|
| H01M 4/505 | (2010.01) |
| H01M 4/525 | (2010.01) |
| H01M 4/62 | (2006.01) |
| H01M 10/0525 | (2010.01) |
| H01M 10/0568 | (2010.01) |
| H01M 10/0569 | (2010.01) |
| H01M 50/443 | (2021.01) |
| H01M 50/489 | (2021.01) |
| H01M 50/491 | (2021.01) |
| H01M 4/02 | (2006.01) |

(52) U.S. Cl.
CPC .......... *H01M 4/386* (2013.01); *H01M 4/505* (2013.01); *H01M 4/525* (2013.01); *H01M 4/625* (2013.01); *H01M 10/0525* (2013.01); *H01M 10/0568* (2013.01); *H01M 10/0569* (2013.01); *H01M 50/443* (2021.01); *H01M 50/489* (2021.01); *H01M 50/491* (2021.01); *H01M 2004/027* (2013.01); *H01M 2004/028* (2013.01); *H01M 4/623* (2013.01); *H01M 2300/0042* (2013.01)

(56) References Cited

U.S. PATENT DOCUMENTS

| 2006/0222944 | A1* | 10/2006 | Yamamoto | H01M 4/62 |
| | | | | 429/246 |
| 2007/0231705 | A1 | 10/2007 | Ohzuku et al. | |
| 2007/0281217 | A1* | 12/2007 | Ihara | H01M 10/0566 |
| | | | | 429/327 |
| 2009/0029249 | A1* | 1/2009 | Takami | H01M 10/0525 |
| | | | | 429/188 |
| 2009/0202892 | A1* | 8/2009 | Inagaki | H01M 10/0567 |
| | | | | 429/163 |
| 2010/0119956 | A1 | 5/2010 | Tokuda et al. | |
| 2010/0297510 | A1 | 11/2010 | Kim et al. | |
| 2012/0315536 | A1* | 12/2012 | Bhat | C07F 9/1415 |
| | | | | 429/188 |
| 2013/0183576 | A1 | 7/2013 | Suguro et al. | |
| 2013/0224535 | A1 | 8/2013 | Matsuoka et al. | |
| 2014/0255796 | A1 | 9/2014 | Matsuoka et al. | |
| 2015/0048273 | A1 | 2/2015 | Tanaka et al. | |
| 2015/0188141 | A1 | 7/2015 | Yamaguchi | |
| 2015/0270538 | A1* | 9/2015 | Kim | H01M 4/625 |
| | | | | 252/502 |
| 2016/0149263 | A1 | 5/2016 | Hallac et al. | |
| 2016/0204471 | A1 | 7/2016 | Nakamoto et al. | |
| 2016/0248121 | A1 | 8/2016 | Uematsu et al. | |
| 2016/0322669 | A1 | 11/2016 | Sawa et al. | |
| 2017/0012321 | A1 | 1/2017 | Dubois et al. | |
| 2017/0098861 | A1 | 4/2017 | Yamada et al. | |
| 2017/0179483 | A1 | 6/2017 | Kuriyama et al. | |
| 2017/0352920 | A1 | 12/2017 | Kawai et al. | |
| 2018/0062213 | A1 | 3/2018 | Matsuoka et al. | |
| 2018/0183034 | A1 | 6/2018 | Asakawa et al. | |
| 2018/0358612 | A1 | 12/2018 | Seki et al. | |
| 2019/0312310 | A1 | 10/2019 | Abe | |

FOREIGN PATENT DOCUMENTS

| CN | 104584309 A | 4/2015 |
| CN | 103066327 B | 9/2015 |
| CN | 105789687 A | 7/2016 |
| CN | 106415910 A | 2/2017 |
| CN | 106784653 A | 5/2017 |
| CN | 108172823 A | 6/2018 |
| CN | 108365194 A | 8/2018 |
| EP | 2357692 A2 | 8/2011 |
| EP | 2983233 A1 | 2/2016 |
| JP | H11-354104 A | 12/1999 |
| JP | 2001-057238 A | 2/2001 |
| JP | 2003-040885 A | 2/2003 |
| JP | 2003-303588 A | 10/2003 |
| JP | 2003-323915 A | 11/2003 |
| JP | 2004-022174 A | 1/2004 |
| JP | 2004-146104 A | 5/2004 |
| JP | 2007-273405 A | 10/2007 |
| JP | 2010-267509 A | 11/2010 |
| JP | 2012-059410 A | 3/2012 |
| JP | 2013-041756 A | 2/2013 |
| JP | 2013-152824 A | 8/2013 |
| JP | 2013-175410 A | 9/2013 |
| JP | 2015-065049 A | 4/2015 |
| JP | 2015-065050 A | 4/2015 |
| JP | 2015-072805 A | 4/2015 |
| JP | 2015-072858 A | 4/2015 |
| JP | 2016-021289 A | 2/2016 |
| JP | 2016-024968 A | 2/2016 |
| JP | 2016-100065 A | 5/2016 |
| JP | 2016-129106 A | 7/2016 |
| JP | 2016-146238 A | 8/2016 |
| JP | 2017-069146 A | 4/2017 |
| KR | 10-2015-0011013 A | 1/2015 |
| WO | 2012/029653 A1 | 3/2012 |
| WO | 2012/057311 A9 | 5/2012 |
| WO | 2013/062056 A1 | 5/2013 |
| WO | 2013/146714 A1 | 10/2013 |
| WO | 2014/200012 A1 | 12/2014 |
| WO | 2015/098471 A1 | 7/2015 |
| WO | 2015/121997 A1 | 8/2015 |
| WO | 2016/039424 A1 | 3/2016 |
| WO | 2016/063468 A1 | 4/2016 |
| WO | 2017/077986 A1 | 5/2017 |
| WO | 2018/003992 A1 | 1/2018 |
| WO | 2018/116879 A1 | 6/2018 |

OTHER PUBLICATIONS

Supplementary European Search Report issued in related European Patent Application No. 19860377.1 dated Sep. 23, 2021.
International Search Report issued in corresponding International Patent Application No. PCT/JP2019/036216 dated Nov. 26, 2019.
International Preliminary Report on Patentability and Written Opinion issued in corresponding International Patent Application No. PCT/JP2019/036216 dated Mar. 9, 2021.

(56) References Cited

OTHER PUBLICATIONS

Myung et al., "Nickel-Rich Layered Cathode Materials for Automotive Lithium-Ion Batteries: Achievements and Perspectives," ACS Energy Letters, 2: 196-223 (2017).
Noh et al., "Comparision of the structural and electrochemical properties of layered Li[NixCoyMnz]O2 (x = 1/3, 0.5, 0.6, 0.7, 0.8 and 0.085) cathode material for lithium-ion batteries," Journal of Power Sources, 233: 121-130 (2013).
Jung et al., "Chemical versus Electrochemical Electrolyte Oxidation on NMC111, NMC622, NMC811, LNMO, and Conductive Carbon," Journal of Physical Chemistry Letters, 8: 4820-4825 (2017).
Supplementary European Search Report issued in related European Patent Application No. 19859253.7 dated Dec. 1, 2021.
Zhuang et al., "Lithium Ethylene Dicarbonate Identified as the Primary Product of Chemical and Electrochemical Reduction of EC in 1.2M LiPF6/EC:EMC Electrolyte," Journal of Physical Chemistry B, 109: 17567-17573 (2005).
Partial Supplementary European Search Report issued in corresponding European Patent Application No. 19859253.7 dated Sep. 24, 2021.
Chen et al., "An approach to application for LiNi0.6Co0.2Mn0.2O2 cathode material at high cutoff voltage by TiO2 coating," Journal of Power Sources, 256, 20-27 (2014).
Charton et al., "Reactivity of Succinic Anhydride at Lithium and Graphite Electrodes," Journal of the Electrochemical Society, 164(7): A1454-A1463 (2017).
Yanagisawa et al., "Effects of organic silicon compounds as additives on charge-discharge cycling efficiencies of lithium in nonaqueous electrolytes for rechargeable lithium cells," Journal of Power Sources, 266: 232-240 (2014).
Office Action issued in U.S. Appl. No. 17/269,634 dated May 9, 2025.

\* cited by examiner

NONAQUEOUS SECONDARY BATTERY

FIELD

The present invention relates to a nonaqueous secondary battery.

BACKGROUND

A nonaqueous secondary battery including a lithium ion battery has advantageous features of light weight, high energy and long life, and is widely used as a power source for portable electronic devices. In recent years, applications of the nonaqueous secondary battery are widened to an industrial field typified by power tools such as electric tools, and in-vehicle use in electric vehicles and electric bicycles, and attention is also focused on the field of a power storage such as residential power storage systems.

In particular, due to concerns about global warming and fossil fuel depletion, the application of the nonaqueous secondary battery to large-scale electricity storage industry centered on electric vehicles is eagerly desired. However, the widespread use of electric vehicles may require the realization of higher output and higher energy density of the nonaqueous secondary battery. In order to realize these required performances, research and development to increase the energy density of each active material of a positive electrode and a negative electrode is carried out every day.

PTL 1 mentions that it is preferable to combine a plurality of additives after defining an optimum LUMO energy range and a HOMO energy range of anions of an organolithium salt from the viewpoint of the durability of SEI on a surface of the negative electrode. PTL 2 also mentions that it is preferable to combine a specific lithium salt with a plurality of additives from the viewpoint of the durability of a solid electrolyte interface (SEI) on a surface of the negative electrode.

PTL 3 reports that designing the porosity of composite particles constituting an electrode material within an optimum range enables inhibition of deterioration of the electrode caused by repeated expansion and contraction of a high-capacity negative. PTL 4 reports that designing the thickness of a negative electrode active material to be twice or less the average particle size of negative electrode active material particles enables inhibition of an increase in resistance caused by repeated expansion and contraction of the negative electrode.

PTL 5 mentions that the addition of additives enables inhibition of deterioration of battery performance caused by repeated expansion and contraction of a high-capacity negative electrode.

CITATION LIST

Patent Literature

[PTL 1] WO 12/057311
[PTL 2] WO 13/062056
[PTL 3] JP 2003-303588 A
[PTL 4] JP 2004-146104 A
[PTL 5] WO 17/077986

SUMMARY

Technical Problem

If a film of a negative electrode cannot sufficiently withstand the solubility of a nonaqueous electrolyte solution, it may dissolve during various tests in a high-temperature environment. In this case, reductive decomposition of the nonaqueous electrolyte solution proceeds from the dissolved portion, thus causing gas generation or capacity reduction.

Here, PTL 1 and PTL 2 focus on the formation of a protective film having solubility resistance in a nonaqueous electrolyte solution (formation of a protective film on a negative electrode). That is, the inventions mentioned in PTL 1 and PTL 2 can operate as the nonaqueous electrolyte solution if the reductive decomposition of the nonaqueous electrolyte solution at the negative electrode can be solved.

However, when the negative electrodes mentioned in PTL 3 and PTL 4 are used, the active material itself expands and contracts significantly with the charging/discharging cycle. Therefore, as the charging/discharging cycle is repeated, defects are generated in the protective film formed at the initial stage, and reductive decomposition of the nonaqueous electrolyte solution occurs from the defects, leading to deterioration of the battery performance. Therefore, when the electrolyte solutions mentioned in PTL 1 and PTL 2 are used as a negative electrode material which causes large expansion and contraction, the protective film of the negative electrode is required to be excellent not only in solubility resistance but also in physical strength.

Meanwhile, when the additive mentioned in PTL 5 is used, the durability against expansion and contraction of the negative electrode tends to be improved, but the solubility resistance in the electrolyte solution tends to be insufficient.

In addition to the above, in recent years, it has been desired for the nonaqueous secondary battery to further suppress various deteriorations during charging/discharging cycles.

The present invention has been made in view of the above problems, and an object thereof is to provide a nonaqueous secondary battery capable of exhibiting excellent load characteristics and output performance and inhibiting various deterioration phenomena during high-temperature storage or during charging/discharging cycle in a low-temperature and high-temperature environment, by being provided with a film on a surface of an electrode active material, which is excellent not only in solubility resistance in a nonaqueous electrolyte solution but also in physical strength.

Solution to Problem

The present inventors have intensively studied to solve the above problems. As a result, they have found that the above problems can be solved by using a nonaqueous secondary battery having the following configuration. Namely, examples of the embodiment for carrying out the present invention are as follows.

[1] A nonaqueous secondary battery comprising:
  a positive electrode containing one or more positive electrode active materials capable of occluding and releasing lithium ions;
  a negative electrode containing a negative electrode active material which is at least one selected from the group consisting of a material capable of occluding and releasing lithium ions, and a metallic lithium; and
  a nonaqueous electrolyte solution; wherein
  the negative electrode contains at least one compound selected from the group consisting of compounds represented by the following general formula (1):

[Chemical Formula 1]

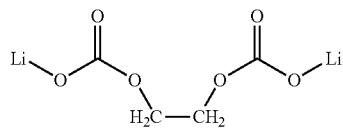
(1)

the following general formula (2):

[Chemical Formula 2]

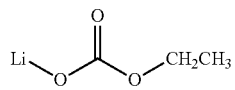
(2)

and the following general formula (3):

[Chemical Formula 3]

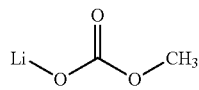
(3)

[2] The nonaqueous secondary battery according to [1], wherein the sum of the contents of the compounds represented by the general formulas (2) and (3) is 0.01 to 2.5 mg as the amount per 1 g of the negative electrode active material.
[3] The nonaqueous secondary battery according to [1] or [2], wherein the content of at least one compound selected from the group consisting of the compounds represented by the general formulas (1) to (3) is 0.01 to 100 mg as the amount per 1 g of the negative electrode active material.
[4] The nonaqueous secondary battery according to any one of [1] to [3], wherein the nonaqueous electrolyte solution contains acetonitrile.
[5] The nonaqueous secondary battery according to [4], wherein the content of acetonitrile is 5% by weight or more and 95% by weight or less as the amount per total amount of the nonaqueous electrolyte solution.
[6] The nonaqueous secondary battery according to any one of [1] to [5], wherein the nonaqueous electrolyte solution contains a fluorine-containing lithium salt.
[7] The nonaqueous secondary battery according to any one of [1] to [6], wherein the nonaqueous electrolyte solution contains an imide salt represented by $LiN(SO_2C_mF_{2m+1})_2$ wherein m is an integer of 0 to 8.
[8] The nonaqueous secondary battery according to any one of [1] to [7], wherein the negative electrode contains $PF_6$ anions.
[9] The nonaqueous secondary battery according to any one of [1] to [8], wherein the negative electrode contains $N(SO_2F)_2$ anions and/or $N(SO_2CF_3)_2$ anions.
[10] The nonaqueous secondary battery according to any one of [1] to [9], wherein the negative electrode contains a decomposition product of a cyclic acid anhydride.
[11] The nonaqueous secondary battery according to [10], wherein the decomposition product of the cyclic acid anhydride contains at least one compound selected from the group consisting of compounds represented by the following general formula (4):

[Chemical Formula 4]

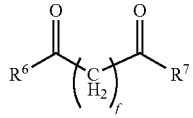
(4)

wherein $R^6$ and $R^7$ represent an alkoxy group which may be substituted with a halogen atom, an OH group or an OLi group, and f is an integer of 1 to 3;

the following general formula (5):

[Chemical Formula 5]

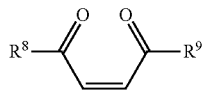
(5)

wherein $R^8$ and $R^9$ represent an alkoxy group which may be substituted with a halogen atom, an OH group or an OLi group;

the following general formula (6):

[Chemical Formula 6]

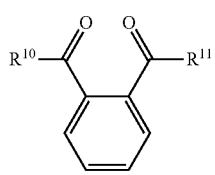
(6)

wherein $R^{10}$ and $R^{11}$ represent an alkoxy group which may be substituted with a halogen atom, an OH group or an OLi group;

the following general formula (7):

[Chemical Formula 7]

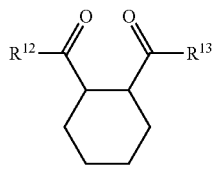
(7)

wherein $R^{12}$ and $R^{13}$ represent an alkoxy group which may be substituted with a halogen atom, an OH group or an OLi group;

the following general formula (8):

[Chemical Formula 8]

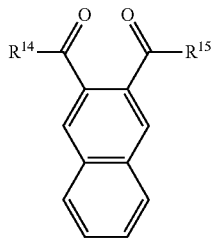
(8)

wherein $R^{14}$ and $R^{15}$ represent an alkoxy group which may be substituted with a halogen atom, an OH group or an OLi group; and the following general formula (9):

[Chemical Formula 9]

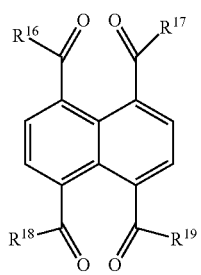
(9)

wherein $R^{16}$ to $R^{19}$ represent an alkoxy group which may be substituted with a halogen atom, an OH group or an OLi group.

[12] The nonaqueous secondary battery according to [10] or [11], wherein the cyclic acid anhydride contains at least one selected from the group consisting of malonic anhydride, succinic anhydride, glutaric anhydride, maleic anhydride, phthalic anhydride, 1,2-cyclohexanedicarboxylic anhydride, 2,3-naphthalenedicarboxylic anhydride and naphthalene-1,4,5,8-tetracarboxylic dianhydride.

[13] The nonaqueous secondary battery according to any one of [1] to [12], wherein the nonaqueous electrolyte solution contains a nonaqueous solvent, and the nonaqueous solvent contains a cyclic carbonate.

[14] The nonaqueous secondary battery according to [13], wherein the cyclic carbonate contains vinylene carbonate and/or fluoroethylene carbonate.

[15] The nonaqueous secondary battery according to any one of [1] to [14], wherein the negative electrode active material contains at least one element capable of forming an alloy with lithium.

[16] The nonaqueous secondary battery according to any one of [1] to [15], wherein the negative electrode active material contains silicon.

[17] The nonaqueous secondary battery according to any one of [1] to [16], wherein the nonaqueous electrolyte solution has an ionic conductivity at 20° C. of 15 mS/cm or more.

[18] The nonaqueous secondary battery according to any one of [1] to [17], wherein the separator used in the nonaqueous secondary battery has a thickness of 3 μm or more and 25 μm or less.

[19] The nonaqueous secondary battery according to any one of [1] to [18], wherein the separator used in the nonaqueous secondary battery has a porosity of 40% or more and 70% or less.

[20] The nonaqueous secondary battery according to any one of [1] to [19], wherein the separator used in the nonaqueous secondary battery has an air permeability of 100 s/100 cm³ or more and 350 s/100 cm³ or less.

[21] The nonaqueous secondary battery according to any one of [1] to [20], wherein the nonaqueous electrolyte solution contains at least one nitric acid compound selected from the group consisting of a nitrate and a nitric acid ester.

[22] The nonaqueous secondary battery according to any one of [1] to [21], wherein the nonaqueous electrolyte solution contains at least one additive selected from the group consisting of a polymer compound including a repeating unit represented by any one of the following general formula (P1):

[Chemical Formula 10]

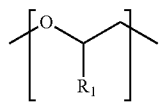
(P1)

wherein $R_1$ is a hydrogen atom or an alkyl group;

the following general formula (P2):

[Chemical Formula 11]

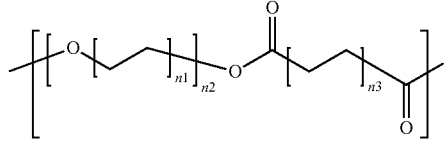
(P2)

wherein n1 to n3 are the number of repeating units and each independently represent an integer of 0 to 4;

the following general formula (P3):

[Chemical Formula 12]

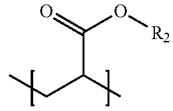
(P3)

wherein $R_2$ is an alkyl group having 1 to 20 carbon atoms or a fluoroalkyl group having 1 to 20 carbon atoms; and the following general formula (P4):

[Chemical Formula 13]

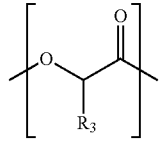
(P4)

wherein $R_3$ is a hydrogen atom or an alkyl group having 1 to 20 carbon atoms, and a carboxylic acid ester compound.

[23] The nonaqueous secondary battery according to any one of [1] to [22], wherein the nonaqueous electrolyte solution contains at least one additive selected from the group consisting of an organometal hydride and a dicarbonate compound.

[24] The nonaqueous secondary battery according to any one of [1] to [23], wherein the nonaqueous electrolyte solution contains a silyl group-containing additive.

[25] The nonaqueous secondary battery according to any one of [1] to [24], wherein the nonaqueous electrolyte solution contains a boron atom-containing additive.

[26] A nonaqueous electrolyte solution comprising a nonaqueous solvent and a lithium salt, wherein
the nonaqueous solvent contains 5% by weight or more and 95% by weight or less of acetonitrile based on the total amount of the nonaqueous solvent, and
the nonaqueous electrolyte solution further contains at least one nitric acid compound selected from the group consisting of a nitrate and a nitric acid ester.

[27] A nonaqueous electrolyte solution comprising a nonaqueous solvent and a lithium salt, wherein
the nonaqueous solvent contains 5% by weight or more and 95% by weight or less of acetonitrile based on the total amount of the nonaqueous solvent, and
the nonaqueous electrolyte solution further contains at least one additive selected from the group consisting of a polymer compound including a repeating unit represented by any one of the following general formula (P1):

[Chemical Formula 14]

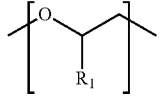

(P1)

wherein $R_1$ is a hydrogen atom or an alkyl group;
the following general formula (P2):

[Chemical Formula 15]

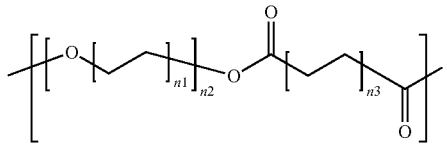

(P2)

wherein n1 to n3 are the number of repeating units and each independently represent an integer of 0 to 4;
the following general formula (P3):

[Chemical Formula 16]

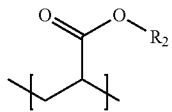

(P3)

wherein $R_2$ is an alkyl group having 1 to 20 carbon atoms or a fluoroalkyl group having 1 to 20 carbon atoms; and
the following general formula (P4):

[Chemical Formula 17]

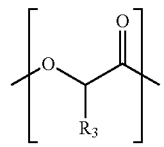

(P4)

wherein $R_3$ is a hydrogen atom or an alkyl group having 1 to 20 carbon atoms, and a carboxylic acid ester compound.

[28] A nonaqueous electrolyte solution comprising a nonaqueous solvent and a lithium salt, wherein
the nonaqueous solvent contains 5% by weight or more and 95% by weight or less of acetonitrile based on the total amount of the nonaqueous solvent, and
the nonaqueous electrolyte solution further contains at least one additive selected from the group consisting of an organometal hydride and a dicarbonate compound.

[29] A nonaqueous electrolyte solution comprising a nonaqueous solvent and a lithium salt, wherein
the nonaqueous solvent contains 5% by weight or more and 95% by weight or less of acetonitrile based on the total amount of the nonaqueous solvent, and
the nonaqueous electrolyte solution further contains a silyl group-containing additive.

[30] A nonaqueous electrolyte solution comprising a nonaqueous solvent and a lithium salt, wherein
the nonaqueous solvent contains 5% by weight or more and 95% by weight or less of acetonitrile based on the total amount of the nonaqueous solvent, and
the nonaqueous electrolyte solution further contains a boron atom-containing additive.

Advantageous Effects of Invention

According to the nonaqueous secondary battery of the present invention, it is possible to exhibit excellent load characteristics and output performance and to suppress various deterioration phenomena during high-temperature storage or during charging/discharging cycle in a low-temperature and high-temperature environment, by being provided with a film on a surface of an electrode active material, which is excellent not only in solubility resistance in a nonaqueous electrolyte solution but also in physical strength.

DESCRIPTION OF EMBODIMENTS

Figure 1:
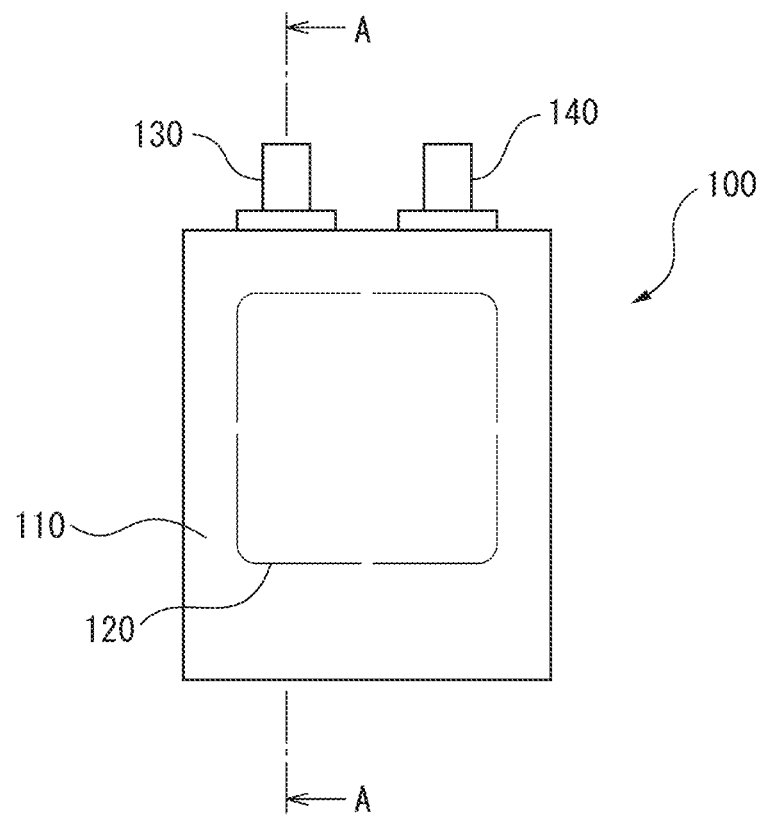
FIG. 1 is a plan view schematically showing an example of a nonaqueous secondary battery of the present embodiment.

Embodiments for carrying out the present invention (hereinafter simply referred to as "present embodiment") will be described in detail below. The present invention is not limited to the following embodiments, and various modifications can be made without departing from the scope of the present invention.

<<Nonaqueous Electrolyte Solution>>

The "nonaqueous electrolyte solution" in the present embodiment refers to an electrolyte solution in which the content of water is 1% by weight or less based on the total amount of the nonaqueous electrolyte solution. The nonaqueous electrolyte solution in the present embodiment preferably contains as little moisture as possible, but may contain a very small amount of moisture as long as it does not interfere the solution of the problems of the present invention. The moisture content is 300 ppm by weight or less, and preferably 200 ppm by weight or less, as the amount per total amount of the nonaqueous electrolyte solution. As long as the nonaqueous electrolyte solution has the configuration for achieving the solution of the problems of the present invention, it is possible to apply, as other structural elements, constituent materials in a known nonaqueous electrolyte solution used for a lithium ion battery by appropriately selecting them.

The nonaqueous electrolyte solution in the present embodiment can contain a nonaqueous solvent and a lithium salt. The nonaqueous electrolyte solution in the present embodiment can further contain various additives.

<Nonaqueous Solvent>

The "nonaqueous solvent" in the present embodiment means an element in which the lithium salt and various additives are removed from the nonaqueous electrolyte solution. Examples of the nonaqueous solvent include alcohols such as methanol and ethanol, aprotic solvents and the like. Of these, the nonaqueous solvent is preferably an aprotic solvent (aprotic polar solvent). The nonaqueous solvent may contain a solvent other than the aprotic solvent as long as it does not interfere the solution of the problems of the present invention.

For example, the nonaqueous solvent can contain acetonitrile as the aprotic solvent. When the nonaqueous solvent contains acetonitrile, it is possible to enhance quick charging characteristics of the nonaqueous secondary battery. In constant current (CC)-constant voltage (CV) charging of a nonaqueous secondary battery, the capacity per unit time during the CC charging period is larger than the charging capacity per unit time during the CV charging period. When acetonitrile is used as the nonaqueous solvent of the nonaqueous electrolyte solution, the area capable of CC charging can be increased (CC charging time can be extended) and the charging current can also be increased. Therefore, it is possible to significantly reduce the time required to fully charge the battery from the start of charging the nonaqueous secondary battery.

Acetonitrile easily undergoes electrochemical reductive decomposition. Therefore, when acetonitrile is used, it is preferable to use acetonitrile as a nonaqueous solvent in combination with other solvents (for example, aprotic solvents other than acetonitrile) and/or to add a predetermined additive.

The content of acetonitrile is preferably 5 to 95% by volume as the amount per total amount of the nonaqueous solvent. The content of acetonitrile is more preferably 20% by volume or more or 30% by volume or more, and still more preferably 40% by volume or more, as the amount per total amount of the nonaqueous solvent. This value is yet more preferably 85% by volume or less, and further preferably 66% by volume or less. When the content of acetonitrile is 5% by volume or more per total amount of the nonaqueous solvent, the ionic conductivity tends to increase, thus making it possible to exhibit high output characteristics, and also the dissolution of the lithium salt can be promoted. Since the below-mentioned additives suppress an increase in internal resistance of the battery, when the content of acetonitrile in the nonaqueous solvent is within the above range, there is a tendency that charging/discharging cycle characteristics and other battery characteristics can be further improved while maintaining excellent performance of acetonitrile.

Examples of the aprotic solvent other than acetonitrile include cyclic carbonate, fluoroethylene carbonate, lactone, organic compound containing an S atom, chain carbonate, cyclic ether, mononitrile other than acetonitrile, alkoxy group-substituted nitrile, dinitrile, cyclic nitrile, short-chain fatty acid ester, chain ether, fluorinated ether, ketone, and a compound in which H atoms of the compound are partially or entirely substituted with a halogen atom.

Examples of the cyclic carbonate include ethylene carbonate, propylene carbonate, 1,2-butylene carbonate, trans-2,3-butylene carbonate, cis-2,3-butylene carbonate, 1,2-pentylene carbonate, trans-2,3-pentylene carbonate, cis-2,3-pentylene carbonate, vinylene carbonate, 4,5-dimethylvinylene carbonate and vinylethylene carbonate;

examples of the fluoroethylene carbonate include 4-fluoro-1,3-dioxolan-2-one, 4,4-difluoro-1,3-dioxolan-2-one, cis-4,5-difluoro-1,3-dioxolan-2-one, trans-4,5-difluoro-1,3-dioxolan-2-one, 4,4,5-trifluoro-1,3-dioxolan-2-one, 4,4,5,5-tetrafluoro-1,3-dioxolan-2-one and 4,4,5-trifluoro-5-methyl-1,3-dioxolan-2-one;

examples of the lactone include γ-butyrolactone, α-methyl-γ-butyrolactone, γ-valerolactone, γ-caprolactone, δ-valerolactone, δ-caprolactone and ε-caprolactone;

examples of the organic compound containing an S atom include ethylene sulfite, propylene sulfite, butylene sulfite, pentene sulfite, sulfolane, 3-sulfolene, 3-methylsulfolane, 1,3-propane sultone, 1,4-butane sultone, 1-propene-1,3-sultone, dimethyl sulfoxide, tetramethylene sulfoxide and ethylene glycol sulfite;

examples of the chain carbonate include ethyl methyl carbonate, dimethyl carbonate, diethyl carbonate, methyl propyl carbonate, methyl isopropyl carbonate, dipropyl carbonate, methyl butyl carbonate, dibutyl carbonate and ethyl propyl carbonate;

examples of the cyclic ether include tetrahydrofuran, 2-methyltetrahydrofuran, 1,4-dioxane and 1,3-dioxane;

examples of the mononitrile other than acetonitrile include propionitrile, butyronitrile, valeronitrile, benzonitrile and acrylonitrile;

examples of the alkoxy group-substituted nitrile include methoxyacetonitrile and 3-methoxypropionitrile;

examples of the dinitrile include malononitrile, succinonitrile, glutaronitrile, adiponitrile, 1,4-dicyanoheptane, 1,5-dicyanopentane, 1,6-dicyanohexane, 1,7-dicyanoheptane, 2,6-dicyanoheptane, 1,8-dicyanooctane, 2,7-dicyanooctane, 1,9-dicyanononane, 2,8-dicyanononane, 1,10-dicyanodecane, 1,6-dicyanodecane and 2,4-dimethylglutaronitrile;

examples of the cyclic nitrile include benzonitrile;

examples of the short-chain fatty acid ester include methyl acetate, methyl propionate, methyl isobutyrate, methyl butyrate, methyl isovalerate, methyl valerate, methyl pivalate, methyl hydroangelate, methyl caproate, ethyl acetate, ethyl propionate, ethyl isobutyrate, ethyl butyrate, ethyl isovalerate, ethyl valerate, ethyl pivalate, ethyl hydroangelate, ethyl caproate, propyl acetate, propyl propionate, propyl isobutyrate, propyl butyrate, propyl isovalerate, propyl valerate, propyl pivalate, propyl hydroangelate, propyl caproate, isopropyl acetate, isopropyl propionate, isopropyl isobutyrate, isopropyl butyrate, isopropyl isovalerate, isopropyl valerate, isopropyl pivalate, isopropyl hydroangelate, isopropyl caproate, butyl acetate, butyl propionate, butyl isobutyrate, butyl butyrate, butyl isovalerate, butyl valerate, butyl pivalate, butyl hydroangelate, butyl caproate, isobutyl acetate, isobutyl propionate, isobutyl isobutyrate, isobutyl butyrate, isobutyl isovalerate, isobutyl valerate, isobutyl pivalate, isobutyl hydroangelate, isobutyl caproate, tert-butyl acetate, tert-butyl propionate, tert-butyl isobutyrate, tert-butyl butyrate, tert-butyl isovalerate, tert-butyl valerate, tert-butyl pivalate, tert-butyl hydroangelate and tert-butyl caproate;

examples of the chain ether include dimethoxyethane, diethyl ether, 1,3-dioxolane, diglyme, triglyme and tetraglyme;

examples of the fluorinated ether include $Rf^{20}$—$OR^{21}$ (wherein $Rf^{20}$ is an alkyl group containing a fluorine atom, and $R^{21}$ is an organic group which may contain a fluorine atom);

examples of the ketone include acetone, methyl ethyl ketone and methyl isobutyl ketone; and examples of the compound in which H atoms of the compound are partially or entirely substituted with a halogen atom include a compound in which a halogen atom is fluorine.

Here, examples of the fluorinated product of the chain carbonate include methyl trifluoroethyl carbonate, trifluorodimethyl carbonate, trifluorodiethyl carbonate, trifluoroethyl methyl carbonate, methyl 2,2-difluoroethyl carbonate, methyl 2,2,2-trifluoroethyl carbonate and methyl 2,2,3,3-tetrafluoropropyl carbonate. The fluorinated chain carbonate can be represented by the following general formula:

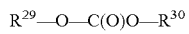

$R^{29}$—O—C(O)O—$R^{30}$ wherein $R^{29}$ and $R^{30}$ are at least one selected from the group consisting of $CH_3$, $CH_2CH_3$, $CH_2CH_2CH_3$, $CH(CH_3)_2$ and $CH_2Rf^{31}$, wherein $Rf^{31}$ is an alkyl group having 1 to 3 carbon atoms in which a hydrogen atom is substituted with at least one fluorine atom; $R^{29}$ and/or $R^{30}$ contain at least one fluorine atom.

Examples of the fluorinated product of the short-chain fatty acid ester include fluorinated short-chain fatty acid esters typified by 2,2-difluoroethyl acetate, 2,2,2-trifluoroethyl acetate and 2,2,3,3-tetrafluoropropyl acetate. The fluorinated short-chain fatty acid ester can be represented by the following general formula:

$R^{32}$—C(O)O—$R^{33}$ wherein $R^{32}$ is at least one selected from the group consisting of $CH_3$, $CH_2CH_3$, $CH_2CH_2CH_3$, $CH(CH_3)_2$, $CF_3CF_2H$, $CFH_2$, $CF_2Rf^{34}$, $CFHRf^{34}$ and $CH_2Rf^{35}$, and $R^{33}$ is at least one selected from the group consisting of $CH_3$, $CH_2CH_3$, $CH_2CH_2CH_3$, $CH(CH_3)_2$ and $CH_2Rf^{35}$, wherein $Rf^{34}$ is an alkyl group having 1 to 3 carbon atoms in which a hydrogen atom may be substituted with at least one fluorine atom, and $Rf^{35}$ is an alkyl group having 1 to 3 carbon atoms in which a hydrogen atom is substituted with at least one fluorine atom; $R^{32}$ and/or $R^{33}$ contain at least one fluorine atom; when $R^{32}$ is $CF_2H$, $R^{33}$ is not $CH_3$.

The aprotic solvent other than acetonitrile in the present embodiment can be used alone, or two or more thereof may be used in combination.

It is preferable to use, as the nonaqueous solvent in the present embodiment, one or more of cyclic carbonate and chain carbonate in combination with acetonitrile from the viewpoint of improving the stability of the nonaqueous electrolyte solution. From this point of view, it is more preferable to use, as the nonaqueous solvent in the present embodiment, cyclic carbonate in combination with acetonitrile, and still more preferable to use both cyclic carbonate and chain carbonate in combination with acetonitrile.

The cyclic carbonate used in combination with acetonitrile is preferably at least one selected from the group consisting of ethylene carbonate, propylene carbonate, vinylene carbonate, and fluoroethylene carbonate, and more preferably at least one selected from the group consisting of vinylene carbonate and fluoroethylene carbonate. The content of the cyclic carbonate is preferably 0.5% by weight or more and 50% by weight or less, and more preferably 1% by weight or more and 25% by weight or less, as the amount per total amount of the nonaqueous solvent.

The chain carbonate used in combination with acetonitrile is preferably at least one selected from the group consisting of dimethyl carbonate, diethyl carbonate and methyl ethyl carbonate. The content of the chain carbonate is preferably 5% by weight or more and 50% by weight or less, and more preferably 10% by weight or more and 40% by weight or less, as the amount per total amount of the nonaqueous solvent.

<Lithium Salt>

The nonaqueous electrolyte solution according to the present embodiment can contain a lithium salt.

The lithium salt in the present embodiment is preferably an imide salt represented by $LiN(SO_2C_mF_{2m+1})_2$ wherein m is an integer of 0 to 8.

The lithium salt in the present embodiment may further contain one or more selected from a fluorine-containing inorganic lithium salt, an organolithium salt and other lithium salts, together with an imide salt.

(Imide Salt)

Specifically, it is preferable to contain, as the imide salt, $LiN(SO_2F)_2$ and/or $LiN(SO_2CF_3)_2$.

Since the imide salt itself has a relatively high decomposition temperature, when the nonaqueous electrolyte solution contains the imide salt as the lithium salt, an increase in resistance during high-temperature storage is inhibited. Since the nonaqueous electrolyte solution contains the imide salt as the lithium salt, the viscosity of the nonaqueous electrolyte solution can be inhibited to a low level, so that excellent output performance can also be exhibited particularly in a low-temperature region.

The content of the imide salt is preferably 0.1 to 40% by weight, more preferably 0.2 to 30% by weight, and still more preferably 0.5 to 20% by weight, as the amount of the nonaqueous electrolyte solution per total amount. When the content is within this range, the performance at a low temperature can be improved without causing deterioration of the ionic conductivity of the nonaqueous electrolyte solution.

When acetonitrile is contained in the nonaqueous solvent, the saturation concentration of the imide salt based on acetonitrile is higher than the saturation concentration of $LiPF_6$. Therefore, it is preferable to contain the imide salt at a molar concentration satisfying $LiPF_6 \leq$ imide salt at a low temperature because the association and precipitation of the lithium salt and acetonitrile at a low temperature can be inhibited. In this case, the content of the imide salt is preferably 0.5 mol or more and 3.0 mol or less as the amount per 1 L of the nonaqueous solvent, from the viewpoint of ensuring the amount of ions supplied to the nonaqueous electrolyte solution according to the present embodiment.

According to an acetonitrile-containing nonaqueous electrolyte solution containing at least one of $LiN(SO_2F)_2$ and $LiN(SO_2CF_3)_2$, it is possible to effectively suppress deterioration of the ionic conductivity in a low-temperature range such as −10° C. or −30° C., thus obtaining excellent low-temperature characteristics.

(Fluorine-Containing Inorganic Lithium Salt)

The lithium salt in the present embodiment may contain a fluorine-containing inorganic lithium salt. The "fluorine-containing inorganic lithium salt" refers to a lithium salt which does not contain a carbon atom in anions but contains a fluorine atom in anions and is soluble in acetonitrile. The fluorine-containing inorganic lithium salt is excellent in that it forms a passivation film on a surface of a positive electrode current collector and inhibits corrosion of the positive electrode current collector.

Examples of the fluorine-containing inorganic lithium salt include $LiPF_6$, $LiBF_4$, $LiAsF_6$, $Li_2SiF_6$, $LiSbF_6$, $Li_2B_{12}F_bH_{12-b}$ {wherein b is an integer of 0 to 3}, and one or more selected from these salts can be used.

As the fluorine-containing inorganic lithium salt, a compound which is a double salt of LiF and Lewis acid is desirable, and of these, a fluorine-containing inorganic lithium salt containing a phosphorus atom is more preferable because it facilitates the release of free fluorine atoms. A typical fluorine-containing inorganic lithium salt is $LiPF_6$, which dissolves and releases $PF_6$ anions. When a fluorine-containing inorganic lithium salt containing a boron atom is used as the fluorine-containing inorganic lithium salt, it is preferable because it is easy to capture an excess free acid component that may cause deterioration of the battery, and from such a point of view, $LiBF_4$ is preferable.

The content of the fluorine-containing inorganic lithium salt in the nonaqueous electrolyte solution according to the present embodiment is preferably 0.01 mol or more, more preferably 0.1 mol or more, still more preferably 0.2 mol or more, and particularly preferably 0.25 mol or more, as the amount per 1 L of the nonaqueous solvent. When the content of the fluorine-containing inorganic lithium salt is within the above range, the ionic conductivity tends to increase and high output characteristics tend to be exhibited.

The amount per 1 L of the nonaqueous solvent is preferably 2.8 mol or less, more preferably 1.5 mol or less, and still more preferably 1.0 mol or less. When the content of the fluorine-containing inorganic lithium salt is within the above range, the ionic conductivity tends to increase and high output characteristics can be exhibited, and deterioration of the ionic conductivity due to an increase in viscosity at a low temperature tends to be inhibited. Moreover, the high-temperature cycle characteristics and other battery characteristics tend to be further improved while maintaining excellent performance of the nonaqueous electrolyte solution.

The content of the fluorine-containing inorganic lithium salt in the nonaqueous electrolyte solution according to the present embodiment may be, for example, 0.05 mol or more and 1.0 mol or less as the amount per 1 L of the nonaqueous solvent.

(Organolithium Salt)

The lithium salt in the present embodiment may contain an organolithium salt. The "organolithium salt" refers to a lithium salt other than an imide salt, which contains a carbon atom as anions and is soluble in acetonitrile.

Examples of the organolithium salt include an organolithium salt having an oxalic acid group. Specific examples of the organolithium salt having an oxalic acid group include organolithium salts represented by $LiB(C_2O_4)_2$, $LiBF_2(C_2O_4)$, $LiPF_4(C_2O_4)$ and $LiPF_2(C_2O_4)_2$. Of these, at least one lithium salt selected from the lithium salts represented by $LiB(C_2O_4)_2$ and $LiBF_2(C_2O_4)$ is preferable. It is more preferable to use one or more of these salts together with a fluorine-containing inorganic lithium salt. The organolithium salt having an oxalic acid group may be added to the nonaqueous electrolyte solution or contained in a negative electrode (negative electrode active material layer).

The amount of the organolithium salt added to the nonaqueous electrolyte solution in the present embodiment is preferably 0.005 mol or more, more preferably 0.01 mol or more, still more preferably 0.02 mol or more, and particularly preferably 0.05 mol or more, as the amount per 1 L of the nonaqueous solvent, from the viewpoint of ensuring better effects due to its use. However, if the amount of the organolithium salt having an oxalic acid group in the nonaqueous electrolyte solution is too large, it may precipitate. Therefore, the amount of the organolithium salt having an oxalic acid group added to the nonaqueous electrolyte solution is preferably less than 1.0 mol, more preferably less than 0.5 mol, and still more preferably less than 0.2 mol, as the amount per 1 L of the nonaqueous solvent.

The organolithium salts having an oxalic acid group is known to be hardly insoluble in organic solvents having low polarity, especially chain carbonates. The content of the organolithium salt in the nonaqueous electrolyte solution according to the present embodiment may be, for example, 0.01 mol or more and 0.5 mol or less as the amount per 1 L of the nonaqueous solvent.

The organolithium salt having an oxalic acid group sometimes contain a trace amount of lithium oxalate, and sometimes reacts with a trace amount of water contained in other raw materials when mixed as a nonaqueous electrolyte solution, thus generating a new white precipitate of lithium oxalate. Therefore, the content of lithium oxalate in the nonaqueous electrolyte solution according to the present embodiment is preferably inhibited within a range of 500 ppm or less.

(Other Lithium Salts)

The lithium salt in the present embodiment may contain other lithium salts, in addition to the above lithium salts.

Specific examples of other lithium salts include:

inorganic lithium salts containing no fluorine atom in anions, such as $LiClO_4$, $LiAlO_4$, $LiAlCl_4$, $LiB_{10}Cl_{10}$ and Li chloroborane;

organolithium salts such as $LiCF_3SO_3$, $LiCF_3CO_2$, $Li_2C_2F_4(SO_3)_2$, $LiC(CF_3SO_2)_3$, $LiC_nF_{(2n+1)}SO_3$ (wherein n≥2), Li lower aliphatic carboxylic acid, Li tetraphenylboric acid and $LiB(C_3O_4H_2)_2$;

organolithium salts represented by $LiPF_n(C_pF_{2p+1})_{6-n}$ [wherein n is an integer of 1 to 5, and p is an integer of 1 to 8], such as $LiPF_5(CF_3)$;

organolithium salts represented by $LiBF_q(C_sF_{2s+1})_{4-q}$ [wherein q is an integer of 1 to 3, and s is an integer of 1 to 8], such as $LiBF_3(CF_3)$; lithium salts bonded to polyvalent anions;

organolithium salts represented by the following formula (15a):

$$LiC(SO_2R^{22})(SO_2R^{23})(SO_2R^{24}) \qquad (15a)$$

wherein $R^{22}$, $R^{23}$ and $R^{24}$ may be the same or different and represent a perfluoroalkyl group having 1 to 8 carbon atoms, the following formula (15b):

$$\text{LiN}(SO_2OR^{25})(SO_2OR^{26}) \qquad (15b)$$

wherein $R^{25}$ and $R^{26}$ may be the same or different and represent a perfluoroalkyl group having 1 to 8 carbon atoms, and the following formula (15c):

$$\text{LiN}(SO_2R^{27})(SO_2OR^{28}) \qquad (15c)$$

wherein $R^{27}$ and $R^{28}$ may be the same or different and represent a perfluoroalkyl group having 1 to 8 carbon atoms, and the like, and one or more of these salts can be used together with the fluorine-containing inorganic lithium salt.

The amount of other lithium salts added to the nonaqueous electrolyte solution may be appropriately set, for example, within a range of 0.01 mol or more and 0.5 mol or less, as an amount per 1 L of the nonaqueous solvent.

<Various Additives>

In the present embodiment, the nonaqueous electrolyte solution can further contain various additives.

The nonaqueous secondary battery according to the present embodiment is stabilized by partially decomposing the nonaqueous electrolyte solution at the time of initial charging to form SEI on a surface of a negative electrode. An acid anhydride can be added to enhance this SEI more effectively. When acetonitrile is contained as a nonaqueous solvent, the strength of SEI tends to decrease as the temperature rises, but the addition of the acid anhydride promotes the enhancement of SEI. Therefore, use of the acid anhydride enables effective inhibition of an increase in internal resistance over time due to thermal history.

Specific examples of the acid anhydride include chain acid anhydrides typified by acetic anhydride, propionic anhydride and benzoic anhydride; cyclic acid anhydrides typified by malonic anhydride, succinic anhydride, glutaric anhydride, maleic anhydride, phthalic anhydride, 1,2-cyclohexanedicarboxylic anhydride, 2,3-naphthalenedicarboxylic anhydride or naphthalene-1,4,5,8-tetracarboxylic dianhydride; two different types of carboxylic acids, and mixed acid anhydrides having a structure in which different types of acids undergo dehydration condensation, such as carboxylic acid and sulfonic acid. These acid anhydrides are used alone, or in combination of two or more thereof.

Since it is preferable for the nonaqueous secondary battery in the present embodiment to strengthen SEI before the reductive decomposition of the nonaqueous solvent, it is preferable to contain, as the acid anhydride, at least one cyclic acid anhydride which acts early at the time of initial charging. Only one type or plural types of these cyclic acid anhydrides may be contained. Alternatively, a cyclic acid anhydride other than these cyclic acid anhydrides may be contained. The cyclic acid anhydride preferably contains at least one of succinic anhydride, maleic anhydride and phthalic anhydride.

According to a nonaqueous electrolyte solution containing at least one of succinic anhydride, maleic anhydride and phthalic anhydride, it is possible to form strong SEI on a negative electrode, thus inhibiting more effectively an increase in resistance during high-temperature heating. In particular, it is preferable to contain succinic anhydride. Thus, it is possible to form strong SEI on the negative electrode more effectively while inhibiting the side reaction.

When the nonaqueous electrolyte solution in the present embodiment contains an acid anhydride, the content thereof may be preferably within a range of 0.01 part by weight or more and 10 parts by weight or less, more preferably 0.05 part by weight or more and 1 part by weight or less, and still more preferably 0.1 part by weight or more and 0.5 part by weight or less, as the amount per 100 parts by weight of the nonaqueous electrolyte solution.

The acid anhydride is preferably contained in the nonaqueous electrolyte solution. Meanwhile, as long as the acid anhydride can act in a nonaqueous secondary battery, at least one battery member selected from the group consisting of a positive electrode, a negative electrode and a separator may contain the acid anhydride. As a method of containing the acid anhydride in the battery member, for example, the acid anhydride may be contained in the battery member at the time of fabricating the battery member, or the battery member may be impregnated with the acid anhydride by a post-treatment typified by coating, dipping or spray drying on the battery member.

In the present embodiment, for the purpose of improving high-temperature storability and safety of the nonaqueous secondary battery, it is also possible for the nonaqueous electrolyte solution to appropriately contain, for example, a sulfonic acid ester, diphenyl disulfide, cyclohexylbenzene, biphenyl, fluorobenzene, tert-butylbenzene, a phosphoric acid ester [ethyldiethylphosphonoacetate (EDPA); $(C_2H_5O)_2(P=O)—CH_2(C=O)OC_2H_5$, tris(trifluoroethyl) phosphate (TFEP); $(CF_3CH_2O)_3P=O$, triphenyl phosphate (TPP); $(C_6H_5O)_3P=O$, triallyl phosphate; $(CH_2=CHCH_2O)_3P=O$, etc.], a nitrogen-containing cyclic compound with no steric hindrance around unshared electron pair [pyridine, 1-methyl-1H-benzotriazole, 1-methylpyrazole, etc.], and at least one optional additive selected from derivatives of these compounds and the like. In particular, a phosphoric acid ester has the effect of inhibiting the side reaction during high-temperature storage and is effective.

The content of the optional additive is calculated as a weight percentage based on the total weight of all the components constituting the nonaqueous electrolyte solution. The content of the optional additive is preferably 0.01 to 10% by weight, more preferably 0.02 to 5% by weight, and still more preferably 0.05 to 3% by weight, as the amount of the nonaqueous electrolyte solution per total amount. By adjusting the content of the optional additive within the above range, it tends to be possible to add more satisfactory battery characteristics without impairing the basic function of the nonaqueous secondary battery.

<Ionic Conductivity of Nonaqueous Electrolyte Solution>

In a nonaqueous secondary battery, when a below-mentioned separator of a preferred embodiment is combined with a nonaqueous electrolyte solution having low ionic conductivity, the moving speed of lithium ions is controlled by the ionic conductivity of the nonaqueous electrolyte solution, thus failing to obtain the desired input/output characteristics. Therefore, the ionic conductivity of the nonaqueous electrolyte solution according to the present embodiment is preferably 10 mS/cm or more, more preferably 15 mS/cm or more, and still more preferably 20 mS/cm or more.

<Method for Producing Nonaqueous Electrolyte Solution>

The nonaqueous electrolyte solution in the present embodiment can be produced by mixing a nonaqueous solvent, a lithium salt, and various additives as necessary by any means.

<<Nonaqueous Secondary Battery>>

The nonaqueous secondary battery according to the present embodiment is a nonaqueous secondary battery comprising:

a positive electrode containing one or more positive electrode active materials capable of occluding and releasing lithium ions;

a negative electrode containing a negative electrode active material which is at least one selected from the group consisting of a material capable of occluding and releasing lithium ions and metallic lithium; and a nonaqueous electrolyte solution; wherein the negative electrode contains at least one compound selected from the group consisting of compounds represented by the following general formula (1):

[Chemical Formula 18]

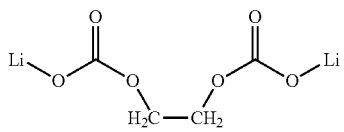

(1)

the following general formula (2):

[Chemical Formula 19]

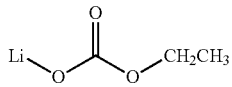

(2)

and the following general formula (3):

[Chemical Formula 20]

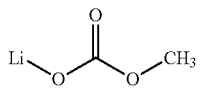

(3)

Of these, it is possible to use, as the nonaqueous electrolyte solution, the nonaqueous electrolyte solution mentioned above.

The nonaqueous secondary battery of the present embodiment is typically configured with a predetermined positive electrode, negative electrode, separator and nonaqueous electrolyte solution housed in a suitable battery outer package.

Figure 2:
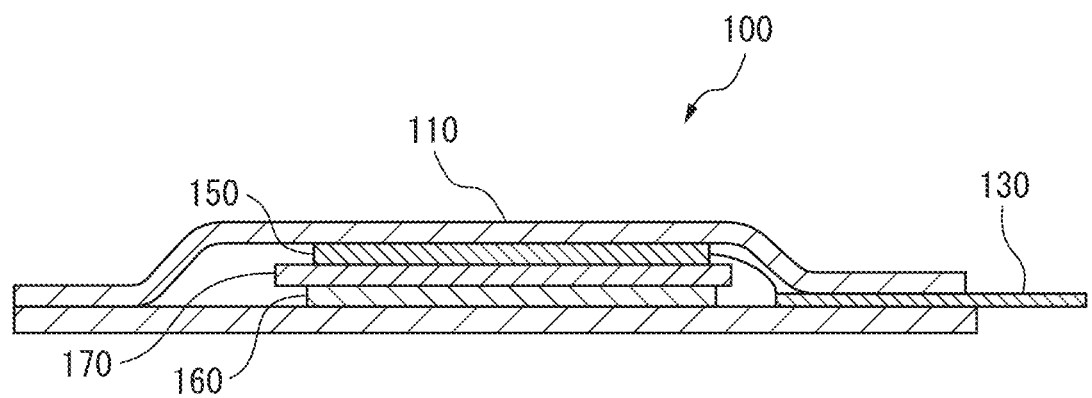
FIG. 2 is a cross-sectional view taken along line A-A of the nonaqueous secondary battery of FIG. 1.

Specifically, the nonaqueous secondary battery of the present embodiment may be the nonaqueous secondary battery shown in FIGS. 1 and 2. Here, FIG. 1 is a plan view schematically showing a nonaqueous secondary battery, and FIG. 2 is a cross-sectional view taken along line A-A of FIG. 1.

The nonaqueous secondary battery 100 shown in FIGS. 1 and 2 is composed of a pouch-type cell. The nonaqueous secondary battery 100 houses a laminated electrode structure formed by laminating a positive electrode 150 and a negative electrode 160 via a separator 170 in a space 120 of a battery outer package 110, and a nonaqueous electrolyte solution (not shown). The battery outer package 110 is made of, for example, an aluminum laminated film, and is sealed by heat-sealing upper and lower films at the outer periphery of the space formed by the two aluminum laminated films. The laminated body in which the positive electrode 150, the separator 170, and the negative electrode 160 are laminated in this order is impregnated with the nonaqueous electrolyte solution. However, in FIG. 2, in order to avoid complicating the drawing, the layers constituting the battery outer package 110 and the layers of the positive electrode 150 and the negative electrode 160 are not shown separately.

The aluminum laminate film constituting the battery outer package 110 is preferably an aluminum laminate film in which both sides of the aluminum foil are coated with a polyolefin-based resin.

The positive electrode 150 is connected to a positive electrode lead body 130 in the nonaqueous secondary battery 100. Although not shown, the negative electrode 160 is also connected to a negative electrode lead body 140 in the nonaqueous secondary battery 100. One end of each of the positive electrode lead body 130 and the negative electrode lead body 140 is pulled out to the outside of the battery outer package 110 so that they can be connected to an external device or the like, and their ionomer portions are heat-sealed together with one side of the battery outer package 110.

In the nonaqueous secondary battery 100 shown in FIGS. 1 and 2, the positive electrode 150 and the negative electrode 160 each have one laminated electrode structure, but the number of laminated positive electrodes 150 and negative electrodes 160 can be appropriately increased by the capacity design. In the case of a laminated electrode structure having a plurality of positive electrodes 150 and negative electrodes 160, tabs of the same electrode may be joined by welding or the like, and then joined to one lead body by welding or the like and taken out of the battery. As the tab of the same pole, a mode composed of the exposed portion of a current collector, a mode configured by welding a metal piece to the exposed portion of a current collector, and the like are possible.

The positive electrode 150 is composed of a positive electrode current collector and a positive electrode active material layer. The negative electrode 160 is composed of a negative electrode current collector and a negative electrode active material layer.

The positive electrode active material layer contains a positive electrode active material, and the negative electrode active material layer contains a negative electrode active material.

The positive electrode 150 and the negative electrode 160 are arranged so that the positive electrode active material layer and the negative electrode active material layer face each other via the separator 170.

Hereinafter, each element constituting the nonaqueous secondary battery according to the present embodiment will be described in order.

<Positive Electrode>

The positive electrode contains one or more positive electrode active materials capable of occluding and releasing lithium ions.

The positive electrode can have a positive electrode active material layer on one or both sides of the positive electrode current collector.

[Positive Electrode Current Collector]

The positive electrode current collector is composed of, for example, a metal foil such as an aluminum foil, a nickel foil or a stainless steel foil. The surface of the positive electrode current collector may be coated with carbon, and may be processed into a mesh shape. The thickness of the positive electrode current collector is preferably 5 to 40 μm, more preferably 7 to 35 μm, and still more preferably 9 to 30 μm.

[Positive Electrode Active Material Layer]

The positive electrode active material layer contains one or more positive electrode active materials capable of occluding and releasing lithium ions. The positive electrode active material layer may further contain a conductive aid and/or a binder as necessary.

(Positive Electrode Active Material)

The positive electrode active material contains one or more materials capable of occluding and releasing lithium ions. When such a material is used, it is possible to obtain high voltage and high energy density.

The positive electrode active material includes, for example, a positive electrode active material containing at least one transition metal element selected from the group consisting of Ni, Mn and Co, and is suitably at least one selected from lithium-containing metal oxides represented by the following general formula (14):

$$Li_pNi_qCo_rMn_sM_tO_u \qquad (14)$$

wherein M is at least one metal selected from the group consisting of Al, Sn, In, Fe, V, Cu, Mg, Ti, Zn, Mo, Zr, Sr and Ba, p, q, r, s, t and u are within the following ranges: $0<p<1.3$, $0<q<1.2$, $0<r<1.2$, $0\leq s<0.5$, $0\leq t<0.3$, $0.7\leq q+r+s+t\leq 1.2$, and $1.8<u<2.2$, and p is the value determined by the charge/discharge state of the battery.

Examples of the positive electrode active material include:

lithium cobalt oxide typified by $LiCoO_2$;

lithium manganese oxide typified by $LiMnO_2$, $LiMn_2O_4$ and $Li_2Mn_2O_4$;

lithium nickel oxide typified by $LiNiO_2$;

lithium-containing composite metal oxide represented by $Li_zMO_2$, typified by $LiNi_{1/3}Co_{1/3}Mn_{1/3}O_2$, $LiNi_{0.5}Co_{0.2}Mn_{0.3}O_2$, $LiNi_{0.8}Co_{0.2}O_2$, $LiNi_{0.6}Co_{0.2}Mn_{0.2}O_2$, $LiNi_{0.75}Co_{0.15}Mn_{0.15}O_2$, $LiNi_{0.8}Co_{0.1}Mn_{0.1}O_2$, $LiNi_{0.85}Co_{0.075}Mn_{0.075}O_2$, $LiNi_{0.8}Co_{0.15}Al_{0.05}O_2$, $LiNi_{0.81}Co_{0.1}Al_{0.09}O_2$ and $LiNi_{0.85}Co_{0.1}Al_{0.05}O_2$ (wherein M contains at least one transition metal element selected from the group consisting of Ni, Mn and Co and represents two or more metal elements selected from the group consisting of Ni, Mn, Co, Al and Mg, and z represents a number of more than 0.9 and less than 1.2);

metal oxide or metal chalcogenide with tunnel and layered structures, typified by $MnO_2$, $FeO_2$, $FeS_2$, $V_2O_5$, $V_6O_{13}$, $TiO_2$, $TiS_2$, $MoS_2$ and $NbSe_2$;

sulfur;

conductive polymer typified by polyaniline, polythiophene, polyacetylene and polypyrrole; and the like.

In particular, when a Ni content ratio q of the Li-containing metal oxide represented by the general formula (14) satisfies $0.5<q<1.2$, it is preferable because both a reduction in the amount of Co, which is a rare metal, and higher energy density is achieved.

The positive electrode active material may be a lithium-containing compound other than the lithium-containing metal oxide represented by the formula (14). Examples of such a lithium-containing compound include a composite oxide containing lithium and a transition metal element, a metal chalcogenide containing lithium, a metal phosphate compound containing lithium and a transition metal element, and a metal silicate compound containing lithium and a transition metal element. From the viewpoint of obtaining higher voltage, the lithium-containing compound is particularly preferably a metal phosphate compound containing lithium and at least one transition metal element selected from the group consisting of Co, Ni, Mn, Fe, Cu, Zn, Cr, V and Ti.

More specific examples include compounds each represented by the following formula (16a):

$$Li_vM^ID_2 \qquad (16a)$$

wherein D represents a chalcogen element, $M^I$ represents one or more transition metal elements containing at least one transition metal element, the value of v is determined by the charge/discharge state of the battery and represents a number of 0.05 to 1.10, and u represents an integer of 0 to 2, the following formula (16b):

$$Li_wM^{II}PO_4 \qquad (16b)$$

wherein D represents chalcogen element, $M^{II}$ represents one or more transition metal elements containing at least one transition metal element, the value of w is determined by the charge/discharge state of the battery and represents a number of 0.05 to 1.10, and u represents an integer of 0 to 2, and the following formula (16c):

$$Li_tM^{III}_uSiO_4 \qquad (16c)$$

wherein D represents chalcogen element, $M^{III}$ represents one or more transition metal elements containing at least one transition metal element, the value of t is determined by the charge/discharge state of the battery and represents a number of 0.05 to 1.10, and u represents an integer of 0 to 2.

The lithium-containing compound represented by the above formula (16a) has a layered structure, and the compounds represented by the above formulas (16b) and (16c) have an olivine structure. For the purpose of stabilizing the structure, these lithium-containing compounds may be those in which transition metal elements are partially substituted with Al, Mg or other transition metal elements, those in which these metal elements are included in grain boundaries, those in which oxygen atoms are partially substituted with a fluorine atom or the like, those in which a surface of the positive electrode active material is partially coated with other positive electrode active materials, and the like.

The positive electrode active material may be used alone, or in combination of two or more thereof. Since lithium ions can be occluded and released in a reversible and stable manner, and high energy density can be achieved, it is preferable that the positive electrode active material layer contains at least one transition metal element selected from Ni, Mn and Co.

When a lithium-containing compound and other positive electrode active materials are used in combination as the positive electrode active material, a ratio of both used is preferably 80% by weight or more, and more preferably 85% by weight, as the ratio of the lithium-containing compound used to the entire positive electrode active material used.

(Conductive Aid)

Examples of the conductive aid include carbon blacks typified by graphite, acetylene black and Ketjen black, and carbon fiber. The content of the conductive aid is preferably set at 10 parts by weight or less, and more preferably 1 to 5 parts by weight, as the amount per 100 parts by weight of the positive electrode active material.

(Binder)

Examples of the binder include polyvinylidene fluoride (PVDF), polytetrafluoroethylene (PTFE), polyacrylic acid, styrene-butadiene rubber and fluororubber. The content of the binder is preferably set at 6 parts by weight or less, and more preferably 0.5 to 4 parts by weight, as the amount per 100 parts by weight of the positive electrode active material.

[Formation of Positive Electrode Active Material Layer]

The positive electrode active material layer is formed by applying a positive electrode mixture-containing slurry, which is prepared by dispersing a positive electrode mixture obtained by mixing a positive electrode active material, and a conductive aid and a binder as necessary, in a solvent, to a positive electrode current collector, followed by drying (removing the solvent) and pressing as necessary. It is possible to use, as such a solvent, a known solvent. Examples thereof include N-methyl-2-pyrrolidone, dimethylformamide, dimethylacetamide, water and the like.

<Negative Electrode>

The negative electrode in the nonaqueous secondary battery according to the present embodiment has a negative electrode active material layer on one or both sides of the negative electrode current collector.

The negative electrode contains a negative electrode active material which is at least one selected from the group consisting of a material capable of occluding and releasing lithium ions and metallic lithium.

Here, the negative electrode contains at least one compound selected from the group consisting of compounds represented by the following general formula (1):

[Chemical Formula 21]

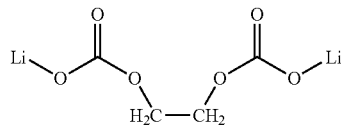

(1)

the following general formula (2):

[Chemical Formula 22]

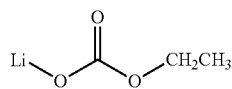

(2)

and the following general formula (3):

[Chemical Formula 23]

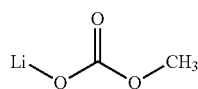

(3)

By using at least one selected from the group consisting of the compounds represented by the general formulas (1) to (3), the physical strength against expansion and contraction of the negative electrode is further strengthened, so that it becomes easy to suppress deterioration of the electrode characteristics due to charging/discharging cycle. In particular, it is inferred from the structure that the compound represented by the general formula (1) contains lithium arranged at both ends and has a long molecular chain, so that the physical strength against expansion and contraction of the negative electrode is strong and the resistance is low. It is also inferred from the structure that that the compound represented by the general formula (2) or (3) has a short molecular chain and forms a dense protective film having excellent durability. Meanwhile, if the content is too large, it may cause an increase in resistance, so that it is necessary to keep the content within a certain range. Therefore, by using at least one selected from the group consisting of the compounds represented by the general formulas (1) to (3), it becomes easy to ensure a balance between physical strength against expansion and contraction of the negative electrode and solubility.

The content of at least one selected from the group consisting of the compounds represented by the general formulas (1) to (3) is calculated by dividing the quantitative value obtained by the analysis of a negative electrode protective film component by the mass of the negative electrode active material. The sum of the contents of the compounds represented by the general formulas (2) and (3) is preferably 0.01 to 2.5 mg as the amount per 1 g of the negative electrode active material. The content of at least one compound selected from the group consisting of the compounds represented by the general formulas (1) to (3) is preferably 0.01 to 100 mg, more preferably 0.05 to 50 mg, and still more preferably 0.1 to 10 mg, as the amount per 1 g of the negative electrode active material. When the content is within this range, it becomes easy to suppress an increase in film resistance due to charging/discharging cycle without impairing the basic function of the nonaqueous secondary battery. It is preferable that the above content is satisfied within a range of up to 100 cycles of repeating charging and discharging.

At this time, the negative electrode may contain $PF_6$ anions, and may also contain $N(SO_2F)_2$ anions and/or $N(SO_2CF_3)_2$ anions. That is, the nonaqueous electrolyte solution may contain at least one anion selected from the group consisting of $PF_6$ anions, $N(SO_2F)_2$ anions and/or $N(SO_2CF_3)_2$ anions. Anions promote the effect of forming a protective film and form a passive film on a surface of a surface foil which is a positive electrode current collector, and are therefore preferable from the viewpoint of inhibiting an increase in internal resistance.

The content of at least one selected from the group consisting of the compounds represented by the general formulas (1) to (3) in the negative electrode is calculated by dividing the quantitative value obtained by the analysis of a negative electrode protective film component by the weight of the negative electrode active material.

[Negative Electrode Active Material Layer]

The negative electrode active material layer may contain a negative electrode active material, and may further contain a conductive aid and/or a binder as necessary.

(Negative Electrode Active Material)

The negative electrode active material is at least one selected from the group consisting of a material capable of occluding and releasing lithium ions and metallic lithium.

Examples of such a negative electrode active material include amorphous carbon (hard carbon), artificial graphite, natural graphite, graphite, thermally decomposed carbon, coke, glassy carbon, calcined product of organic polymer compound, mesocarbon microbeads, carbon materials typified by carbon fiber, activated carbon, graphite, carbon colloid and carbon black, as well as metallic lithium, metal oxides, metal nitrides, lithium alloys, tin alloys, Si materials, intermetallic compounds, organic compounds, inorganic compounds, metal complexes and organic polymer compounds. The negative electrode active materials may be used alone, or in combination of two or more thereof. Examples of the Si material include silicon, Si alloy, Si oxide and the like.

It is preferable that the negative electrode active material layer contains, as the negative electrode active material, a material capable of occluding lithium ions at a lower potential than 0.4 V vs. Li/Li$^+$ from the viewpoint of increasing the battery voltage.

The nonaqueous electrolyte solution according to the present embodiment has an advantage that even when a Si material is applied to the negative electrode active material, it is possible to suppress various deterioration phenomena due to a volume change of the negative electrode when charging/discharging cycle is repeated. Therefore, in the nonaqueous secondary battery according to the present embodiment, use of the Si material typified by a silicon alloy or the like as the negative electrode active material is a preferred mode in that excellent charging/discharging cycle characteristics are achieved while having a high capacity derived from the Si material.

In the present embodiment, a Si material, especially $SiO_x$ (wherein $0.5 \leq x \leq 1.5$), may be contained as the negative electrode active material.

In the present embodiment, it is preferable to contain at least one element capable of forming an alloy with lithium. Examples of such an element include silicon. The Si material may be in any form of a crystalline, a low crystalline and an amorphous. When a Si material is used as the negative electrode active material, it is preferable to coat a surface of the active material with a conductive material because the conductivity between the active material particles is improved.

Silicon has an operating potential of about 0.5 V (vs. Li/Li$^+$), which is slightly higher than the operating potential of graphite of about 0.05 V (vs. Li/Li$^+$). Therefore, use of the Si material reduces the risk of lithium electrodeposition. Acetonitrile used as the nonaqueous solvent in the present embodiment may react with lithium metal to cause gas generation. Therefore, a negative electrode active material which hardly causes electrodeposition with lithium is preferable when used in combination with a nonaqueous electrolyte solution containing acetonitrile.

Meanwhile, a negative electrode active material having an excessively high operating potential reduces the energy density of the battery. Therefore, from the viewpoint of improving the energy density, it is preferable that the negative electrode active material operates at a lower potential than 0.4V vs. Li/Li$^+$.

The content of the Si material is preferably within a range of 0.1% by weight or more and 100% by weight or less, preferably 1% by weight or more and 80% by weight or less, and more preferably 3% by weight or more and 60% by weight or less, as the amount per total amount of the negative electrode active material layer. By adjusting the content of the Si material within the above range, it is possible to ensure a balance between higher capacity of the nonaqueous secondary battery and charging/discharging cycle performance.

(Conductive Aid)

Examples of the conductive aid include carbon black typified by graphite, acetylene black and Ketjen black, and carbon fiber. The content of the conductive aid is preferably 20 parts by weight or less, more preferably 0.1 to 10 parts by weight, as the amount per 100 parts by weight of the negative electrode active material.

(Binder)

Examples of the binder include carboxymethyl cellulose, polyvinylidene fluoride (PVDF), polytetrafluoroethylene (PTFE), polyacrylic acid and fluororubber. A diene-based rubber such as a styrene-butadiene rubber can also be exemplified. The content of the binder is preferably set at 10 parts by weight or less, and more preferably 0.5 to 6 parts by weight, as the amount per 100 parts by weight of the negative electrode active material.

[Formation of Negative Electrode Active Material Layer]

The negative electrode active material layer is formed by applying a negative electrode mixture-containing slurry, which is prepared by dispersing a negative electrode mixture obtained by mixing a negative electrode active material, and a conductive aid and a binder as necessary, in a solvent, to a negative electrode current collector, followed by drying (removing the solvent) and pressing as necessary. It is possible to use, as such a solvent, a known solvent. Examples thereof include N-methyl-2-pyrrolidone, dimethylformamide, dimethylacetamide, water and the like.

[Decomposition Product of Acid Anhydride]

Here, the negative electrode active material preferably contains a decomposition product of a cyclic acid anhydride. It is possible to use, as a specific example of the cyclic acid anhydride, those exemplified in the item of <Various Additives>.

The decomposition product of the cyclic acid anhydride, which can contain the negative electrode active material, is preferably at least one selected from the group consisting of malonic anhydride, succinic anhydride, glutaric anhydride, maleic anhydride, phthalic anhydride, 1,2-cyclohexanedicarboxylic anhydride, 2,3-naphthalenedicarboxylic anhydride and naphthalene-1,4,5,8-tetracarboxylic dianhydride.

In the negative electrode, the acid anhydride is used to more effectively enhance SEI on a surface of the negative electrode.

The amount of the decomposition product of the acid anhydride is calculated based on, for example, the peak area value of LC-MS measurement relative to the unit gram mass of the negative electrode active material. The amount of the decomposition product of the acid anhydride (content of at least one compound selected from the group consisting of compounds represented by the following general formulas (8) to (13)) is preferably within a range of 0.1 to 300, more preferably 1 to 200, and still more preferably 20 to 150, in terms of the peak area value as the amount per 1 μg of the negative electrode active material. When the peak area value is within this range, it is possible to ensure a balance between inhibition of increase in film resistance and solubility. It is preferable that the above content is satisfied within a range of up to 100 cycles of repeating charging and discharging.

It is preferable that the decomposition product of the acid anhydride preferably contains at least one compound selected from the group consisting of the following general formula (8):

[Chemical Formula 24]

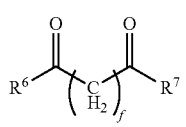

(8)

wherein $R^6$ and $R^7$ represent an alkoxy group which may be substituted with a halogen atom, an OH group or an OLi group, and f is an integer of 1 to 3, the following general formula (9):

[Chemical Formula 25]

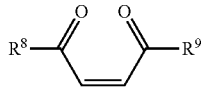

(9)

wherein $R^8$ and $R^9$ represent an alkoxy group which may be substituted with a halogen atom, an OH group or an OLi group, the following general formula (10):

[Chemical Formula 26]

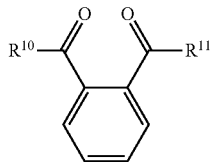

(10)

wherein $R^{10}$ and $R^{11}$ represent an alkoxy group which may be substituted with a halogen atom, an OH group or an OLi group, the following general formula (11):

[Chemical Formula 27]

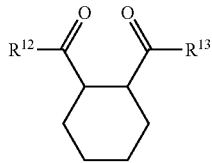

(11)

wherein $R^{12}$ and $R^{13}$ represent an alkoxy group which may be substituted with a halogen atom, an OH group or an OLi group, the following general formula (12):

[Chemical Formula 28]

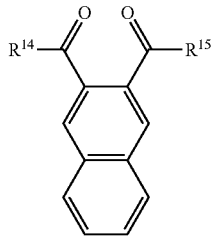

(12)

wherein $R^{14}$ and $R^{15}$ represent an alkoxy group which may be substituted with a halogen atom, an OH group or an OLi group, and the following general formula (13):

[Chemical Formula 29]

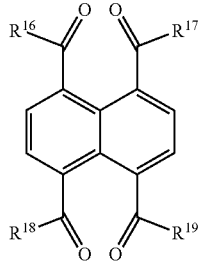

(13)

wherein $R^{16}$ to $R^{19}$ represent an alkoxy group which may be substituted with a halogen atom, an OH group or an OLi group. The "halogen atom" in the description of the general formulas (8) to (13) may contain an F atom.

These compounds contribute to the enhancement of SEI on a surface of the negative electrode. In particular, when acetonitrile is contained as the nonaqueous solvent, an excellent effect is exerted. Therefore, it is preferable to prevent the acid anhydride from being unnecessarily consumed on the positive electrode side.

<Separator>

It is preferable that the nonaqueous secondary battery according to the present embodiment is provided with a separator between a positive electrode and a negative electrode from the viewpoint of preventing short circuits between the positive electrode and the negative electrode and imparting safety such as shutdown. As the separator, the same one as which provided in a known nonaqueous secondary battery may be used, and an insulating thin film having high ionic permeability and excellent mechanical strength is preferable. Examples of the material constituting the separator include a woven fabric, a non-woven fabric, a microporous membrane made of a synthetic resin and the like. Of these, a microporous membrane made of a synthetic resin is preferable, and especially a polyolefin-based microporous membrane such as a microporous membrane containing polyethylene or polypropylene as a main component, or a microporous membrane containing both of these polyolefins is preferably used. Examples of the non-woven fabric include porous films made of heat-resistant resins such as glass, ceramic, polyolefin, polyester, polyamide, liquid crystal polyester and aramid.

The separator may be formed by laminating a single layer or laminated from a plurality of layers of one type of microporous membrane, or laminated from a plurality of layers of two or more types of microporous membrane. The separator may be formed by laminating a single layer or laminated from a mixed resin material obtained by melt-kneading two or more types of resin materials.

Inorganic particles may be present on a surface layer or the inside of the separator for the purpose of imparting a predetermined function to the separator, and other organic layers may be further formed or laminated on the separator. The separator may have a crosslinked structure. In order to improve the safety performance of the nonaqueous secondary battery, these methods may be combined as necessary.

Inorganic particles may be present on the surface layer or inside of the separator for the purpose of imparting a predetermined function to the separator, and another organic layer may be further coated or laminated on the separator.

Further, the separator may include a crosslinked structure. In order to improve the safety performance of the nonaqueous secondary battery, these methods may be combined as necessary.

The separator 170 may be formed by laminating a single layer or laminated from a plurality of layers of one type of microporous membrane, or laminated from a plurality of layers of two or more types of microporous membrane. The separator 170 may be formed by laminating a single layer or laminated from a mixed resin material obtained by melt-kneading two or more types of resin materials.

The thickness of the separator is preferably 1 µm or more from the viewpoint of the film strength, and preferably 500 µm or less from the viewpoint of permeability. From the viewpoint of relatively high calorific value and use for high output applications, and from the viewpoint of winding properties by a large battery winding machine, the thickness is preferably 3 µm or more and 40 µm or less, and more preferably 10 µm or more and 25 µm or less. When the achievement of both short-circuit resistance and output performance are emphasized, the thickness is more preferably 15 µm or more and 25 µm or less, but when the achievement of both high energy density and output performance are emphasized, the thickness is more preferably 10 µm or more and less than 15 µm.

The porosity is preferably 30% or more and 90% or less, more preferably 35% or more and 80% or less, and still more preferably 40% or more and 70% or less, from the viewpoint of following rapid movement of lithium ions at the time of high output. When priority is given to an improvement in output performance while ensuring the safety, the porosity is particularly preferably 50% or more and 70% or less, and when the achievement of both short-circuit resistance and output performance is emphasized, the porosity is particularly preferably 40% or more and less than 50%.

From the viewpoint of a balance between the thickness and the porosity, the air permeability is preferably 1 second/100 cm$^3$ or more and 400 seconds/100 cm$^3$ or less, and more preferably 100 seconds/100 cm$^3$ or more and 350 seconds/100 cm$^3$. When the achievement of both short-circuit resistance and output performance is emphasized, the air permeability is preferably 150 seconds/100 cm$^3$ or more and 350 seconds/100 cm$^3$ or less, and when priority is given to an improvement in output performance while ensuring the safety, the air permeability is particularly preferably 100 seconds/100 cm$^3$ or more and less than 150 seconds/100 cm$^3$.

Meanwhile, when a nonaqueous electrolyte solution having low ionic conductivity and a separator within the above range are combined, the movement speed of lithium ions is not controlled by the structure of the separator, but high ionic conductivity of the nonaqueous electrolyte solution, thus failing to obtain expected input/output characteristics. Therefore, the ionic conductivity of the nonaqueous electrolyte solution is preferably 10 mS/cm or more, more preferably 15 mS/cm, and still more preferably 20 mS/cm.

However, each of thickness, air permeability and porosity of the separator and the ionic conductivity of the nonaqueous electrolyte solution is an example.

Inorganic particles may be present on a surface layer or the inside of the separator for the purpose of imparting a predetermined function to the separator, and other organic layers may be further formed or laminated on the separator. The separator may have a crosslinked structure.

In order to improve the safety performance of the nonaqueous secondary battery, these methods may be combined as necessary.

<Battery Outer Package>

It is possible to employ, as the configuration of the battery outer package of the nonaqueous secondary battery in the present embodiment, a known configuration. For example, a battery can or a laminated film outer package body may be used as the battery outer package.

It is possible to use, as the battery can, for example, a metal can made of steel, stainless steel, aluminum or a clad material.

The laminated film outer package body can be used as an outer package body in a state where two sheets are laminated with the hot melt resin side facing inward, or bent so that the heat-melted resin side faces inward, and then the end is sealed by heat sealing. When the laminated film outer package body is used, a positive electrode lead body (or a lead tab connected to a positive electrode terminal and a positive electrode terminal) may be connected to a positive electrode current collector, and a negative electrode lead body (or a negative electrode terminal and a negative electrode terminal) may be connected to a negative electrode current collector. In this case, the laminated film outer body may be sealed in a state where the ends of the positive electrode lead body and the negative electrode lead body (or lead tabs connected to the positive electrode terminal and the negative electrode terminal respectively) are pulled out to the outside of the battery outer package body.

It is possible to use, as the laminated film outer package body, for example, a laminate film having a three-layered structure of a heat-melted resin/metal film/resin.

The aluminum laminate film constituting the battery outer package 110 is preferably a film in which both sides of the aluminum foil are coated with a polyolefin-based resin.

<Shape of Nonaqueous Secondary Battery>

The shape of the nonaqueous secondary battery according to the present embodiment can be applied to, for example, a square-type, a square cylinder-type, a cylindrical-type, an elliptical-type, a button-type, a coin-type, a flat-type, a laminated-type and the like.

The nonaqueous secondary battery according to the present embodiment can be particularly preferably applied to a square-type, a square cylinder-type and a laminate-type.

<Method for Producing Nonaqueous Secondary Battery>

The nonaqueous secondary battery according to the present embodiment can be fabricated by a known method using the above-mentioned nonaqueous electrolyte solution, positive electrode, negative electrode, separator and battery outer package.

First, a laminate composed of a positive electrode, a negative electrode and a separator is formed.

At this time, for example, it is possible to employ:
- a mode in which a long positive electrode and negative electrode are wound in a laminated state where a long separator is interposed into these gaps to form a laminated body having a wound structure;
- a mode in which a positive electrode sheet and a negative electrode sheet obtained by cutting into a plurality of sheets having the same area and shape are alternately laminated via a separator sheet to form a laminated body; and
- a mode in which a long separator is folded into a spiral, and a cathode sheet and an anode sheet are alternately inserted into the gaps between the spiral separators to form a laminated body having a laminated structure.

Next, the above laminated body is housed in the battery outer package and the nonaqueous electrolyte solution according to the present embodiment is injected into the battery outer package, and then the laminated body is immersed in the nonaqueous electrolyte solution, followed by sealing, thus enabling the production of the nonaqueous secondary battery according to the embodiment.

Alternatively, a nonaqueous secondary battery may be fabricated by impregnating a base material made of a polymer material with the nonaqueous electrolyte solution according to the present embodiment to fabricate an electrolyte membrane in a gel state in advance, forming a laminated body having a laminated structure using a sheet positive electrode and negative electrode, an electrolyte film thus obtained, and a separator, and housing the laminated body in a battery outer package.

It should be noted that the arrangement of the electrodes is designed such that when there is a portion where the outer peripheral edge of the negative electrode active material layer and the outer peripheral edge of the positive electrode active material layer overlap, or there is a portion having too small width in the non-opposing portion of the negative electrode active material layer, there is a possibility that electrode misalignment occurs during battery assembling. In this case, charging/discharging cycle characteristics of the nonaqueous secondary battery may deteriorate. In order to prevent such a situation, it is preferable to fix the position of the electrode in advance with tapes such as a polyimide tape, a polyphenylene sulfide tape, a PP tape, an adhesive and the like.

The nonaqueous secondary battery according to the present embodiment can function as a battery by initial charging, but is stabilized by partially decomposing the nonaqueous electrolyte solution at the time of initial charging. Initial charging is preferably carried out at 0.001 to 0.3 C, more preferably 0.002 to 0.25 C, and still more preferably 0.003 to 0.2 C. It is also possible to give preferable results by carrying out initial charging via constant voltage charging on the way. The constant current which discharges the design capacity in 1 hour is 1 C. By setting a long voltage range in which the lithium salt is involved in the electrochemical reaction, a stable and strong SEI is formed on a surface of the electrode, which exerts the effect of inhibiting an increase in internal resistance, and somehow exert satisfactory effect on members other than the negative electrode 160, such as the positive electrode 150 and the separator 170 without causing firm fixation of the reaction product to only the negative electrode 160. Therefore, it is remarkably effective to carry out initial charging in consideration of the electrochemical reaction of the lithium salt dissolved in the nonaqueous electrolyte solution.

The nonaqueous secondary battery according to the present embodiment can also be used as a battery pack in which a plurality of nonaqueous secondary batteries are connected in series or in parallel. From the viewpoint of controlling the charge/discharge state of the battery pack, the operating voltage range per battery pack is preferably 2 to 5 V, more preferably 2.5 to 5 V, and particularly preferably 2.75 V to 5 V.

While embodiments for carrying out the present invention have been described in detail above, the present invention is not limited to the following embodiments and various modifications can be made without departing from the scope of the present invention.

In particular, the present embodiment (hereinafter referred to as "Embodiment I") can be combined with at least one of the below-mentioned other Embodiments 1 to 5. That is, in the nonaqueous secondary battery according to Embodiment I, it is possible to add at least one of the respective specific additives mentioned below in other Embodiments 1 to 5 to the nonaqueous electrolyte solution.

Examples of the combination include:
Embodiment I and another Embodiment 1;
Embodiment I and other Embodiments 1 and 2;
Embodiment I and other Embodiments 1, 2 and 3;
Embodiment I and other Embodiments 1, 2 and 4;
Embodiment I and other Embodiments 1, 2 and 5;
Embodiment I and other Embodiments 1, 2, 3 and 4;
Embodiment I and other Embodiments 1, 2, 3 and 5;
Embodiment I and other Embodiments 1, 2, 3, 4 and 5;
Embodiment I and other Embodiments 1 and 3;
Embodiment I and other Embodiments 1, 3 and 4;
Embodiment I and other Embodiments 1, 3 and 5;
Embodiment I and other Embodiments 1, 3, 4 and 5;
Embodiment I and other Embodiments 1 and 4;
Embodiment I and other Embodiments 1, 4 and 5;
Embodiment I and other Embodiments 1 and 5;
Embodiment I and another Embodiment 2;
Embodiment I and other Embodiments 2 and 3;
Embodiment I and other Embodiments 2 and 4;
Embodiment I and other Embodiments 2 and 5;
Embodiment I and other Embodiments 2, 3 and 4;
Embodiment I and other Embodiments 2, 3 and 5;
Embodiment I and other Embodiments 2, 3, 4 and 5;
Embodiment I and other Embodiments 2, 4 and 5;
Embodiment I and another Embodiment 3;
Embodiment I and other Embodiments 3 and 4;
Embodiment I and other Embodiments 3 and 5;
Embodiment I and other Embodiments 3, 4 and 5;
Embodiment I and another Embodiment 4;
Embodiment I and other Embodiments 4 and 5; and
Embodiment I and another Embodiment 5.

By realizing such a combination, from the viewpoint of inhibiting the active point of the positive electrode active material which causes oxidative deterioration of the nonaqueous electrolyte solution, and from the viewpoint of inhibiting various deterioration phenomena associated with the volume change of the negative electrode in the case of repeating charging/discharging cycle when the Si material is applied to the negative electrode active material, there is a possibility that synergistic effect can be obtained.

Another Embodiment 1

The present embodiment relates to a nonaqueous secondary battery in which a nonaqueous electrolyte solution contains at least one nitric acid compound selected from the group consisting of a nitrate and a nitric acid ester.

Background Art and Problems Related to the Present Embodiment

In recent years, with the expansion of large-scale energy storage industry, especially in electric vehicles, there is a strong demand for higher energy density in nonaqueous secondary batteries, and research and development is also booming.

NPL 1 reports that the higher the Ni content of a layered rock salt type positive electrode active material, the higher the energy density.

However, in the nonaqueous secondary battery, while the energy density is improved, the long-term durability performance may be inferior. For example, NPL 2 refers to a peculiar deterioration factor, and mentions that the higher the Ni ratio, the lower the voltage and the more the deterioration progresses. NPL 3 reports a mechanism which induces the decomposition of a lithium salt triggered by the decomposition of a high dielectric constant solvent.

By the way, it is being studied to use, as the negative electrode active material, a Si material instead of a conventional carbon material. This is a result of focusing on the fact that the theoretical capacity of the Si material is larger than the theoretical capacity of the carbon material.

For example, when graphite is used as the negative electrode active material, the maximum amount of lithium storage and release per mol of carbon remains at ⅙ mol, and the theoretical capacity obtained from $LiC_6$, which is the maximum lithium-introduced compound, is 372 mAh/g. Meanwhile, when a Si material is used, for example, the maximum amount of lithium occluded and released per mol of Si is 3.75 mol, and the theoretical capacity obtained from $Li_{3.75}Si$ reaches 3,600 mAh/g.

[NPL 1] ACS Energy Lett., 2, 196-223 (2017).
[NPL 2] J. Power Sources, 233, 121-130 (2013).
[NPL 3] J. Phys. Chem. Lett., 8, 4820-4825 (2017).

However, these nonaqueous secondary batteries aiming at higher energy density may be inferior in long-term durability performance compared to existing nonaqueous secondary batteries, and both the electrolyte and the electrodes are required to have durability in a harsher environment.

The layered rock salt type positive electrode active material essentially has active sites which cause oxidative deterioration of the electrolyte solution. This active site may unintentionally consume the compound added to protect the negative electrode on the positive electrode side. The decomposition products of these additives taken in and deposited on the positive electrode side are likely to cause an increase in internal resistance of the nonaqueous secondary battery, and may also accelerate the deterioration of the lithium salt. Further, unintended consumption of these additives easily leads to insufficient protection of the negative electrode surface.

These phenomena supported by the results of disassembly analysis are not mentioned in NPLs 1 to 3.

Meanwhile, in the case of applying the Si material to the negative electrode active material, large volume change when the Si material occludes and releases Li ions may be a problem.

For example, the volume change when the graphite material occludes and releases Li ions remains at about 1.2 times at most, whereas the Si material can cause large volume change of about 4 times. Therefore, the battery may become mechanically fragile, and in particular, the cycle life of the negative electrode may become insufficient, leading to high hurdle for practical use.

Operational Advantage Related to the Present Embodiment

According to the present embodiment, first, there are provided a nonaqueous electrolyte solution which is capable of inhibiting active sites which cause oxidative deterioration of the electrolyte solution, exhibiting excellent load characteristics, and inhibiting various deterioration phenomena when high-temperature storage or charging/discharging cycle is repeated, and a nonaqueous secondary battery.

According to the present embodiment, second, there are provided a nonaqueous electrolyte solution which is capable of inhibiting various deterioration phenomena associated with the volume change of the negative electrode in the case of repeating charging/discharging cycle when the Si material is applied to the negative electrode active material, and a nonaqueous secondary battery.

<First Specific Additive>

In the present embodiment, the nitric acid compound contained in the nonaqueous electrolyte solution is preferably one or more selected from the group consisting of a nitrate represented by, for example, the following formula (N1):

[Chemical Formula 30]

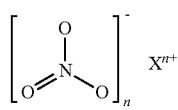

(N1)

wherein, in the formula (N1), $X^{n+}$ is metal cation or organic cation, and n is a valence of X, and a nitric acid ester represented by the following formula (N2):

[Chemical Formula 31]

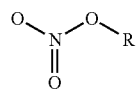

(N2)

wherein, in the formula (N2), R is a hydrogen atom, a substituted or unsubstituted alkyl group having 1 to 20 carbon atoms, a substituted or unsubstituted alkoxy group having 1 to 20 carbon atoms, a substituted or unsubstituted alkenyl group having 2 to 20 carbon atoms, a substituted or unsubstituted alkenoxy group having 2 to 20 carbon atoms, a substituted or unsubstituted alkynyl group having 2 to 20 carbon atoms, a substituted or unsubstituted alkynoxy group having 2 to 20 carbon atoms, a substituted or unsubstituted aryl group having 5 to 20 carbon atoms, a substituted or unsubstituted aryloxy group having 5 to 20 carbon atoms, hydride ions, a halogen atom, a hydroxyl group, a thio group, an iminyl group, a carboxy group, an alkylcarbonyloxy group, an alkenylcarbonyloxy group, an alkynylcarbonyloxy group, an arylcarbonyloxy group, an alkylthio group, an alkenylthio group, an alkynylthio group, an arylthio group, a cyano group, an N-substituted amino group, an alkylcarbonylamino group, an N-substituted alkylcarbonylamino group, an alkenylcarbonylamino group, an N-substituted alkenylcarbonylamino group, an alkynylcarbonylamino group, an N-substituted alkynylcarbonylamino group, an arylcarbonylamino group, an N-substituted arylcarbonylamino group, a group containing a boron atom, a group containing an aluminum atom, a group containing a silicon atom, a group containing a phosphorus atom, or a group containing a sulfur atom.

Hereinafter, such a nitric acid compound is sometimes referred to as "first specific additive" in the present description.

In the nitrate of the above formula (N1), the metal cation of $X^{n+}$ is preferably metal cation selected from alkali metal, alkaline earth metal and transition metal, and specifically, examples of the alkali metal cation include lithium ions, cesium ions and the like; examples of the alkaline earth metal cation include magnesium ions and the like; and examples of the transition metal cation include aluminum ions and the like.

Examples of the organic cation of $X^{n+}$ include tetraalkylammonium ions and the like, and tetramethylammonium ions are preferable. One or more of methyl groups of the tetramethylammonium ions may be substituted with an organic group other than the methyl group. The substituent in this case may be selected from, for example, a substituted or unsubstituted alkyl group having 1 to 20 carbon atoms, a substituted or unsubstituted alkoxy group having 1 to 20 carbon atoms, a substituted or unsubstituted alkenyl group having 2 to 20 carbon atoms, a substituted or unsubstituted alkenoxy group having 2 to 20 carbon atoms, a substituted or unsubstituted alkynyl group having 2 to 20 carbon atoms, a substituted or unsubstituted alkynoxy group having 2 to 20 carbon atoms, a substituted or unsubstituted aryl group having 5 to 20 carbon atoms, a substituted or unsubstituted aryloxy group having 5 to 20 carbon atoms, hydride ions, an halogen atom, a hydroxyl group, a thio group, an iminyl group, a carboxy group, an alkylcarbonyloxy group, an alkenylcarbonyloxy group, an alkynylcarbonyloxy group, an arylcarbonyloxy group, an alkylthio group, an alkenylthio group, an alkynylthio group, an arylthio group, an cyano group, an N-substituted amino group, an alkylcarbonylamino group, an N-substituted alkylcarbonylamino group, an alkenylcarbonylamino group, an N-substituted alkenylcarbonylamino group, an alkynylcarbonylamino group, an N-substituted alkynylcarbonylamino group, an arylcarbonylamino group, an N-substituted arylcarbonylamino group, a group containing a boron atom, a group containing an aluminum atom, a group containing a silicon atom, a group containing a phosphorus atom, a group containing a sulfur atom and the like.

The nitric acid ester of the above formula (N2) is preferably isobutyl nitrate represented by the following formula (N3):

[Chemical Formula 32]

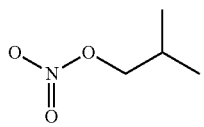

(N3)

A nitric acid ester in which the isobutyl group of isobutyl nitrate is substituted with other lower alkyl groups (for example, a methyl group, an ethyl group, an n-propyl group, an i-propyl group, an n-butyl group, a sec-butyl group or a t-butyl group) is also included in a preferred embodiment of the present invention.

The nitric acid compound contained in the nonaqueous electrolyte solution is more preferably at least one selected from the group consisting of lithium nitrate, sodium nitrate, cesium nitrate, aluminum nitrate, magnesium nitrate, isobutyl nitrate, tetramethylammonium nitrate and tetraethylammonium nitrate.

(Amount of First Specific Additive Used)

The amount of the first specific additive (nitric acid compound) contained in the nonaqueous electrolyte solution is optional, but may be set at, for example, 0.01 part by weight or more and 10.0 part by weight or less based on 100 parts by weight of the nonaqueous electrolyte solution. When the amount of the nitric acid compound is 0.01 part by weight or more based on 100 parts by weight of the nonaqueous electrolyte solution, the mechanical strength of SEI generated on the negative electrode becomes sufficiently high, thus making it possible to obtain a nonaqueous secondary battery which is excellent in cycle characteristics and is capable of stably operating for a long period of time. Meanwhile, when the amount of the nitric acid compound is 10.0 parts by weight or less based on 100 parts by weight of the nonaqueous electrolyte solution, it is possible to obtain a nonaqueous secondary battery which is excellent in output characteristics without excessively inhibiting the lithium ion conduction of the electrolyte. The amount of the nitric acid compound contained in the nonaqueous electrolyte solution may be 0.05 part by weight or more and 5.0 parts by weight or less, 0.1 part by weight or more and 4.0 parts by weight or less, or 0.2 part by weight or more and 3.0 parts by weight or less, based on 100 parts by weight of the nonaqueous electrolyte solution.

<Method for Producing Nonaqueous Electrolyte Solution>

The nonaqueous electrolyte solution can be produced by mixing a nonaqueous solvent, a lithium salt, a first specific additive (nitric acid compound), and various additives as necessary by any means.

Another Embodiment 2

The present embodiment relates to a nonaqueous secondary battery in which the nonaqueous electrolyte solution contains at least one additive selected from the group consisting of a polymer compound including a repeating unit represented by any one of the following general formula (P1):

[Chemical Formula 33]

(P1)

wherein $R_1$ is a hydrogen atom or an alkyl group, the following general formula (P2):

[Chemical Formula 34]

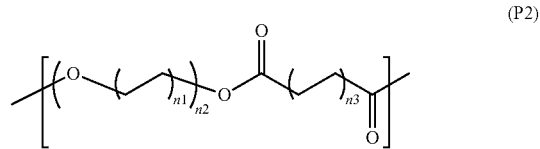

(P2)

wherein n1 to n3 are the number of repeating units and each independently represent an integer of 0 to 4, the following general formula (P3):

[Chemical Formula 35]

(P3)

wherein $R_2$ is an alkyl group having 1 to 20 carbon atoms or a fluoroalkyl group having 1 to 20 carbon atoms, and the following general formula (P4):

[Chemical Formula 36]

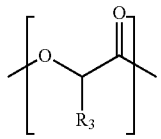

(P4)

wherein $R_3$ is a hydrogen atom or an alkyl group having 1 to 20 carbon atoms, and a carboxylic acid ester compound.

Background Art and Problems Related to the Present Embodiment

In recent years, with the expansion of large-scale energy storage industry, especially in electric vehicles, there is a strong demand for higher energy density in nonaqueous secondary batteries, and research and development is also booming.

NPL 1 reports that the higher the Ni content of a layered rock salt type positive electrode active material, the higher the energy density.

However, in the nonaqueous secondary battery, while the energy density is improved, the long-term durability performance may be inferior. For example, NPL 2 refers to a peculiar deterioration factor, and mentions that the higher the Ni ratio, the lower the voltage and the more the deterioration progresses. NPL 3 reports a mechanism which induces the decomposition of a lithium salt triggered by the decomposition of a high dielectric constant solvent.

By the way, it is being studied to use, as the negative electrode active material, a Si material instead of a conventional carbon material. This is a result of focusing on the fact that the theoretical capacity of the Si material is larger than the theoretical capacity of the carbon material.

For example, when graphite is used as the negative electrode active material, the maximum amount of lithium occlusion and release per mol of carbon remains at ⅙ mol, and the theoretical capacity obtained from $LiC_6$, which is the maximum lithium-introduced compound, is 372 mAh/g. Meanwhile, when a Si material is used, for example, the maximum amount of lithium occluded and released per mol of Si is 3.75 mol, and the theoretical capacity obtained from $Li_{3.75}Si$ reaches 3,600 mAh/g.

[NPL 1] ACS Energy Lett., 2, 196-223 (2017).
[NPL 2] J. Power Sources, 233, 121-130 (2013).
[NPL 3] J. Phys. Chem. Lett., 8, 4820-4825 (2017).

However, these nonaqueous secondary batteries aiming at higher energy density may be inferior in long-term durability performance compared to existing nonaqueous secondary batteries, and both the electrolyte and the electrodes are required to have durability in a harsher environment.

The layered rock salt type positive electrode active material essentially has active sites which cause oxidative deterioration of the electrolyte solution. This active site may unintentionally consume the compound added to protect the negative electrode on the positive electrode side. The decomposition products of these additives taken in and deposited on the positive electrode side are likely to cause an increase in internal resistance of the nonaqueous secondary battery, and may also accelerate the deterioration of the lithium salt. Further, unintended consumption of these additives easily leads to insufficient protection of the negative electrode surface.

These phenomena supported by the results of disassembly analysis are not mentioned in NPLs 1 to 3.

Although the capacity of nonaqueous secondary batteries is improved when used in a high-temperature environment, there is a possibility that the capacity rapidly decreases when charging/discharging cycle is repeated to cause such a problem that the battery life gets worse.

Further, since it is advantageous that the operating voltage of the secondary battery is high, a search for a nonaqueous secondary battery capable of operating at a high voltage is carried out. However, when a secondary battery using a common nonaqueous solvent is operated at a high voltage, the battery performance may rapidly deteriorate due to repeated charging/discharging cycle.

Meanwhile, in the case of applying the Si material to the negative electrode active material, large volume change when the Si material occludes and releases Li ions may be a problem.

For example, the volume change when the graphite material occludes and releases Li ions remains at about 1.2 times at most, whereas the Si material can cause large volume change of about 4 times. Therefore, the battery may become mechanically fragile, and in particular, the cycle life of the negative electrode may become insufficient, leading to high hurdle for practical use.

Operational Advantage Related to the Present Embodiment

According to the present embodiment, first, there are provided a nonaqueous electrolyte solution which is capable of inhibiting active sites which cause oxidative deterioration of the electrolyte solution, exhibiting excellent load characteristics, and inhibiting various deterioration phenomena when high-temperature storage or charging/discharging cycle is repeated, and is excellent in high-temperature characteristics and is capable of high-voltage operation, and a nonaqueous secondary battery.

According to the present embodiment, second, there are provided a nonaqueous electrolyte solution which is capable of inhibiting various deterioration phenomena associated with the volume change of the negative electrode in the case of repeating charging/discharging cycle when the Si material is applied to the negative electrode active material, and a nonaqueous secondary battery.

<Second Specific Additive>

The nonaqueous electrolyte solution of the present embodiment contains, as an additive, at least one selected from the group consisting of a polymer compound including a repeating unit represented by any one of the following general formulas (P1) to (P4):

[Chemical Formula 37]

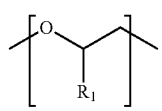

(P1)

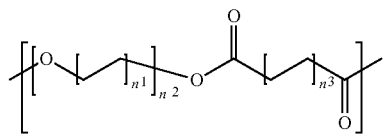

(P2)

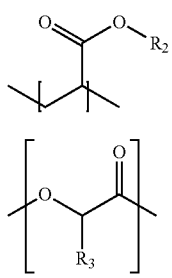

wherein, $R_1$ in the formula (P1) is a hydrogen atom or an alkyl group, n1 to n3 in the formula (P2) are the number of repeating units and each independently represent an integer of 0 to 4, $R_2$ in the formula (P3) is an alkyl group having 1 to 20 carbon atoms or a fluoroalkyl group having 1 to 20 carbon atoms, and $R_3$ in the formula (P4) is a hydrogen atom or an alkyl group having 1 to 20 carbon atoms, and a carboxylic acid ester compound.

Hereinafter, such an additive is sometimes referred to as "second specific additive" in the present description.

(Polymer Compound)

The polymer compound as the second specific additive is a polymer compound including a repeating unit represented by any of the above formulas (P1) to (P4). The terminal of the polymeric compound may be blocked, for example, with a hydrogen atom, a substituted or unsubstituted alkyl group, or a substituted or unsubstituted acrylate. A blocking group is preferably a substituted or unsubstituted acrylate represented by the following formula:

[Chemical Formula 38]

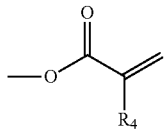

wherein $R_4$ is a hydrogen atom or a substituted or unsubstituted alkyl group, and particularly preferably an acrylate or a methacrylate.

Examples of the polymer compound including a repeating unit represented by the above formula (P1) include polyethylene glycol methyl ether acrylate and polypropylene glycol acrylate.

Examples of the polymer compound including a repeating unit represented by the above formula (P2) include polyethylene adipate (n1=1, n2=1, n3=2) and poly {di(ethylene glycol)adipate} (n1=1, n2=2, n3=2), poly(1,2-butylene adipate) (n1=2, n2=1, n3=2), poly(1,4-butylene adipate) (n1=2, n2=1, n3=2), poly(ethylene)succinate (n1=1, n2=1, n3=1) and the like.

Examples of the polymer compound including a repeating unit represented by the above formula (P3) include poly(2,2,2-trifluoroethyl acrylate) and the like.

Examples of the polymer compound including a repeating unit represented by the above formula (P4) include acrylate-blocked poly(L-lactic acid), 2-carboxyethyl acrylate oligomer and the like.

The molecular weight of the polymer compound as the second specific additive is optional. However, as a reference value, a polystyrene-equivalent weight-average molecular weight Mw measured by gel permeation chromatography (GPC) for a polymer compound is a molecular weight within a range of 1,000 or more and 150,000 or less.

(Carboxylic Acid Ester Compound)

The carboxylic acid ester compound as the second specific additive may be an organic carboxylic acid (for example, an alkyl ester such as oxalic acid, acrylic acid, methacrylic acid, etc.). The alkyl group may be linear or branched, or may have a cyclic structure, or may be interrupted by an oxygen atom in the middle, or may have a substituent such as a silyl group.

Examples of the carboxylic acid ester compound include an oxalic acid ester, for example, di-t-butyl oxalate and the like.

Examples of the acrylic acid ester include ethylene glycol methyl ether acrylate, diethylene glycol ethyl ether acrylate, 2-ethylhexyl acrylate, ethyl acrylate, n-butyl acrylate, t-butyl acrylate, trimethylsilyl acrylate, ethyl-2-(trimethylsilylmethyl)acrylate, 2,2,2-trifluoroethyl acrylate, 1,1,1,3,3,3-hexafluoroisopropyl acrylate, vinyl acrylate, propargyl acrylate, methyl acrylate and the like.

Examples of the methacrylic acid ester include methyl methacrylate, n-butyl methacrylate, t-butyl methacrylate, 2-ethylhexyl methacrylate, 2,2,2-trifluoroethyl methacrylate, trimethylsilyl methacrylate, 3-(trimethoxysilyl)propyl methacrylate, 3-(trimethylsiloxy)silylpropylene methacrylate, 3-{tris(trimethylsiloxy)silyl}propylene methacrylate and the like.

(Preferable Second Specific Additive)

From the viewpoint of being capable of improving cycle characteristics, long-term stability and the like without impairing other performances of the nonaqueous secondary battery, the second specific additive is preferably an additive having an acrylic group, an adipic acid-derived skeleton or a succinic acid-derived skeleton, and more preferably at least one selected from the group consisting of polyethylene glycol methyl ether acrylate, polypropylene glycol acrylate, polyethylene adipate, poly{di(ethylene glycol)adipate}, poly(1,2-butylene adipate), poly(ethylene)succinate, poly(2,2,2-trifluoroethyl acrylate), acrylate-blocked poly(L-lactic acid), 2-carboxyethyl acrylate oligomer, ethylene glycol methyl ether acrylate, diethylene glycol ethyl ether acrylate, 2-ethylhexyl acrylate and n-butyl acrylate.

(Amount of Second Specific Additive Used)

The amount of the second specific additive contained in the nonaqueous electrolyte solution is optional, but may be set at, for example, 0.01 part by weight and 10.0 parts by weight or less based on 100 parts by weight of the nonaqueous electrolyte solution. When the amount of the specific additive is 0.01 part by weight or more based on 100 parts by weight of the nonaqueous electrolyte solution, the mechanical strength of SEI generated on the negative electrode becomes sufficiently high, thus making it possible to obtain a nonaqueous secondary battery which is excellent in cycle characteristics even under high-temperature and high-voltage conditions and is capable of stably operating for a long period of time. Meanwhile, when the amount of the specific additive is 10.0 parts by weight or less based on 100 parts by weight of the nonaqueous electrolyte solution, it is possible to obtain a nonaqueous secondary battery which is excellent in output characteristics without excessively inhibiting the lithium ion conduction of the electrolyte. The amount of the specific additive contained in the nonaqueous electrolyte solution may be 0.05 part by weight or more and 5.0 parts by weight or less, 0.1 part by weight or more and 4.0 parts by weight or less, or 0.2 part by weight or more and 3.0 parts by weight or less, based on 100 parts by weight of the nonaqueous electrolyte solution.

<Method for Producing Nonaqueous Electrolyte Solution>

The nonaqueous electrolyte solution can be produced by mixing a nonaqueous solvent, a lithium salt, a second specific additive, and other additives as necessary by any means.

Another Embodiment 3

The present embodiment relates to a nonaqueous secondary battery in which a nonaqueous electrolyte solution contains at least one additive selected from the group consisting of an organometal hydride and a dicarbonate compound.

Background Art and Problems Related to the Present Embodiment

In recent years, with the expansion of large-scale energy storage industry, especially in electric vehicles, there is a strong demand for higher energy density in nonaqueous secondary batteries, and research and development is also booming.

NPL 1 reports that the higher the Ni content of a layered rock salt type positive electrode active material, the higher the energy density.

However, in the nonaqueous secondary battery, while the energy density is improved, the long-term durability performance may be inferior. For example, NPL 2 refers to a peculiar deterioration factor, and mentions that the higher the Ni ratio, the lower the voltage and the more the deterioration progresses. NPL 3 reports a mechanism which induces the decomposition of a lithium salt triggered by the decomposition of a high dielectric constant solvent.

By the way, it is being studied to use, as the negative electrode active material, a Si material instead of a conventional carbon material. This is a result of focusing on the fact that the theoretical capacity of the Si material is larger than the theoretical capacity of the carbon material.

For example, when graphite is used as the negative electrode active material, the maximum amount of lithium occlusion and release per mol of carbon remains at ⅙ mol, and the theoretical capacity obtained from $LiC_6$, which is the maximum lithium-introduced compound, is 372 mAh/g. Meanwhile, when a Si material is used, for example, the maximum amount of lithium occluded and released per mol of Si is 3.75 mol, and the theoretical capacity obtained from $Li_{3.75}Si$ reaches 3,600 mAh/g.

[NPL 1] ACS Energy Lett., 2, 196-223 (2017).
[NPL 2] J. Power Sources, 233, 121-130 (2013).
[NPL 3] J. Phys. Chem. Lett., 8, 4820-4825 (2017).

However, these nonaqueous secondary batteries aiming at higher energy density may be inferior in long-term durability performance compared to existing nonaqueous secondary batteries, and both the electrolyte and the electrodes are required to have durability in a harsher environment.

The layered rock salt type positive electrode active material essentially has active sites which cause oxidative deterioration of the electrolyte solution. This active site may unintentionally consume the compound added to protect the negative electrode on the positive electrode side. The decomposition products of these additives taken in and deposited on the positive electrode side are likely to cause an increase in internal resistance of the nonaqueous secondary battery, and may also accelerate the deterioration of the lithium salt. Further, unintended consumption of these additives easily leads to insufficient protection of the negative electrode surface.

These phenomena supported by the results of disassembly analysis are not mentioned in NPLs 1 to 3.

Meanwhile, in the case of applying the Si material to the negative electrode active material, large volume change when the Si material occludes and releases Li ions may be a problem.

For example, the volume change when the graphite material occludes and releases Li ions remains at about 1.2 times at most, whereas the Si material can cause large volume change of about 4 times. Therefore, the battery may become mechanically fragile, and in particular, the cycle life of the negative electrode may become insufficient, leading to high hurdle for practical use.

Operational Advantage Related to the Present Embodiment

According to the present embodiment, first, there are provided a nonaqueous electrolyte solution which is capable of inhibiting active sites which cause oxidative deterioration of the electrolyte solution, exhibiting excellent load characteristics, and inhibiting various deterioration phenomena when high-temperature storage or charging/discharging cycle is repeated, and a nonaqueous secondary battery.

According to the present embodiment, second, there are provided a nonaqueous electrolyte solution which is capable of inhibiting various deterioration phenomena associated with the volume change of the negative electrode in the case of repeating charging/discharging cycle when the Si material is applied to the negative electrode active material, and a nonaqueous secondary battery.

<Third Specific Additive>

The nonaqueous electrolyte solution of the present embodiment contains at least one additive selected from the group consisting of an organometal hydride and a dicarbonate compound.

Hereinafter, at least one additive selected from the group consisting of the organometal hydride and the dicarbonate compound is hereinafter also referred to as "third specific additive" in the present description.

(Organometal Hydride)

In the organometal hydride as the third specific additive, a central metal may be, for example, a metalloid such as boron or silicon, or for example, a post-transition metal such as tin. The organometal hydride may further contain metals selected from metals, metalloids and post-transition metals other than the central metal.

Examples of the organometal hydride in which the central metal is boron include sodium cyanoborohydride ($Na^+\cdot[HBCN]^-$) and sodium tris(1,1,1,3,3,3-hexafluoroisopropyl)borohydride ($Na^+\cdot[HB(OCH(CF_3)_2)_3]^-$) and the like. These organometal hydrides are anion-cationic pairs.

Examples of the organometal hydride in which the central metal is silicon include phenylsilane ($H_3SiC_6H_5$) and 10-undecenylsilane ($H_3Si(CH_2)_9CH=CH_2$). These organometal hydrides are molecular.

Examples of the organometal hydride in which the central metal is tin include tri-n-butyltin hydride ($HSn((CH_2)_3CH_3)_3$) and the like.

(Dicarbonate Compound)

The dicarbonate compound as the third specific additive may be, for example, a compound represented by the following formula (C1):

[Chemical Formula 39]

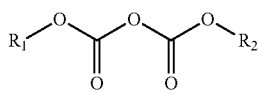

(C1)

wherein, in the formula (C1), $R_1$ and $R_2$ each independently represent a hydrogen atom, a substituted or unsubstituted alkyl group having 1 to 20 carbon atoms, a substituted or unsubstituted alkenyl group having 2 to 20 carbon atoms, a substituted or unsubstituted alkynyl group having 2 to 20 carbon atoms, a substituted or unsubstituted aryl group having 5 to 20 carbon atoms, hydride ions, a halogen atom, a hydroxyl group, a thio group, an iminyl group, a carboxy group, an alkylcarbonyloxy group, a cyano group, an N-substituted amino group, an alkylcarbonylamino group, an N-substituted alkylcarbonylamino group, an alkenylcarbonylamino group, an N-substituted alkenylcarbonylamino group, an alkynylcarbonylamino group, an N-substituted alkynylcarbonylamino group, an arylcarbonylamino group, an N-substituted arylcarbonylamino group, a group containing a boron atom, a group containing an aluminum atom, a group containing a silicon atom, a group containing a phosphorus atom, or a group containing a sulfur atom.

$R_1$ and $R_2$ in the above formula (C1) are each preferably an unsubstituted alkyl group, an unsubstituted alkenyl group or an unsubstituted aryl group.

The dicarbonate compound is preferably at least one selected from the group consisting of diallyl dicarbonate, dimethyl dicarbonate, diethyl dicarbonate and dibenzyl decarbonate.

(Amount of Third Specific Additive Used)

The amount of the third specific additive contained in the nonaqueous electrolyte solution is optional, but may be set at, for example, 0.01 part by weight and 10.0 parts by weight or less based on 100 parts by weight of the nonaqueous electrolyte solution. When the amount of the specific additive is 0.01 part by weight or more based on 100 parts by weight of the nonaqueous electrolyte solution, the mechanical strength of SEI generated on the negative electrode becomes sufficiently high, thus making it possible to obtain a nonaqueous secondary battery which is excellent in cycle characteristics and is capable of stably operating for a long period of time. Meanwhile, when the amount of the specific additive is 10.0 parts by weight or less based on 100 parts by weight of the nonaqueous electrolyte solution, it is possible to obtain a nonaqueous secondary battery which is excellent in output characteristics without excessively inhibiting the lithium ion conduction of the electrolyte. The amount of the specific additive contained in the nonaqueous electrolyte solution may be 0.05 part by weight or more and 5.0 parts by weight or less, 0.1 part by weight or more and 4.0 parts by weight or less, or 0.2 part by weight or more and 3.0 parts by weight or less, based on 100 parts by weight of the nonaqueous electrolyte solution.

<Method for Producing Nonaqueous Electrolyte Solution>

The nonaqueous electrolyte solution can be produced by mixing a nonaqueous solvent, a lithium salt, a third specific additive, and other additives as necessary by any means.

Another Embodiment 4

The present embodiment relates to a nonaqueous secondary battery in which the nonaqueous electrolyte solution contains a silyl group-containing additive.

Background Art and Problems Related to the Present Embodiment

In recent years, with the expansion of large-scale energy storage industry, especially in electric vehicles, there is a strong demand for higher energy density in nonaqueous secondary batteries, and research and development is also booming.

NPL 1 reports that the higher the Ni content of a layered rock salt type positive electrode active material, the higher the energy density.

However, in the nonaqueous secondary battery, while the energy density is improved, the long-term durability performance may be inferior. For example, NPL 2 refers to a peculiar deterioration factor, and mentions that the higher the Ni ratio, the lower the voltage and the more the deterioration progresses. NPL 3 reports a mechanism which induces the decomposition of a lithium salt triggered by the decomposition of a high dielectric constant solvent.

By the way, it is being studied to use, as the negative electrode active material, a Si material instead of a conventional carbon material. This is a result of focusing on the fact that the theoretical capacity of the Si material is larger than the theoretical capacity of the carbon material.

For example, when graphite is used as the negative electrode active material, the maximum amount of lithium occlusion and release per mol of carbon remains at ⅙ mol, and the theoretical capacity obtained from $LiC_6$, which is the maximum lithium-introduced compound, is 372 mAh/g. Meanwhile, when a Si material is used, for example, the maximum amount of lithium occluded and released per mol of Si is 3.75 mol, and the theoretical capacity obtained from $Li_{3.75}Si$ reaches 3,600 mAh/g.

[NPL 1] ACS Energy Lett., 2, 196-223 (2017).
[NPL 2] J. Power Sources, 233, 121-130 (2013).
[NPL 3] J. Phys. Chem. Lett., 8, 4820-4825 (2017).

However, these nonaqueous secondary batteries aiming at higher energy density may be inferior in long-term durability performance compared to existing nonaqueous secondary batteries, and both the electrolyte and the electrodes are required to have durability in a harsher environment.

The layered rock salt type positive electrode active material essentially has active sites which cause oxidative deterioration of the electrolyte solution. This active site may unintentionally consume the compound added to protect the negative electrode on the positive electrode side. The decomposition products of these additives taken in and deposited on the positive electrode side are likely to cause an increase in internal resistance of the nonaqueous secondary battery, and may also accelerate the deterioration of the lithium salt. Further, unintended consumption of these additives easily leads to insufficient protection of the negative electrode surface.

These phenomena supported by the results of disassembly analysis are not mentioned in NPLs 1 to 3.

In a nonaqueous secondary battery, there may be a problem that gas is gradually generated in the battery when charging and discharging are repeated. It is considered that this gas is generated by the decomposition of the components constituting the nonaqueous electrolyte solution on the electrodes. Therefore, there is a demand for a nonaqueous electrolyte solution in which decomposition of the nonaqueous electrolyte solution component on the electrode is inhibited during charging and discharging, and gas generation is reduced.

The nonaqueous secondary battery may cause problems such as a decrease in capacity when used in a low-temperature environment and deterioration of battery performance due to charging in a low-temperature environment, and improvement in low-temperature performance is required.

Further, since it is advantageous that the operating voltage of the secondary battery is high, a search for a nonaqueous secondary battery capable of high-voltage operation is carried out. However, when a secondary battery using a general nonaqueous solvent is operated at a high voltage, the battery performance may rapidly deteriorate due to repeated charging/discharging cycle.

Meanwhile, in the case of applying the Si material to the negative electrode active material, large volume change when the Si material occludes and releases Li ions may be a problem.

For example, the volume change when the graphite material occludes and releases Li ions remains at about 1.2 times at most, whereas the Si material can cause large volume change of about 4 times. Therefore, the battery may become mechanically fragile, and in particular, the cycle life of the negative electrode may become insufficient, leading to high hurdle for practical use.

Operational Advantage Related to the Present Embodiment

According to the present embodiment, first, there are provided a nonaqueous electrolyte solution which is capable of inhibiting active sites which cause oxidative deterioration of the electrolyte solution, exhibiting excellent load characteristics, and inhibiting various deterioration phenomena (especially, capacity decrease and gas generation) when charging/discharging cycle is repeated, and is excellent in low-temperature characteristics and is capable of high-voltage operation, and a nonaqueous secondary battery.

According to the present embodiment, second, there are provided a nonaqueous electrolyte solution which is capable of inhibiting various deterioration phenomena associated with the volume change of the negative electrode in the case of repeating charging/discharging cycle when the Si material is applied to the negative electrode active material, and a nonaqueous secondary battery.

<Fourth Specific Additive>

The nonaqueous electrolyte solution of the present embodiment contains a silyl group-containing additive.

The silyl group-containing additive in the present embodiment has the function of promoting the formation of SEI on the positive electrode of the nonaqueous secondary battery and inhibiting oxidative decomposition of the nonaqueous electrolyte solution.

Hereinafter, such a silyl group-containing additive is sometimes referred to as "fourth specific additive" in the present description.

Examples of preferable silyl group-containing additive includes at least one selected from the group consisting of a compound represented by the following formula (S1):

[Chemical Formula 40]

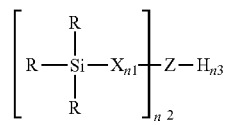

(S1)

wherein, in the formula (S1), R each independently represent a substituted or unsubstituted alkyl group having 1 to 20 carbon atoms, a substituted or unsubstituted alkenyl group having 2 to 20 carbon atoms, a substituted or unsubstituted alkynyl group having 2 to 20 carbon atoms, or a substituted or unsubstituted aryl group having 5 to 20 carbon atoms; X is O, S or NH; Z is P, P=O, B or Si; when Z is P or P=O, n1 is 1, n2 is an integer of 1 to 3, and n2+n3=3; when Z is B, n1 is 1, n2 is an integer of 1 to 3, and n2+n3=3; when Z is Si, n1 is 0, and n2 is an integer of 1 to 4, and n2+n3=4, and a polymer compound including a repeating unit represented by the following formula (S2):

[Chemical Formula 41]

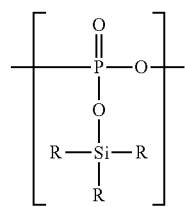

(S2)

wherein R in the formula (S2) has the same meaning as that of R in the formula (S1).

R in the above formula (S1) is preferably a substituted or unsubstituted alkyl group having 1 to 20 carbon atoms, more preferably an unsubstituted alkyl group having 1 to 20 carbon atoms or an alkyl group having 1 to 20 carbon atom substituted with a halogen atom, still more preferably an alkyl group having 1 to 6 or 1 to 4 carbon atoms, or a fluoroalkyl group having 1 to 6 or 1 to 4 carbon atoms, and particularly preferably a methyl group or a 2,2,2-trifluoroethyl group.

X is preferably an oxygen atom.

Specific examples of the compound in which Z is P in the above formula (S1) include tris(trimethylsilyl)phosphate and the like.

Specific examples of the compound in which Z is P=O include mono(trimethylsilyl)phosphite, tris(trimethylsilyl)phosphite and tris(2,2,2-trifluoroethyl)phosphite.

Specific examples of the compound in which Z is B include tris(trimethylsilyl)borate and tris(2,2,2-trifluoroethylsilyl)borate and the like.

Specific examples of the compound in which Z is Si include tris(trimethylsilyl)silane and the like.

Specific examples of the polymer compound including a repeating unit represented by the above formula (S2) include trimethylsilyl polyphosphate.

(Amount of Fourth Specific Additive Used)

The amount of the fourth specific additive (silyl group-containing additive) contained in the nonaqueous electrolyte solution is optional, but may be set at, for example, 0.01 part by weight or more and 10.0 part by weight or less based on 100 parts by weight of the nonaqueous electrolyte solution. When the amount of the silyl group-containing additive is 0.01 part by weight or more based on 100 parts by weight of the nonaqueous electrolyte solution, the mechanical strength of SEI generated on the negative electrode becomes sufficiently high, thus making it possible to obtain a nonaqueous secondary battery which inhibits the generation of gas associated with charging/discharging and is excellent in cycle characteristics, and is capable of stably operating for a long period of time. Meanwhile, when the amount of the silyl group-containing additive is 10.0 parts by weight or less based on 100 parts by weight of the nonaqueous electrolyte solution, it is possible to obtain a nonaqueous secondary battery which is excellent in output characteristics without excessively inhibiting the lithium ion conduction of the electrolyte. The amount of the silyl group-containing additive contained in the nonaqueous electrolyte solution may be 0.05 part by weight or more and 5.0 parts by weight or less, 0.1 part by weight or more and 4.0 parts by weight or less, or 0.2 part by weight or more and 3.0 parts by weight or less, based on 100 parts by weight of the nonaqueous electrolyte solution.

<Other Additives>

The nonaqueous electrolyte solution may contain other additives together with the silyl group-containing additive.

Examples of other additives contained in the nonaqueous electrolyte solution include a heterocyclic compound, an acid anhydride and the like.

(Heterocyclic Compound)

The heterocyclic compound has the function of forming a protective layer on a negative electrode active material layer and inhibiting the reductive decomposition of the nonaqueous electrolyte solution.

The heterocyclic compound may be a polycyclic compound, and may be preferably selected from a strained 3- to 7-membered ring compound and a spiro compound.

Specific examples of the heterocyclic compound include 1,3-propanesultone, 1-propene-1,3-sultone, 1,4-butanesultone, maleic anhydride, succinic anhydride, maleimide, ε-caprolactam, vinylene carbonate and the like, and it is preferable to use one or more selected from these compounds.

The heterocyclic compound is preferably a compound which has high reactivity with a nucleophilic species and radical anions and is capable of forming a uniform protective film (SEI), and from this point of view, a heterocyclic 5-membered ring compound is preferable, and specifically, it is particularly preferable to select and use 1,3-propanesultone, 1-propene-1,3-sultone, maleic anhydride and maleimide.

The amount of the heterocyclic compound contained in the nonaqueous electrolyte solution is optional, but may be, for example, 0.01 part by weight or more and 10.0 parts by weight or less based on 100 parts by weight of the nonaqueous electrolyte solution. The amount of the heterocyclic compound contained in the nonaqueous electrolyte solution may be 0.05 part by weight or more and 5.0 parts by weight or less, 0.1 part by weight or more and 4.0 parts by weight, or 0.2 part by weight or more and 3.0 parts by weight or less, based on 100 parts by weight of the nonaqueous electrolyte solution.

(Acid Anhydride)

The acid anhydride is as described above.

<Method for Producing Nonaqueous Electrolyte Solution>

The nonaqueous electrolyte solution can be produced by mixing a nonaqueous solvent, a lithium salt, a fourth specific additive (silyl group-containing additive), and other additives as necessary by any means.

Another Embodiment 5

The present embodiment relates to a nonaqueous secondary battery in which the nonaqueous electrolyte solution contains a boron atom-containing additive.

Background Art and Problems Related to the Present Embodiment

In recent years, with the expansion of large-scale energy storage industry, especially in electric vehicles, there is a strong demand for higher energy density in nonaqueous secondary batteries, and research and development is also booming.

NPL 1 reports that the higher the Ni content of a layered rock salt type positive electrode active material, the higher the energy density.

However, in the nonaqueous secondary battery, while the energy density is improved, the long-term durability performance may be inferior. For example, NPL 2 refers to a peculiar deterioration factor, and mentions that the higher the Ni ratio, the lower the voltage and the more the deterioration progresses. NPL 3 reports a mechanism which induces the decomposition of a lithium salt triggered by the decomposition of a high dielectric constant solvent.

By the way, it is being studied to use, as the negative electrode active material, a Si material instead of a conventional carbon material. This is a result of focusing on the fact that the theoretical capacity of the Si material is larger than the theoretical capacity of the carbon material.

For example, when graphite is used as the negative electrode active material, the maximum amount of lithium occlusion and release per mol of carbon remains at ⅙ mol, and the theoretical capacity obtained from $LiC_6$, which is the maximum lithium-introduced compound, is 372 mAh/g. Meanwhile, when a Si material is used, for example, the maximum amount of lithium occluded and released per mol of Si is 3.75 mol, and the theoretical capacity obtained from $Li_{3.75}Si$ reaches 3,600 mAh/g.

[NPL 1] ACS Energy Lett., 2, 196-223 (2017).
[NPL 2] J. Power Sources, 233, 121-130 (2013).
[NPL 3] J. Phys. Chem. Lett., 8, 4820-4825 (2017).

However, these nonaqueous secondary batteries aiming at higher energy density may be inferior in long-term durability performance compared to existing nonaqueous secondary batteries, and both the electrolyte and the electrodes are required to have durability in a harsher environment.

The layered rock salt type positive electrode active material essentially has active sites which cause oxidative deterioration of the electrolyte solution. This active site may unintentionally consume the compound added to protect the negative electrode on the positive electrode side. The decomposition products of these additives taken in and deposited on the positive electrode side are likely to cause an increase in internal resistance of the nonaqueous secondary battery, and may also accelerate the deterioration of the lithium salt. Further, unintended consumption of these additives easily leads to insufficient protection of the negative electrode surface.

These phenomena supported by the results of disassembly analysis are not mentioned in NPLs 1 to 3.

The nonaqueous secondary battery may cause problems such as a decrease in capacity when used in a low-temperature environment and deterioration of battery performance due to charging in a low-temperature environment, and an improvement in low-temperature performance is required.

Operational Advantage Related to the Present Embodiment

According to the present embodiment, first, there are provided a nonaqueous electrolyte solution which is capable of inhibiting active sites which cause oxidative deterioration of the electrolyte solution, exhibiting excellent load characteristics, and inhibiting various deterioration phenomena when high-temperature storage or charging/discharging cycle is repeated, and is excellent in low-temperature characteristics, and a nonaqueous secondary battery.

According to the present embodiment, second, there are provided a nonaqueous electrolyte solution capable of inhibiting various deterioration phenomena associated with the volume change of the negative electrode in the case of repeating charging/discharging cycle when the Si material is applied to the negative electrode active material, and a nonaqueous secondary battery.

<Fifth Specific Additive>

The nonaqueous electrolyte solution of the present embodiment contains a boron atom-containing additive.

It is preferable that the boron-containing additive in the present embodiment is a strong electrophile and can easily react with the decomposition intermediate of the nonaqueous electrolyte solution to form a strong thin film-like SEI on the negative electrode. From this point of view, the boron-containing additive preferably has a B—O bond, and more preferably contains a fluorine atom together with the B—O bond, or may have a heterocycle containing a boron atom and an oxygen atom as ring members.

Hereinafter, such a boron atom-containing additive is sometimes referred to as a "fifth specific additive" in the present description.

Examples of preferable boron atom-containing additive include at least one selected from the group consisting of a compound represented by the following formula (B1):

[Chemical Formula 42]

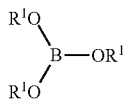

(B1)

wherein, in the formula (B1), $R^1$ each independently represent a fluoroalkyl group having 1 to 20 carbon atoms, a fluoroalkenyl group having 2 to 20 carbon atoms, a fluoroalkynyl group having 2 to 20 carbon atoms, a fluoroaryl group having 5 to 20 carbon atoms, or a fluoroacyl group having 2 to 20 carbon atoms; and a compound represented by the following formula (B2):

Chemical Formula 43

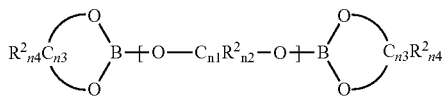

(B2)

wherein, in the formula (B2), $R^2$ each independently represent a hydrogen atom, a substituted or unsubstituted alkyl group having 1 to 20 carbon atoms, a substituted or unsubstituted alkenyl group having 2 to 20 carbon atoms, a substituted or unsubstituted alkynyl group having 2 to 20 carbon atoms, or a substituted or unsubstituted aryl group having 5 to 20 carbon atoms; n1 is an integer of 1 to 6, n2 is 2×n1; n3 each independently represent an integer of 2 to 6, n4 is 2×n3; and n5 is 0 or 1.

In the above formula (B1), $R^1$ is preferably a fluoroalkyl group having 1 to 20 carbon atoms, preferably a fluoroalkyl group having 1 to 6 carbon atoms, more preferably a fluoroalkyl group having 1 to 4 carbon atom, particularly preferably a trifluoromethyl group, a 2,2,2-trifluoroethyl group, a 1,2,2,2-tetrafluoroethyl group, a perfluoroethyl group or a 1,1,1,3,3,3-hexafluoroisopropyl group.

Specific examples of the compound represented by the above formula (B1) include tris(2,2,2-trifluoroethyl)borate, tris(1,1,1,3,3,3-hexafluoroisopropyl)borate, tri(trifluoroacetoxy)borane and the like.

In the above formula (B2), $R^2$ is preferably a hydrogen atom. Therefore, the divalent group represented by $C_{n1}R^2_{n2}$ or $C_{n3}R^2_{n4}$ is preferably a methylene group, an alkylmethylene group, a dialkylmethylene group, or a linear or branched alkylene group, and particularly preferably a trimethylene group or a 2,2-dimethyltrimethylene group.

Specific examples of the compound represented by the above formula (B2) include bis(neopentylglycolato)diboron, bis(trimethylene)diborate and the like.

(Amount of Fifth Specific Additive Used)

The amount of the fifth specific additive (boron atom-containing additive) contained in the nonaqueous electrolyte solution is optional, but may be set at, for example, 0.01 part by weight or more and 10.0 part by weight or less based on 100 parts by weight of the nonaqueous electrolyte solution. When the amount of the boron atom-containing additive is 0.01 part by weight or more based on 100 parts by weight of the nonaqueous electrolyte solution, the mechanical strength of SEI generated on the negative electrode becomes sufficiently high, thus making it possible to obtain a nonaqueous secondary battery which is excellent in cycle characteristics and is capable of stably operating for a long period of time. Meanwhile, when the amount of the boron atom-containing additive is 10.0 parts by weight or less based on 100 parts by weight of the nonaqueous electrolyte solution, it is possible to obtain a nonaqueous secondary battery which is excellent in output characteristics and low-temperature characteristics without excessively inhibiting the lithium ion conduction of the electrolyte. The amount of the boron atom-containing additive contained in the nonaqueous electrolyte solution may be 0.05 part by weight or more and 5.0 parts by weight or less, 0.1 part by weight or more and 4.0 parts by weight or less, or 0.2 part by weight or more and 3.0 parts by weight or less, based on 100 parts by weight of the nonaqueous electrolyte solution.

<Method for Producing Nonaqueous Electrolyte Solution>

The nonaqueous electrolyte solution can be produced by mixing a nonaqueous solvent, a lithium salt, a fifth specific additive (boron atom-containing additive), and other additives as necessary by any means.

EXAMPLES

Example (No. 1)

[Fabrication of Positive Electrode]

A composite oxide of lithium, nickel, manganese and cobalt ($LiNi_{0.5}Mn_{0.3}Co_{0.2}O_2$) as the positive electrode active material, acetylene black powder as the conductive aid, and polyvinylidene fluoride (PVDF) as the binder were mixed at a weight ratio of 93.9:3.3:2.8 to obtain a positive electrode mixture.

N-methyl-2-pyrrolidone was added as the solvent to the positive electrode mixture thus obtained, followed by mixing to prepare a positive electrode mixture-containing slurry. This positive electrode mixture-containing slurry was coated on one side of an aluminum foil having a thickness of 15 μm, which will serve as a positive electrode current collector, while adjusting the basis weight to about 9.3 mg/cm². When the positive electrode mixture-containing slurry was coated on the aluminum foil, an uncoated region was formed so that a part of the aluminum foil was exposed. Then, rolling was carried out using a roll press so that the density of the positive electrode active material layer was 2.7 g/cm³ to obtain a positive electrode composed of a positive electrode active material layer and a positive electrode current collector.

Then, this positive electrode was cut such that the positive electrode mixture layer had an area of 30 mm×50 mm and included the exposed portion of the aluminum foil. A lead piece formed of aluminum for extracting a current was welded to the exposed portion of the aluminum foil, and vacuum drying was carried out at 120° C. for 12 hours to obtain a lead-attached positive electrode.

[Fabrication of Negative Electrode]

Graphite as the negative electrode active material, carboxymethyl cellulose as the binder, and latex of a styrene-butadiene rubber which is also the binder, were mixed at a weight ratio of 97.4:1.1:1.5 to obtain a negative electrode mixture.

An appropriate amount of water was added to the negative electrode mixture thus obtained, followed by sufficient mixing to prepare a negative electrode mixture-containing slurry. This slurry was coated on one side of a copper foil having a thickness of 10 μm at a given thickness while adjusting the basis weight to about 5.9 mg/cm². When the negative electrode mixture-containing slurry was coated on the copper foil, an uncoated region was formed so that a part of the copper foil was exposed. Then, rolling was carried out using a roll press so that the density of the negative electrode active material layer was 1.4 g/cm³ to obtain a negative electrode composed of a negative electrode active material layer and a negative electrode current collector.

Then, this negative electrode was cut such that the negative electrode mixture layer had an area of 32 mm×52 mm and included the exposed portion of the copper foil. A lead body formed of nickel for extracting a current was welded to the exposed portion of the copper foil, and vacuum drying was carried out at 80° C. for 12 hours to obtain a lead-attached negative electrode.

[Fabrication of Battery]
[Assembling of Single-Layered Laminate Battery]

The lead-attached positive electrode and the lead-attached negative electrode were overlapped by interposing a polyethylene microporous membrane separator (thickness of 21 μm, air permeability of 285 s/100 cc, porosity of 41% by volume) while the mixture coated surfaces of each electrode face each other to fabricate a laminated electrode structure. This laminated electrode structure was housed in an aluminum laminated sheet outer package body having a size of 90 mm×80 mm, and vacuum drying was carried out at 80° C. for 5 hours in order to remove moisture. Subsequently, an electrolyte solution was injected into an outer package body and the outer package body was sealed to fabricate a single-layered laminated type (pouch type) nonaqueous secondary battery (hereinafter also simply referred to as "single-layered laminate battery"). The single-layered laminate battery has a design capacity value of 23 mAh and a rated voltage value of 4.2 V.

[Evaluation of Single-Layered Laminate Battery]

The thus-obtained batteries for evaluation were subjected to an initial charging/discharging treatment and, first, the initial charging/discharging treatment was carried out according to the following procedure (1-1). Then, according to the following procedures (1-2), (1-3) and (1-4), each battery was evaluated. The charging/discharging was carried out using a charging/discharging apparatus ACD-01 (trade name) manufactured by Aska Electronics Co., Ltd., and a thermostatic bath PLM-63S (trade name) manufactured by Futaba Science Co., Ltd.

Here, "1 C" refers to the current value at which a fully charged battery is expected to be discharged in one hour with a constant current to terminate discharging.

(1-1) Initial Charging/Discharging Treatment of Single-Layered Laminate Battery

After setting the ambient temperature of the battery at 25° C. and charging with a constant current of 2.3 mA corresponding to 0.1 C to reach 4.2 V, the battery was charged with a constant voltage of 4.2 V until the current attenuated to 0.05 C. Then, the battery was discharged to 2.5 V with a constant current of 6.9 mA corresponding to 0.3 C.

(1-2) Output Test of Single-Layered Laminate Battery

For the battery subjected to the initial charging/discharging treatment by the method mentioned in (1-1), the ambient temperature of the battery was set at 25° C., and after charging with a constant current of 23 mA corresponding to 1 C to reach 4.2 V, the battery was charged with a constant voltage of 4.2 V until the current attenuated to 0.05 C. Then, the battery was discharged to 3.0 V with a constant current of 23 mA corresponding to 1 C. The same charging/discharging as above was carried out, except that the current value during discharging with a constant current was changed to 230 mA corresponding to 10 C, the capacity retention rate was calculated by the following formula.

Capacity retention rate=(capacity during 10 C discharging/capacity during 1 C discharging)×100 [%]

(1-3) Charging/Discharging Cycle Test at −10° C. of Single-Layered Laminate Battery For the battery subjected to the initial charging/discharging treatment by the method mentioned in (1-1), a cycle test was carried out. The cycle test was started 3 hours after setting the ambient temperature of the battery at −10° C. After charging with a constant current of 4.6 mA corresponding to 0.2 C to reach 4.2 V, the battery was charged with a constant voltage of 4.2 V until the current attenuated to 0.05 C. Then, the battery was discharged to 2.5 V with a constant current of 4.6 mA corresponding to 0.2 C. With this process of carrying out charging and discharging once each serving as one cycle, charging/discharging was carried out for 40 cycles. The discharge capacity in the 40th cycle when the discharge capacity in the 1st cycle was 100% was defined as the capacity retention rate.

(1-4) Charging/Discharging Cycle Test at 25° C. of Single-Layered Laminate Battery For the battery subjected to the initial charging/discharging treatment by the method mentioned in (1-1), the ambient temperature of the battery was set at 25° C., and after charging with a constant current of 23 mA corresponding to 1 C to reach 4.2 V, the battery was charged with a constant voltage of 4.2 V until the current attenuated to 0.05 C. Then, the battery was discharged to 3.0 V with a constant current of 23 mA corresponding to 1 C. With this process of carrying out charging and discharging once each serving as one cycle, charging/discharging was carried out for 100 cycles. The discharge capacity in the 100th cycle when the discharge capacity in the 1st cycle was 100% was defined as the capacity retention rate.

[Analysis of Negative Electrode Protective Film Component]

The negative electrode protective film of the present example is hardly soluble in a nonaqueous electrolyte solution and therefore has low solubility in an organic solvent. Therefore, heavy water was used to extract the negative electrode protective film. As a method for analyzing the negative electrode protective film component, the compounds represented by the general formulas (1) to (3) were analyzed by NMR and the compounds represented by the general formulas (4) to (6) were analyzed by LC-MS.

(Extraction of Electrode Film)

The battery subjected to the initial charging/discharging treatment by the method mentioned in (1-1) was disassembled in an argon atmosphere and the negative electrode was placed in a glass screw tube. Using a syringe, 2 mL of heavy water was injected into each glass screw tube, which was sealed with a lid. After allowing to stand for 72 hours, the electrode film was extracted and cotton plug filtration was carried out by a Pasteur pipette filled with glass wool to obtain an extract.

(LC-MS Measurement)

The above extract was further diluted 10-fold with distilled water and centrifuged (12,000 rpm, 15 minutes) to remove solids, and LC-MS measurement was carried out.

A measuring device used was a UPLC type liquid chromatograph manufactured by Japan Waters Corp. connected to a SYNAPT G2 type mass spectrometer manufactured by Japan Waters Corp. As a column, ACQUITY UPLC BEH C18 (1.7 μm, 2.1 mm×50 mm) manufactured by Japan Waters Corp. was used. The column temperature was 40° C. and the flow rate was 0.3 mL per minute. A photodiode array (200 to 400 nm) was used as a detector. For a mobile phase, water containing 0.1% by volume of formic acid was used as an A phase, and acetonitrile containing 0.1% by volume of formic acid was used as a B phase, and gradient elution was carried out as follows. The injection amount of the sample was set at 1 μL.

TABLE 1

| Time/min | A phase (% by volume) | B phase (% by volume) |
|---|---|---|
| 0 | 98 | 2 |
| 10 | 0 | 100 |
| 10.1 | 98 | 2 |
| 15 | 98 | 2 |

In the mass spectrometer, the electrospray ionization method (ESI+ and ESI−) was used for ionization. The m/z scan range was set at 50 to 1,200

The peak area (X) per 1 μg of the active material was calculated by the following formula.

(X)=peak area value (measurement value)×amount of diluted extract×1,000/injection amount of LC-MS/(electrode mass excluding current collector×active material ratio)[peak area/μg]

The amount of the diluted extract was determined by multiplying the amount of heavy water by a dilution ratio of distilled water of the extract.

The concentration of the negative electrode protective film component contained in 1 g of the active material of this example was calculated by the following measuring method.

(NMR Measurement)

The extract thus obtained was charged in an NMR tube having a diameter of 3 mm and sealed. Separately, tetrafluorobenzene (manufactured by Tokyo Chemical Industry Co., Ltd.) as a reference material was dissolved in deuterated chloroform (manufactured by Sigma-Aldrich) containing tetramethylsilane as a chemical shift standard, and the solution thus obtained was charged in an NMR tube having a diameter of 5 mm. The NMR tube having a diameter of 3 mm was inserted into this NMR tube, and $^1$H NMR measurement was carried out by the double tube method. A heavy water solution of dimethyl sulfoxide (concentration of 0.398 mg/mL) was prepared as a reference material for quantification, and $^1$H NMR measurement was carried out in the same manner.

As the measuring device, a JNM-ECS-400 type FT NMR device manufactured by JEOL RESONANCE Inc. was used. Deuterated chloroform was used as the lock solvent, the number of integrations was set at 256, and tetramethylsilane (0 ppm) was used as the chemical shift criteria. In the quantitative calculation, the integral value of the peak attributable to the proton of tetrafluorobenzene is set at 2,000, and the integral value corresponding to one proton per unit concentration was determined from the integral value of the signal of dimethyl sulfoxide, which is a reference material, and then the concentration in the extract from the integrated value of each peak was calculated using the value.

The negative electrode protective film component concentration (Y) per 1 g of the active material was calculated by the following formula.

(Y)=[Concentration D in extract×heavy water amount C/(electrode weight A excluding current collector×active material ratio B)]/1,000 [mg/g]

The ionic conductivity of the electrolyte solution of the present example was calculated by the following measuring method.

(Measurement of Ionic Conductivity)

The electrolyte solution was charged in a closed cell (cell size: 24 mmφ×0.35 mmt) manufactured by Toyo Corporation, sealed, and then fitted into a holder (SH1-Z) for connection. Further, the AC impedance was measured by putting it in a thermostatic bath. Gold was used for the electrodes. The process from collecting the electrolyte solution to filling and sealing in the closed cell was carried out in the Ar glove box.

The thickness, porosity and air permeability of the polyethylene microporous membrane of the present example were calculated by the following measurement methods.

(Thickness)

Using a micro thickness gauge KBM (trademark) manufactured by Toyo Seiki Seisaku-sho, Ltd., the thickness was measured at room temperature of 23±2° C.

(Porosity)

A sample of 10 cm×10 cm square was cut out and the volume (cm$^3$) and mass (g) were determined, and the porosity was calculated from these and the film density (g/cm$^3$) using the following formula.

Porosity=(volume−mass/film density)/volume×100

The film density was calculated to be constant at 0.95.
(Air Permeability)

Air permeability of a sample was measured using a Gurley type air permeability tester G-B2 (trademark) manufactured by Toyo Seiki Seisaku-sho, Ltd. according to JIS P-8117.

Example 1

In an inert atmosphere, acetonitrile (AcN), diethyl carbonate (DEC), ethylene carbonate (EC) and vinylene carbonate (VC) were mixed so that the volume ratio was 49:28:21:2. Further, 0.3 mol of lithium hexafluorophosphate (LiPF$_6$) and 1.0 mol of lithium bis(fluorosulfonyl)imide (LiN(SO$_2$F)$_2$) were dissolved per 1 L of this mixed solution, and 0.2% by weight of succinic anhydride (SAH) and 0.25% by weight of 1-methyl-1H-benzotriazole (MBTA) were added, followed by mixing to obtain an electrolyte solution. It was visually confirmed that all the lithium salts and additives were dissolved in the electrolyte solution thus obtained. After fabricating a nonaqueous secondary battery of Example 1 by the method mentioned in (1-1) for this electrolyte solution, the measurement was carried out according to the procedures mentioned in (1-2) to (1-4), LC-MS measurement and NMR measurement of the negative electrode.

Example 2

In an inert atmosphere, acetonitrile (AcN), diethyl carbonate (DEC), ethylene carbonate (EC) and vinylene carbonate (VC) were mixed so that the volume ratio was 47:28:21:4. Further, 0.3 mol of lithium hexafluorophosphate (LiPF$_6$) and 1.0 mol of lithium bis(fluorosulfonyl)imide (LiN(SO$_2$F)$_2$) were dissolved per 1 L of this mixed solution, and 0.2% by weight of succinic anhydride (SAH) and 0.25% by weight of 1-methyl-1H-benzotriazole (MBTA) were added as the additives, followed by mixing to obtain an electrolyte solution. It was visually confirmed that all the lithium salts and additives were dissolved in the electrolyte solution thus obtained. After fabricating a nonaqueous secondary battery of Example 2 by the method mentioned in (1-1) for this electrolyte solution, the measurement was carried out according to the procedures mentioned in (1-2) to (1-4), LC-MS measurement and NMR measurement of the negative electrode.

Comparative Example 1

In an inert atmosphere, diethyl carbonate (DEC), ethylene carbonate (EC) and vinylene carbonate (VC) were mixed so that the volume ratio was 68:30:2. Further, 1.0 mol of lithium hexafluorophosphate (LiPF$_6$) was dissolved per 1 L of this mixed solution to obtain an electrolyte solution. It was visually confirmed that all the lithium salts were dissolved in the electrolyte solution thus obtained. After fabricating a nonaqueous secondary battery of Comparative Example 1 by the method mentioned in (1-1) for this electrolyte solution, the measurement was carried out according to the procedures mentioned in (1-2) to (1-4) and LC-MS of the negative electrode.

Comparative Example 2

In an inert atmosphere, acetonitrile (AcN), diethyl carbonate (DEC), ethylene carbonate (EC) and vinylene carbonate (VC) were mixed so that the volume ratio was 47:28:21:4. Further, 0.3 mol of lithium hexafluorophosphate (LiPF$_6$) and 1.0 mol of lithium bis(fluorosulfonyl)imide (LiN(SO$_2$F)$_2$) were dissolved per 1 L of this mixed solution to obtain an electrolyte solution. It was visually confirmed that all the lithium salts and additives were dissolved in the electrolyte solution thus obtained. After fabricating a nonaqueous secondary battery of Comparative Example 2 by the method mentioned in (1-1) for this electrolyte solution, the measurement was carried out according to the procedures mentioned in (1-2) to (1-4) and LC-MS of the negative electrode.

Table 2 below shows constituent components and the composition of the electrolyte solution of each nonaqueous secondary battery of Example 1 to Example 2 and Comparative Example 1 to Comparative Example 2.

TABLE 2

|  | Solvent | | | | Lithium salt | | Additives | | |
|  | | | | | | | Cyclic acid anhydride | Nitrogen-containing cyclic compound | |
|  | AcN (% by volume) | DEC (% by volume) | EC (% by volume) | VC (% by volume) | LiPF$_6$ (mol/1 L solvent) | LiFSI (mol/1 L solvent) | (% by weight) | (% by weight) | Type of battery |
| Example 1 | 49 | 28 | 21 | 2 | 0.3 | 1 | SAH 0.2 | MBTA 0.25 | Single-layered laminate cell |
| Example 2 | 47 | 28 | 21 | 4 | 0.3 | 1 | SAH 0.2 | MBTA 0.25 | Single-layered laminate cell |
| Comparative Example 1 | 0 | 68 | 30 | 2 | 1 | 0 | — | — | Single-layered laminate cell |
| Comparative Example 2 | 47 | 28 | 21 | 4 | 0.3 | 1 | — | — | Single-layered laminate cell |

Table 3 below shows the ionic conductivity at 20° C. of each nonaqueous electrolyte solution of Example 1 to Example 2 and Comparative Example 1 to Comparative Example 2.

TABLE 2-continued

|  | Positive electrode active material | Positive electrode current collector | Negative electrode active material | Negative electrode current collector | Separator |
|---|---|---|---|---|---|
| Example 1 | $LiNi_{0.5}Mn_{0.3}Co_{0.2}O_2$ | Aluminum foil | Graphite | Copper foil | Polyethylene microporous membrane |
| Example 2 | $LiNi_{0.5}Mn_{0.3}Co_{0.2}O_2$ | Aluminum foil | Graphite | Copper foil | Polyethylene microporous membrane |
| Comparative Example 1 | $LiNi_{0.5}Mn_{0.3}Co_{0.2}O_2$ | Aluminum foil | Graphite | Copper foil | Polyethylene microporous membrane |
| Comparative Example 2 | $LiNi_{0.5}Mn_{0.3}Co_{0.2}O_2$ | Aluminum foil | Graphite | Copper foil | Polyethylene microporous membrane |

TABLE 3

|  | Ionic conductivity [mS/cm] |
|---|---|
| Example 1 | 21.8 |
| Example 2 | 21.1 |
| Comparative Example 1 | 8.7 |
| Comparative Example 2 | 21.6 |

Table 4 below shows an output test, a charging/discharging cycle test at −10° C. and a charging/discharging cycle test at 25° C. in Example 1 to Example 2 and Comparative Example 1 to Comparative Example 2. In the charging/discharging cycle test at −10° C. and the charging/discharging cycle test at 25° C., batteries having a capacity retention rate of 80% or more were rated "Pass", whereas batteries having a capacity retention rate of less than 80% were rated "Fail".

TABLE 4

|  | Output test at 25° C. Capacity retention rate [%] | Cycle test at −10° C. Capacity retention rate [%] | Output | Cycle test at 25° C. Capacity retention rate [%] | Durability |
|---|---|---|---|---|---|
| Example 1 | 67 | 91.7 | Pass | 96 | Pass |
| Example 2 | 66 | 87.3 | Pass | 96 | Pass |
| Comparative Example 1 | 30 | Short circuit | Fail | 98 | Pass |
| Comparative Example 2 | 67 | 88.5 | Pass | 74 | Fail |

As shown in Table 4 above, it was found that the capacity retention rate was 80% or more in Example 1 to Example 2 in the cycle test at −10° C. Meanwhile, in Comparative Example 1, a short circuit occurred in the battery. Because of low ionic conductivity, it is considered that Li ions were deposited in a dendritic form on the negative electrode, leading to a short circuit. In Comparative Example 2, the durability in the cycle test at 50° C. was less than 75%.

Table 5 below shows the LC-MS results of the negative electrode extract in Example 1 to Example 2 and Comparative Example 1 to Comparative Example 2.

TABLE 5

|  | Electrode mass (mg) | Electrode mass A excluding current collector (mg) | Amount of heavy water (mL) | Ratio of dilution with distilled water of extract (times) | Amount of diluted extract (mL) | LC-MS injection amount (μL) |
|---|---|---|---|---|---|---|
| Example 1 | 137 | 55.2 | 2 | 10 | 20 | 1 |
| Example 2 | 130 | 52.3 | 2 | 10 | 20 | 1 |

|  | Mass chromatogram ESI- (m/z 117.02) | | Mass chromatogram ESI- (m/z 149.96) | | Mass chromatogram ESI- (m/z 179.92) | |
|---|---|---|---|---|---|---|
|  | Peak area (area) | Peak area per 1 μg of active material (area/μg) | Peak area (area) | Peak area per 1 μg of active material (area/μg) | Peak area (area) | Peak area per 1 μg of active material (area/μg) |
| Example 1 | 386.3 | 143.4 | 5958.3 | 2211.7 | 36582.1 | 13579.2 |
| Example 2 | 309.1 | 121.1 | 6667.2 | 2612.1 | 47028.1 | 18425.1 |

As shown in Table 5 above, in Example 1 and Example 2, a compound having a molecular weight of 117 was detected in ESI– from the results of the LC-MS measurement. Themolecular weight of the compound in which $R^6$ and $R^7$ are OH groups and n is 2 in the formula (4) is 118, and it is detected by the molecular weight ionized by removing hydrogen ions in this measurement, so that the molecular weight is consistent with the molecular weight detected in this measurement. In Comparative Example 1 and Comparative Example 2, a compound having a molecular weight of 117 was not detected. The results revealed that, in Example 1 to Example 2, the negative electrode contained a compound represented by a compound in which $R^6$ and $R^7$ are composed of OH groups and n is composed of 2 in the formula (4). $PF_6$ anions having a molecular weight of 149 and $N(SO_2F)_2$ anions having a molecular weight of 179.92 were also confirmed.

Table 6 and Table 7 below show the NMR results of the negative electrode extract in Example 1 and Example 2.

TABLE 6

| Example 1 | Electrode weight (mg) | Electrode weight A excluding current collector (mg) | Active material ratio B (%) | Amount of heavy water C (mL) | Molecular weight | Number of intramolecular protons |
|---|---|---|---|---|---|---|
| $CH_3OCOOLi$ | 137 | 55.2 | 97.5 | 2 | 81.08 | 3 |
| $CH_3CH_2OCOOLi$ | 137 | 55.2 | 97.5 | 2 | 96.01 | 3 |
| $LiOCOOCH_2CH_2OCOOLi$ | 137 | 55.2 | 97.5 | 2 | 161.95 | 4 |
| DMSO (Internal Standard) | — | — | — | — | 78.13 | 6 |

| Example 1 | Integration ratio | Molar ratio (integration ratio/proton number) | Weight ratio (molecular weight × molar ratio) | Concentration D in extract (μg/mL) | Concentration of negative electrode protective film component (Y) (mg/g) |
|---|---|---|---|---|---|
| $CH_3OCOOLi$ | 0.39 | 0.13 | 10.54 | 5.08 | 0.1886 |
| $CH_3CH_2OCOOLi$ | 3.07 | 1.02 | 98.25 | 47.33 | 1.7578 |
| $LiOCOOCH_2CH_2OCOOLi$ | 4.98 | 1.25 | 201.63 | 97.13 | 3.6074 |
| DMSO (Internal Standard) | 63.45 | 10.58 | 826 | — | — |

TABLE 7

| Example 2 | Electrode weight (mg) | Electrode weight A excluding current collector (mg) | Active material ratio B (%) | Amount of heavy water C (mL) | Molecular weight | Number of intramolecular protons |
|---|---|---|---|---|---|---|
| $CH_3OCOOLi$ | 130 | 52.3 | 97.5 | 2 | 81.08 | 3 |
| $CH_3CH_2OCOOLi$ | 130 | 52.3 | 97.5 | 2 | 96.01 | 3 |
| $LiOCOOCH_2CH_2OCOOLi$ | 130 | 52.3 | 97.5 | 2 | 161.95 | 4 |
| DMSO (Internal Standard) | — | — | — | — | 78.13 | 6 |

| Example 2 | Integration ratio | Molar ratio (integration ratio/proton number) | Weight ratio (molecular weight × molar ratio) | Concentration D in extract (μg/mL) | Concentration of negative electrode protective film component (Y) (mg/g) |
|---|---|---|---|---|---|
| $CH_3OCOOLi$ | 0.44 | 0.15 | 11.89 | 5.73 | 0.2246 |
| $CH_3CH_2OCOOLi$ | 2.74 | 0.91 | 87.69 | 42.24 | 1.6559 |
| $LiOCOOCH_2CH_2OCOOLi$ | 6.03 | 1.51 | 244.14 | 117.60 | 4.6103 |
| DMSO (Internal Standard) | 63.45 | 10.58 | 826 | — | — |

As shown in Tables 6 and 7 above, the compounds represented by the general formulas (1) to (3) were confirmed from the results of the NMR measurement in Example 1 and Example 2.

Example (No. 2)

Fabrication of Coin-Type Nonaqueous Secondary Battery
[Fabrication of Positive Electrode]

A composite oxide of lithium having a number-average particle diameter of 11 μm, nickel, manganese and cobalt ($LiNi_{1/3}Mn_{1/3}Co_{1/3}O_2$, density of 4.70 g/cm³) as the positive electrode active material (A), graphite powder having a number-average particle diameter of 6.5 μm (density of 2.26 g/cm³) and acetylene black powder having a number-average particle diameter of 48 nm (density of 1.95 g/cm³) as the conductive aids (B), and polyvinylidene fluoride (PVDF; density of 1.75 g/cm³) as the binder (C) were mixed at a weight ratio of 92:4:4 to obtain a positive electrode mixture.

N-methyl-2-pyrrolidone as the solvent was added to the positive electrode mixture thus obtained so as to have a solid content of 68% by weight, followed by further mixing to prepare a positive electrode mixture-containing slurry. While adjusting the basis weight of the positive electrode mixture-containing slurry, the positive electrode mixture-containing slurry was coated on one side of an aluminum foil having a thickness of 15 μm and a width of 280 mm, which serves as a positive electrode current collector, using a 3-roll transfer coater so as to have a coating pattern having a width of 240 to 250 mm, a coating length of 125 mm and a non-coating length of 20 mm, and then the solvent was dried and removed in a hot air drying furnace. Both sides of the electrode roll thus obtained were subjected to trimming cut, followed by drying under reduced pressure at 130° C. for 8 hours. Then, the electrode roll was rolled by a roll press so that the density of the positive electrode active material layer became 2.9 g/cm³ to obtain a positive electrode (P1) composed of the positive electrode active material layer and the positive electrode current collector. The basis weight excluding the positive electrode current collector was 23.8 mg/cm², and the weight of the positive electrode active material excluding the positive electrode current collector was 21.9 mg/cm²

[Fabrication of Negative Electrode]

Artificial graphite powder having a number-average particle diameter of 12.7 µm (density of 2.23 g/cm³) as the negative electrode active material (a), acetylene black powder having a number-average particle diameter of 48 nm (density of 1.95 g/cm³) as the conductive aid (b), and a carboxymethyl cellulose (density of 1.60 g/cm³) solution (solid component concentration of 1.83% by weight) and a diene-based rubber (glass transition temperature: −5° C., number-average particle size during drying: 120 nm, density of 1.00 g/cm³, dispersion medium: water, solid component concentration of 40% by weight) as the binders (c) were mixed at a solid component weight ratio of 95.7:0.5:3.8 to obtain a negative electrode mixture.

Water as the solvent was added to the negative electrode mixture thus obtained so as to have a solid content of 45% by weight, followed by further mixing to prepare a negative electrode mixture-containing slurry. While adjusting the basis weight of the negative electrode mixture-containing slurry, the negative electrode mixture-containing slurry was coated on one side of a copper foil having a thickness of 8 µm and a width of 280 mm, which serves as a negative electrode current collector, using a 3-roll transfer coater so as to have a coating pattern having a width of 240 to 250 mm, a coating length of 125 mm and a non-coating length of 20 mm, and then the solvent was dried and removed in a hot air drying furnace. Both sides of the electrode roll thus obtained were subjected to trimming cut and dried under reduced pressure at 80° C. for 12 hours. Then, the electrode roll was rolled by a roll press so that the density of the positive electrode active material layer became 1.5 g/cm³ to obtain a negative electrode (N1) composed of the negative electrode active material layer and the negative electrode current collector. The basis weight excluding the negative electrode current collector was 11.9 mg/cm², and the weight of the negative electrode active material excluding the negative electrode current collector was 11.4 mg/cm²

[Assembling of Coin-Type Nonaqueous Secondary Battery]

A polypropylene gasket was set in a CR2032 type battery casing (SUS304/Al-cladding), and the positive electrode obtained as mentioned above was punched in a disk shape having a diameter of 15.958 mm was set in the center of the gasket while the positive electrode active material layer faces upward. A glass fiber filter paper (GA-100, manufactured by Advantec Co., Ltd.) punched in a disk shape having a diameter of 16.156 mm was set therein, and 150 µL of an electrolyte solution was injected. Then, the negative electrode obtained as mentioned above was punched in a disk shape having a diameter of 16.156 mm was set therein while the negative electrode active material layer faces downward. Further, a spacer and a spring were set, and a battery cap was fitted and crimped with a caulking machine. The overflowing electrolyte solution was wiped off with a waste cloth. After maintaining at a temperature of 25° C. for 12 hours to fully adapt the electrolyte solution to the laminate, a coin-type nonaqueous secondary battery was thus obtained. This coin-type nonaqueous secondary battery has a design capacity value of 6 mAh and a rated voltage value of 4.2 V.

[Evaluation of Coin-Type Nonaqueous Secondary Battery]

For the coin-type nonaqueous secondary battery obtained as mentioned above, first, an initial charging treatment and the initial charging/discharging capacity measurement were carried out according to the following procedure (1-1).

Then, each coin-type nonaqueous secondary battery was evaluated according to the procedure (1-2) or (1-3). The charging/discharging was carried out using a charging/discharging apparatus ACD-M01A (trade name) manufactured by Aska Electronics Co., Ltd., and a program thermostatic bath IN804 (trade name) manufactured by Yamato Scientific Co., Ltd.

Here, "1 C" refers to the current value at which a fully charged battery is expected to be discharged in one hour with a constant current to terminate discharging.

(1-1) Initial Charging/Discharging Treatment of Coin-Type Nonaqueous Secondary Battery After setting the ambient temperature of the coin-type nonaqueous secondary battery at 25° C. and charging with a constant current of 0.1 C to reach 4.2 V, the battery was charged with a constant voltage of 4.2 V until the current attenuated to 0.05 C. Then, the battery was discharged to 3.0 V with a constant current of 0.3 C.

(1-2) Charging/Discharging Cycle Test at 25° C. (1.5 C) of Coin-Type Nonaqueous Secondary Battery For the battery subjected to the accelerated deterioration treatment by the method mentioned in (1-2), a cycle test was carried out. In the cycle test, the ambient temperature of the battery was set at 25° C. After charging with a constant current of 1.5 C to reach 4.2 V, the battery was charged with a constant voltage of 4.2 V until the current attenuated to 0.05 C. Then, the battery was discharged to 3 V with a constant current of 1.5 C. With this process of carrying out charging and discharging once each serving as one cycle, charging/discharging was carried out for 100 cycles. The discharge capacity in the 100th cycle when the discharge capacity in the 1st cycle was 100% was defined as the capacity retention rate.

Table 8 below shows constituent components and the composition of the electrolyte solution of each nonaqueous secondary battery of Examples 3 to 4 and Comparative Examples 3 to 5.

TABLE 8

| | Nonaqueous solvent (% by volume) | | | | | | | Lithium salt (mol/1 L solvent) | |
|---|---|---|---|---|---|---|---|---|---|
| | AcN | DEC | EMC | DFA | EC | VC | FEC | $LiPF_6$ | LiFSI |
| Example 3 | 49 | 0 | 0 | 28 | 21 | 1 | 1 | 0.3 | 1 |
| Example 4 | 49 | 0 | 0 | 28 | 21 | 2 | 0 | 0.3 | 1 |

TABLE 8-continued

| | | | | | | | | | |
|---|---|---|---|---|---|---|---|---|---|
| Comparative Example 3 | 0 | 0 | 69 | 0 | 29 | 2 | 0 | 1 | 0 |
| Comparative Example 4 | 49 | 28 | 0 | 0 | 10 | 13 | 0 | 0.3 | 1 |
| Comparative Example 5 | 49 | 28 | 0 | 0 | 21 | 2 | 0 | 0.3 | 1 |

| | | Positive electrode | | | | Negative electrode | | | |
|---|---|---|---|---|---|---|---|---|---|
| | Type of battery | Positive electrode active material | Positive electrode current collector | One-sided coating weight [mg/cm$^2$] | Density [g/cc] | Negative electrode active material | Negative electrode current collector | One-sided coating weight [mg/cm$^2$] | Density [g/cc] | Separator |
| Example 3 | Coin cell | LiNi$_{1/3}$Mn$_{1/3}$Co$_{1/3}$O$_2$ | Aluminum foil | 23.8 | 2.9 | Graphite | Copper foil | 11.9 | 1.5 | Glass fiber filter paper |
| Example 4 | Coin cell | LiNi$_{1/3}$Mn$_{1/3}$Co$_{1/3}$O$_2$ | Aluminum foil | 23.8 | 2.9 | Graphite | Copper foil | 11.9 | 1.5 | Glass fiber filter paper |
| Comparative example 3 | Coin cell | LiNi$_{1/3}$Mn$_{1/3}$Co$_{1/3}$O$_2$ | Aluminum foil | 23.8 | 2.9 | Graphite | Copper foil | 11.9 | 1.5 | Glass fiber filter paper |
| Comparative example 4 | Coin cell | LiNi$_{1/3}$Mn$_{1/3}$Co$_{1/3}$O$_2$ | Aluminum foil | 23.8 | 2.9 | Graphite | Copper foil | 11.9 | 1.5 | Glass fiber filter paper |
| Comparative example 5 | Coin cell | LiNi$_{1/3}$Mn$_{1/3}$Co$_{1/3}$O$_2$ | Aluminum foil | 23.8 | 2.9 | Graphite | Copper foil | 11.9 | 1.5 | Glass fiber filter paper |

Table 9 below shows the results of the charging/discharging cycle test at 25° C. of Examples 3 to 4 and Comparative Examples 3 to 5.

TABLE 9

| | (1-2) Charging/discharging cycle test at 25° C. Capacity retention rate (%) |
|---|---|
| Example 3 | 81.7 |
| Example 4 | 85.2 |
| Comparative Example 3 | 44.1 |
| Comparative Example 4 | 16.6 |
| Comparative Example 5 | 78.6 |

(Analysis of Negative Electrode Protective Film Component)

The negative electrode protective film of the present example is hardly soluble in a nonaqueous electrolyte solution and therefore has low solubility in an organic solvent. Therefore, heavy water was used to extract the negative electrode protective film. Using the NMR measurement as a method for analyzing the compounds represented by the general formulas (1) to (3), analysis was carried out.

(Extraction of Electrode Film)

The battery subjected to the initial charging/discharging treatment by the method mentioned in (1-1) was disassembled in an argon atmosphere and the positive electrode or the negative electrode was placed in a glass screw tube. Using a syringe, heavy water was injected into each glass screw tube, which was sealed with a lid. After allowing to stand for 72 hours, the electrode film was extracted and cotton plug filtration was carried out by a Pasteur pipette filled with glass wool to obtain an extract.

The concentration of the negative electrode protective film component contained in 1 g of the active material of this example was calculated by the following measuring method.

(NMR Measurement)

The extract thus obtained was charged in an NMR tube having a diameter of 3 mm and sealed. Separately, tetrafluorobenzene (manufactured by Tokyo Chemical Industry Co., Ltd.) as a reference material was dissolved in deuterated chloroform (manufactured by Sigma-Aldrich) containing tetramethylsilane as a chemical shift standard, and the solution thus obtained was charged in an NMR tube having a diameter of 5 mm. The NMR tube having a diameter of 3 mm was inserted into this NMR tube, and $^1$H NMR measurement was carried out by the double tube method. A heavy water solution of dimethyl sulfoxide (concentration of 0.398 mg/mL) was prepared as a reference material for quantification, and $^1$H NMR measurement was carried out in the same manner.

As the measuring device, a JNM-ECS-400 type FT NMR device manufactured by JEOL RESONANCE Inc. was used. Deuterated chloroform was used as the lock solvent, the number of integrations was set at 256, and tetramethylsilane (0 ppm) was used as the chemical shift criteria. In the quantitative calculation, the integral value of the peak attributable to the proton of tetrafluorobenzene is set at 2,000, and the integral value corresponding to one proton per unit concentration was determined from the integral value of the signal of dimethyl sulfoxide, which is a reference material, and then the concentration in the extract from the integrated value of each peak was calculated using the value.

The negative electrode protective film component concentration (Y) per 1 g of the active material was calculated by the following formula.

(Y)=[Concentration D in extract×heavy water amount C/(electrode weight A excluding current collector×active material ratio B)]/1,000 [mg/g]

Table 10 below shows the concentration of the negative electrode protective film component of the general formula (3) in Example 4 and Comparative Example 5.

TABLE 10

|  | Type of electrode | Electrode weight (mg) | Electrode weight A excluding current collector (mg) | Active material ratio B (%) | Amount of heavy water C (mL) | Molecular weight | Number of intramolecular protons |
|---|---|---|---|---|---|---|---|
| Example 4 | Positive electrode | 53.4 | 45.7 | 92 | 0.7 | 81.08 | 3 |
|  | Negative electrode | 38.1 | 38.1 | 93 | 0.7 | 81.08 | 3 |
| Comparative Example 5 | Positive electrode | 55.4 | 47.4 | 92 | 0.7 | 81.08 | 3 |
|  | Negative electrode | 40.2 | 40.2 | 93 | 0.7 | 81.08 | 3 |

|  | Integration ratio | Molar ratio (integration ratio/proton number) | Weight ratio (molecular weight × molar ratio) | Concentration D in extract (μg/mL) | Concentration of negative electrode protective film component (Y) (mg/g) |
|---|---|---|---|---|---|
| Example 4 | 0.06 | 0.02 | 1.62 | 0.46 | 0.076 |
|  | 0 | 0 | 0 | 0 | 0 |
| Comparative Example 5 | 0 | 0 | 0 | 0 | 0 |
|  | 0 | 0 | 0 | 0 | 0 |

Table 11 below shows the concentration of the negative electrode protective film component of the general formula (2) in Example 4 and Comparative Example 5.

TABLE 11

|  | Type of electrode | Electrode weight (mg) | Electrode weight A excluding current collector (mg) | Active material ratio B (%) | Amount of heavy water C (mL) | Molecular weight | Number of intramolecular protons |
|---|---|---|---|---|---|---|---|
| Example 4 | Positive electrode | 53.4 | 45.7 | 92 | 1 | 96.01 | 3 |
|  | Negative electrode | 38.1 | 38.1 | 93 | 1 | 96.01 | 3 |
| Comparative Example 5 | Positive electrode | 55.4 | 47.4 | 92 | 1 | 96.01 | 3 |
|  | Negative electrode | 40.2 | 40.2 | 93 | 1 | 96.01 | 3 |

|  | Integration ratio | Molar ratio (integration ratio/proton number) | Weight ratio (molecular weight × molar ratio) | Concentration D in extract (μg/mL) | Concentration of negative electrode protective film component (Y) (mg/g) |
|---|---|---|---|---|---|
| Example 4 | 2.5 | 0.83 | 80.01 | 22.47 | 0.3745 |
|  | 5.93 | 1.98 | 189.78 | 53.30 | 1.6598 |
| Comparative Example 5 | 2.25 | 0.75 | 72.01 | 20.23 | 0.3248 |
|  | 11.48 | 3.83 | 367.40 | 103.19 | 3.0454 |

Table 12 below shows the concentration of the negative electrode protective film component of the general formula (3) in Example 4 and Comparative Example 5.

TABLE 12

|  | Type of electrode | Electrode weight (mg) | Electrode weight A excluding current collector (mg) | Active material ratio B (%) | Amount of heavy water C (mL) | Molecular weight | Number of intramolecular protons |
|---|---|---|---|---|---|---|---|
| Example 4 | Positive electrode | 61.5 | 47.4 | 92 | 1 | 161.95 | 4 |

TABLE 12-continued

| | | | | | | | |
|---|---|---|---|---|---|---|---|
| | Negative electrode | 69.4 | 39.5 | 93 | 1 | 161.95 | 4 |
| Comparative Example 5 | Positive electrode | 66.1 | 50.9 | 92 | 1 | 161.95 | 4 |
| | Negative electrode | 62.2 | 35.4 | 93 | 1 | 161.95 | 4 |

| | Integration ratio | Molar ratio (integration ratio/proton number) | Weight ratio (molecular weight × molar ratio) | Concentration D in extract (μg/mL) | Concentration of negative electrode protective film component (Y) (mg/g) |
|---|---|---|---|---|---|
| Example 4 | 4.62 | 1.16 | 187.05 | 52.54 | 0.8754 |
| | 11.08 | 2.77 | 448.60 | 126.00 | 3.9234 |
| Comparative Example 5 | 2.87 | 0.72 | 116.20 | 32.64 | 0.5242 |
| | 7.6 | 1.90 | 307.71 | 86.43 | 2.5506 |

Table 13 below shows the concentration of the negative electrode protective film component (Y1) of the general formula (3) and the concentration of the negative electrode protective film component (Y2) of the general formula (2) in Example 4 and Comparative Example 5.

TABLE 13

| | | Concentration of negative electrode protective film component (Y) (mg/g) | | |
|---|---|---|---|---|
| | Type of electrode | $CH_3OCOOLi$ (Y1) | $CH_3CH_2OCOOLi$ (Y2) | Sum of contents (Y1) + (Y2) |
| Example 4 | Positive electrode | 0.076 | 0.3745 | 0.4505 |
| | Negative electrode | 0 | 1.6598 | 1.6598 |
| Comparative Example 5 | Positive electrode | 0 | 0.3248 | 0.3248 |
| | Negative electrode | 0 | 3.0454 | 3.0454 |

From the results of the cycle test at 25° C., the capacity retention rate of Example 4 was 85% or more, whereas the capacity retention rate of Comparative Example 5 was 79% or less. That is, the results revealed that the general formula (3) and the general formula (2) are excellent in terms of durability as a negative electrode protective film. Meanwhile, since they act as a high-resistant component, the battery performance deteriorates if the concentration is too high.

Example (No. 3)

Fabrication of Coin-Type Nonaqueous Secondary Battery
[Fabrication of Positive Electrode]

A composite oxide of lithium, nickel, manganese and cobalt ($LiNi_{0.5}Mn_{0.3}Co_{0.2}O_2$) as the positive electrode active material (A), acetylene black powder as the conductive aid (B), and polyvinylidene fluoride (PVDF) as the binder (C) were mixed at a weight ratio of 93.9:3.3:2.8 to obtain a positive electrode combination.

N-methyl-2-pyrrolidone as the solvent was added to the positive electrode mixture thus obtained so as to have a solid content of 68% by weight, followed by further mixing to prepare a positive electrode mixture-containing slurry. While adjusting the basis weight of the positive electrode mixture-containing slurry, the positive electrode mixture-containing slurry was coated on one side of an aluminum foil having a thickness of 15 μm and a width of 280 mm, which serves as a positive electrode current collector, using a 3-roll transfer coater so as to have a coating pattern having a width of 240 to 250 mm, a coating length of 125 mm and a non-coating length of 20 mm, and then the solvent was dried and removed in a hot air drying furnace. Both sides of the electrode roll thus obtained were subjected to trimming cut, followed by drying under reduced pressure at 130° C. for 8 hours. Then, the electrode roll was rolled by a roll press so that the density of the positive electrode active material layer became 2.7 g/cm³ to obtain a positive electrode composed of the positive electrode active material layer and the positive electrode current collector. The basis weight excluding the positive electrode current collector was 9.3 mg/cm², and the weight of the positive electrode active material excluding the positive electrode current collector was 8.7 mg/cm²

[Fabrication of Negative Electrode]

Graphite powder as the negative electrode active material (a), and a carboxymethyl cellulose (density of 1.60 g/cm³) solution (solid component concentration of 1.83% by weight) and a diene-based rubber (glass transition temperature: −5° C., number-average particle size during drying: 120 nm, density of 1.00 g/cm³, dispersion medium: water, solid component concentration of 40% by weight) as the binders (c) were mixed at a solid component weight ratio of 97.4:1.1:1.5 to obtain a negative electrode mixture.

Water as the solvent was added to the negative electrode mixture thus obtained so as to have a solid content of 45% by weight, followed by further mixing to prepare a negative electrode mixture-containing slurry. While adjusting the basis weight of the negative electrode mixture-containing slurry, the negative electrode mixture-containing slurry was coated on one side of a copper foil having a thickness of 8 μm and a width of 280 mm, which serves as a negative electrode current collector, using a 3-roll transfer coater so as to have a coating pattern having a width of 240 to 250 mm, a coating length of 125 mm and a non-coating length of 20 mm, and then the solvent was dried and removed in a hot air drying furnace. Both sides of the electrode roll thus obtained were subjected to trimming cut and dried under reduced pressure at 80° C. for 12 hours. Then, the electrode roll was rolled by a roll press so that the density of the positive electrode active material layer became 1.4 g/cm³ to obtain a negative electrode composed of the negative electrode active material layer and the negative electrode current collector. The basis weight excluding the negative electrode current collector was 5.9 mg/cm², and the weight of the negative electrode active material excluding the negative electrode current collector was 5.7 mg/cm²

[Assembling of Coin-Type Nonaqueous Secondary Battery]

A polypropylene gasket was set in a CR2032 type battery casing (SUS304/Al-cladding), and the positive electrode obtained as mentioned above was punched in a disk shape having a diameter of 15.958 mm was set in the center of the gasket while the positive electrode active material layer faces upward. A separator punched in a disk shape having a diameter of 16.156 mm was set therein, and 150 μL of an electrolyte solution was injected. Then, the negative electrode obtained as mentioned above was punched in a disk shape having a diameter of 16.156 mm was set therein while the negative electrode active material layer faces downward. Further, a spacer and a spring were set, and a battery cap was fitted and crimped with a caulking machine. The overflowing electrolyte solution was wiped off with a waste cloth. After maintaining at a temperature of 25° C. for 12 hours to fully adapt the electrolyte solution to the laminate, a coin-type nonaqueous secondary battery was thus obtained. This coin-type nonaqueous secondary battery has a design capacity value of 3 mAh and a rated voltage value of 4.2 V.

[Evaluation of Coin-Type Nonaqueous Secondary Battery]

For the coin-type nonaqueous secondary battery obtained as mentioned above, first, an initial charging treatment and the initial charging/discharging capacity measurement were carried out according to the following procedure (1-1). Then, each coin-type nonaqueous secondary battery was evaluated according to the procedure (1-2) or (1-3). The charging/discharging was carried out using a charging/discharging apparatus ACD-M01A (trade name) manufactured by Aska Electronics Co., Ltd., and a program thermostatic bath IN804 (trade name) manufactured by Yamato Scientific Co., Ltd.

Here, "1 C" refers to the current value at which a fully charged battery is expected to be discharged in one hour with a constant current to terminate discharging.

(1-1) Initial Charging/Discharging Treatment of Coin-Type Nonaqueous Secondary Battery After setting the ambient temperature of the coin-type nonaqueous secondary battery at 25° C. and charging with a constant current of 0.1 C to reach 4.2 V, the battery was charged with a constant voltage of 4.2 V until the current attenuated to 0.05 C. Then, the battery was discharged to 3.0 V with a constant current of 0.3 C.

(1-2) Output Test of Coin-Type Nonaqueous Secondary Battery

For the battery subjected to the initial charging/discharging treatment by the method mentioned in (1-1), the ambient temperature of the battery was set at 25° C., and after charging with a constant current of 3 mA corresponding to 1 C to reach 4.2 V, the battery was charged with a constant voltage of 4.2 V until the current attenuated to 0.05 C. Then, the battery was discharged to 3.0 V with a constant current of 1.5 mA corresponding to 0.5 C. After charging with a constant current of 3 mA corresponding to 1 C to reach 4.2 V, the battery was charged with a constant voltage of 4.2 V until the current attenuated to 0.05 C. The same charging/discharging as above was carried out, except that the current value during discharging with a constant current was changed to 60 mA corresponding to 20 C, the capacity retention rate was calculated by the following formula.

Capacity retention rate=(capacity during 20 C discharging/capacity during 0.5 C discharging)×100[%]

The thickness, porosity and air permeability of the polyolefin microporous membrane of this example were calculated by the following measuring methods. As the separator, a microporous membrane having a three-layered structure (polypropylene/polyethylene/polypropylene) or a microporous membrane having a single-layered structure (polyethylene) was used.

(Thickness)

Using a micro thickness gauge KBM (trademark) manufactured by Toyo Seiki Seisaku-sho, Ltd., the thickness was measured at room temperature of 23±2° C.

(Porosity)

A sample of 10 cm×10 cm square was cut out and the volume ($cm^3$) and mass (g) were determined, and the porosity was calculated from these and the film density ($g/cm^3$) using the following formula.

Porosity=(volume−mass/film density)/volume×100

The film density was calculated to be constant at 0.95.

(Air Permeability)

Air permeability of a sample was measured using a Gurley type air permeability tester G-B2 (trademark) manufactured by Toyo Seiki Seisaku-sho, Ltd. according to JIS P-8117.

Table 14 below shows constituent components and the composition of the electrolyte solution of each nonaqueous secondary battery of Examples 5 to 6 and Comparative Examples 6 to 7.

TABLE 14

| | Nonaqueous solvent (% by volume) | | | | | Lithium salt (mol/1 L solvent) | | Additives (% by weight) | |
|---|---|---|---|---|---|---|---|---|---|
| | AcN | DEC | EMC | EC | VC | $LiPF_6$ | LiFSI | SAH | MBTA |
| Example 5 | 49 | 28 | 0 | 21 | 2 | 0.3 | 1 | 0.2 | 0.25 |
| Example 6 | 49 | 28 | 0 | 21 | 2 | 0.3 | 1 | 0.2 | 0.25 |
| Comparative Example 6 | 0 | 0 | 70 | 30 | 0 | 1 | 0 | 0 | 0 |
| Comparative Example 7 | 0 | 0 | 70 | 30 | 0 | 1 | 0 | 0 | 0 |

| | | Positive electrode | | | | Negative electrode | | | |
|---|---|---|---|---|---|---|---|---|---|
| | Type of battery | Positive electrode active material | Positive electrode current collector | One-sided coating weight [mg/cm²] | Density [g/cc] | Negative electrode active material | Negative electrode current collector | One-sided coating weight [mg/cm²] | Density [g/cc] |
| Example 5 | Coin cell | $LiNi_{0.5}Mn_{0.3}Co_{0.2}O_2$ | Aluminum foil | 9.3 | 2.7 | Graphite | Copper foil | 5.9 | 1.4 |
| Example 6 | Coin cell | $LiNi_{0.5}Mn_{0.3}Co_{0.2}O_2$ | Aluminum foil | 9.3 | 2.7 | Graphite | Copper foil | 5.9 | 1.4 |

TABLE 14-continued

| | | | | | | | | | |
|---|---|---|---|---|---|---|---|---|---|
| Comparative Example 6 | Coin cell | $LiNi_{0.5}Mn_{0.3}Co_{0.2}O_2$ | Aluminum foil | 9.3 | 2.7 | Graphite | Copper foil | 5.9 | 1.4 |
| Comparative Example 7 | Coin cell | $LiNi_{0.5}Mn_{0.3}Co_{0.2}O_2$ | Aluminum foil | 9.3 | 2.7 | Graphite | Copper foil | 5.9 | 1.4 |

| | Separator | | | |
|---|---|---|---|---|
| | Type | Thickness [μm] | Porosity [%] | Air permeability [s/cm$^3$] |
| Example 5 | Polypropylene/polyethylene/polypropylene microporous membrane | 16 | 50 | 165 |
| Example 6 | Polypropylene/polyethylene/polypropylene microporous membrane | 20 | 45 | 320 |
| Comparative Example 6 | Polyethylene microporous membrane | 15 | 58 | 80 |
| Comparative Example 7 | Polyethylene microporous membrane | 16 | 65 | 49 |

Table 15 below shows the results of the output test in Examples 5 to 6 and Comparative Examples 6 to 7.

TABLE 15

| | (1-2) Output test 20 C capacity retention rate [%] |
|---|---|
| Example 5 | 38 |
| Example 6 | 35 |
| Comparative Example 6 | 26 |
| Comparative Example 7 | 31 |

Example (No. 4)

Fabrication of Coin-Type Nonaqueous Secondary Battery
[Fabrication of Positive Electrode]

A composite oxide of lithium, nickel, manganese and cobalt ($LiNi_{0.6}Mn_{0.2}Co_{0.2}O_2$) as the positive electrode active material (A), acetylene black powder as the conductive aid (B), and polyvinylidene fluoride (PVDF) as the binder (C) were mixed at a weight ratio of 94:3:3 to obtain a positive electrode combination.

N-methyl-2-pyrrolidone as the solvent was added to the positive electrode mixture thus obtained so as to have a solid content of 68% by weight, followed by further mixing to prepare a positive electrode mixture-containing slurry. While adjusting the basis weight of the positive electrode mixture-containing slurry, the positive electrode mixture-containing slurry was coated on one side of an aluminum foil having a thickness of 20 μm and a width of 280 mm, which serves as a positive electrode current collector, using a 3-roll transfer coater so as to have a coating pattern having a width of 240 to 250 mm, a coating length of 125 mm and a non-coating length of 20 mm, and then the solvent was dried and removed in a hot air drying furnace. Both sides of the electrode roll thus obtained were subjected to trimming cut, followed by drying under reduced pressure at 130° C. for 8 hours. Then, the electrode roll was rolled by a roll press so that the density of the positive electrode active material layer became 2.7 g/cm$^3$ to obtain a positive electrode composed of the positive electrode active material layer and the positive electrode current collector. The basis weight excluding the positive electrode current collector was 10.0 mg/cm$^2$, and the weight of the positive electrode active material excluding the positive electrode current collector was 9.4 mg/cm$^2$

[Fabrication of Negative Electrode]

Graphite powder as the negative electrode active material (a), acetylene black powder as the conductive aid (b), and polyvinylidene fluoride (PVDF) as the binder (c) were mixed at a solid component weight ratio of 90.0:3.0:7.0 to obtain a negative electrode mixture.

Water as the solvent was added to the negative electrode mixture thus obtained so as to have a solid content of 45% by weight, followed by further mixing to prepare a negative electrode mixture-containing slurry. While adjusting the basis weight of the negative electrode mixture-containing slurry, the negative electrode mixture-containing slurry was coated on one side of a copper foil having a thickness of 8 μm and a width of 280 mm, which serves as a negative electrode current collector, using a 3-roll transfer coater so as to have a coating pattern having a width of 240 to 250 mm, a coating length of 125 mm and a non-coating length of 20 mm, and then the solvent was dried and removed in a hot air drying furnace. Both sides of the electrode roll thus obtained were subjected to trimming cut and dried under reduced pressure at 130° C. for 8 hours. Then, the electrode roll was rolled by a roll press so that the density of the positive electrode active material layer became 1.3 g/cm$^3$ to obtain a negative electrode composed of the negative electrode active material layer and the negative electrode current collector. The basis weight excluding the negative electrode current collector was 5.4 mg/cm$^2$, and the weight of the negative electrode active material excluding the negative electrode current collector was 4.9 mg/cm$^2$

[Assembling of Coin-Type Nonaqueous Secondary Battery]

A polypropylene gasket was set in a CR2032 type battery casing (SUS304/Al-cladding), and the positive electrode obtained as mentioned above was punched in a disk shape having a diameter of 15.958 mm was set in the center of the gasket while the positive electrode active material layer faces upward. A glass fiber filter paper (GA-100, manufactured by Advantec Co., Ltd.) punched in a disk shape having a diameter of 16.156 mm was set therein, and 150 μL of an electrolyte solution was injected. Then, the negative electrode obtained as mentioned above was punched in a disk shape having a diameter of 16.156 mm was set therein while the negative electrode active material layer faces downward. Further, a spacer and a spring were set, and a battery cap was fitted and crimped with a caulking machine. The overflowing electrolyte solution was wiped off with a waste cloth. After maintaining at a temperature of 25° C. for 12 hours to fully adapt the electrolyte solution to the laminate, a coin-type nonaqueous secondary battery was thus obtained. This coin-type nonaqueous secondary battery has a design capacity value of 3 mAh and a rated voltage value of 4.2 V.
[Evaluation of Coin-Type Nonaqueous Secondary Battery]

For the coin-type nonaqueous secondary battery obtained as mentioned above, first, an initial charging treatment and the initial charging/discharging capacity measurement were carried out according to the following procedure (1-1). Then, each coin-type nonaqueous secondary battery was evaluated according to the procedure (1-2) or (1-3). The charging/discharging was carried out using a charging/discharging apparatus ACD-M01A (trade name) manufactured by Aska Electronics Co., Ltd., and a program thermostatic bath IN804 (trade name) manufactured by Yamato Scientific Co., Ltd.

Here, "1 C" refers to the current value at which a fully charged battery is expected to be discharged in one hour with a constant current to terminate discharging.

(1-1) Initial Charging/Discharging Treatment of Coin-Type Nonaqueous Secondary Battery After setting the ambient temperature of the coin-type nonaqueous secondary battery at 25° C. and charging with a constant current of 0.1 C to reach 4.2 V, the battery was charged with a constant voltage of 4.2 V until the current attenuated to 0.05 C. Then, the battery was discharged to 3.0 V with a constant current of 0.3 C.

(1-2) Charging/Discharging Cycle Test at 25° C. (3 C) of Coin-Type Nonaqueous Secondary Battery For the battery subjected to the accelerated deterioration treatment by the method mentioned in (1-1), a cycle test was carried out. In the cycle test, the ambient temperature of the battery was set at 25° C. After charging with a constant current of 3 C to reach 4.2 V, the battery was charged with a constant voltage of 4.2 V until the current attenuated to 0.05 C. Then, the battery was discharged to 3 V with a constant current of 3 C. With this process of carrying out charging and discharging once each serving as one cycle, charging/discharging was carried out for 100 cycles. The discharge capacity in the 100th cycle when the discharge capacity in the 1st cycle was 100% was defined as the capacity retention rate.

Table 16 below shows constituent components and the composition of the electrolyte solution of each nonaqueous secondary battery of Example 7.

Table 17 below shows the results of the charging/discharging cycle test at 25° C. in Example 7.

TABLE 17

| | (1-2) Charging/discharging cycle test at 25° C. Capacity retention rate (%) |
|---|---|
| Example 7 | 95.0 |

Example (No. 5)

Fabrication of Single-Layered Laminate Type Nonaqueous Secondary Battery
[Fabrication of Positive Electrode]

A composite oxide of lithium, nickel, manganese and cobalt ($LiNi_{0.6}Mn_{0.2}Co_{0.2}O_2$) as the positive electrode active material (A), acetylene black powder as the conductive aid (B), and polyvinylidene fluoride (PVDF) as the binder (c) were mixed at a weight ratio of 93:4:3 to obtain a positive electrode mixture.

N-methyl-2-pyrrolidone was added as the solvent to the positive electrode mixture thus obtained, followed by mixing to prepare a positive electrode mixture-containing slurry. This positive electrode mixture-containing slurry was coated on one side of an aluminum foil having a thickness of 20 µm, which will serve as a positive electrode current collector, while adjusting the basis weight. When the positive electrode mixture-containing slurry was coated on the aluminum foil, an uncoated region was formed so that a part of the aluminum foil was exposed. Both sides of the electrode roll thus obtained were subjected to trimming cut, followed by drying under reduced pressure at 130° C. for 8 hours. Then, the electrode roll was rolled by a roll press so that the density of the positive electrode active material layer became 2.9 g/cm³ to obtain a positive electrode composed of the positive electrode active material layer and the positive electrode current collector. The basis weight excluding the positive electrode current collector was 19.0 mg/cm², and the weight of the positive electrode active material excluding the positive electrode current collector was 17.7 mg/cm².

Then, this positive electrode was cut such that the positive electrode mixture layer had an area of 14 mm×20 mm and included the exposed portion of the aluminum foil. A lead piece formed of aluminum for extracting a current was welded to the exposed portion of the aluminum foil, and vacuum drying was carried out at 120° C. for 12 hours to obtain a lead-attached positive electrode.

TABLE 16

| | | Nonaqueous solvent (% by volume) | | | | Lithium salt (mol/1 L solvent) | |
|---|---|---|---|---|---|---|---|
| | AcN | DEC | DFA | EC | VC | $LiPF_6$ | LiFSI |
| Example 7 | 49 | 0 | 28 | 21 | 2 | 0.3 | 1 |

| | | Positive electrode | | | | Negative electrode | | | | |
|---|---|---|---|---|---|---|---|---|---|---|
| | Type of battery | Positive electrode active material | Positive electrode Current collector | One-sided coating weight [mg/cm²] | Density [g/cc] | Negative electrode active material | Negative electrode current collector | One-sided coating weight [mg/cm²] | Density [g/cc] | Separator |
| Example 7 | Coin cell | $LiNi_{0.6}Mn_{0.2}Co_{0.2}O_2$ | Aluminum foil | 10.0 | 2.7 | Graphite | Copper foil | 5.4 | 1.3 | Glass fiber filter paper |

[Fabrication of Negative Electrode]

Graphite powder as the negative electrode active material (a), and a carboxymethyl cellulose (density of 1.60 g/cm$^3$) solution (solid component concentration of 1.83% by weight) and a diene-based rubber (glass transition temperature: −5° C., number-average particle size during drying: 120 nm, density of 1.00 g/cm$^3$, dispersion medium: water, solid component concentration of 40% by weight) as the binders (c) were mixed at a solid component weight ratio of 97.5:1.0:1.5 to obtain a negative electrode mixture.

N-methyl-2-pyrrolidone as the solvent was added to the negative electrode mixture thus obtained to prepare a negative electrode mixture-containing slurry. While adjusting the basis weight of the negative electrode mixture-containing slurry, the negative electrode mixture-containing slurry was coated on one side of a copper foil having a thickness of 8 μm, which serves as a negative electrode current collector, and then the solvent was dried and removed in a hot air drying furnace. When the negative electrode mixture-containing slurry was coated on the copper foil, an uncoated region was formed so that a part of the copper foil was exposed. Both sides of the electrode roll thus obtained were subjected to trimming cut, followed by drying under reduced pressure at 130° C. for 8 hours. Then, the electrode roll was rolled by a roll press so that the density of the positive electrode active material layer became 1.45 g/cm$^3$ to obtain a negative electrode composed of the negative electrode active material layer and the negative electrode current collector. The basis weight excluding the negative electrode current collector was 10.6 mg/cm$^2$, and the weight of the negative electrode active material excluding the negative electrode current collector was 10.3 mg/cm$^2$.

Then, this negative electrode was cut such that the negative electrode mixture layer had an area of 15 mm×21 mm and included the exposed portion of the copper foil. A lead body formed of nickel for extracting a current was welded to the exposed portion of the copper foil, and vacuum drying was carried out at 80° C. for 12 hours to obtain a lead-attached negative electrode.

[Assembling of Single-Layered Laminate Type Nonaqueous Secondary Battery]

The lead-attached positive electrode and the lead-attached negative electrode were overlapped by interposing a polyethylene microporous membrane separator (thickness of 21 μm) while the mixture coated surfaces of each electrode face each other to fabricate a laminated electrode structure. This laminated electrode structure was housed in an aluminum laminated sheet outer package body of 90 mm×80 mm, and vacuum drying was carried out at 80° C. for 5 hours in order to remove moisture. Subsequently, an electrolyte solution was injected into an outer package body and the outer package body was sealed to fabricate a single-layered laminated type (pouch type) nonaqueous secondary battery.

[Evaluation of Single-Layered Laminate Type Nonaqueous Secondary Battery]

The single-layered laminated type nonaqueous secondary battery obtained as mentioned above was first subjected to the initial charging/discharging treatment according to the following procedure (1-1). Then, according to the following procedure (1-2), each single-layered laminated type nonaqueous secondary battery was evaluated.

(1-1) Initial Charging/Discharging Treatment of Single-Layered Laminate Type Nonaqueous Secondary Battery The ambient temperature of the single-layered laminate type nonaqueous secondary battery was set at 25° C., and the battery was charged with a constant current of 0.025 C for 2 hours. After resting for 3 hours, the battery was charged with a constant current of 0.05 C to reach 4.2 V and then charged with a constant voltage of 4.2 V until the current attenuated to 0.02 C. Then, the battery was discharged to 2.7 V with a constant current of 0.05 C.

(1-2) Cycle Test of Single-Layered Laminate Type Nonaqueous Secondary Battery

For the battery subjected to the initial charging/discharging treatment by the method mentioned in (1-1), the ambient temperature of the battery was set at 50° C. After charging with a constant current of 0.5 C to reach 4.2 V, the battery was charged with a constant voltage of 4.2 V until the current attenuated to 0.05 C. Then, the battery was discharged to 2.7 V with a constant current of 0.5 C. With this process of carrying out charging and discharging once each serving as one cycle, charging/discharging was carried out for 50 cycles. The discharge capacity in the 50th cycle when the discharge capacity in the 1st cycle was 100% was defined as the capacity retention rate.

The ionic conductivity of the electrolyte solution of the present example was calculated by the following measuring method.

(Measurement of Ionic Conductivity)

The electrolyte solution was charged in a closed cell (cell size: 24 mmφ×0.35 mmt) manufactured by Toyo Corporation, sealed, and then fitted into a holder (SH1-Z) for connection. Further, the AC impedance was measured by putting it in a thermostatic bath. Gold was used for the electrodes. The process from collecting the electrolyte solution to filling and sealing in the closed cell was carried out in the Ar glove box.

Table 18 below shows constituent components and the composition of the electrolyte solution of each nonaqueous secondary battery of Example 8.

TABLE 18

| | Nonaqueous solvent (% by volume) | | | | | Lithium salt (mol/1 L solvent) | |
| --- | --- | --- | --- | --- | --- | --- | --- |
| | AcN | DEC | DFA | EC | VC | LiPF$_6$ | LiFSI |
| Example 8 | 47 | 0 | 28 | 21 | 4 | 0.3 | 1 |

| | Type of battery | Positive electrode | | | Negative electrode | | | | |
| --- | --- | --- | --- | --- | --- | --- | --- | --- | --- |
| | | Positive electrode active material | Positive electrode current collector | One-sided coating weight [mg/cm$^2$] | Density [g/cc] | Negative electrode active material | Negative electrode current collector | One-sided coating weight [mg/cm$^2$] | Density [g/cc] | Separator |
| Example 8 | Single-layered laminate cell | LiNi$_{0.6}$Mn$_{0.2}$Co$_{0.2}$O$_2$ | Aluminum foil | 19.0 | 2.92 | Graphite | Copper foil | 10.6 | 1.45 | Polyethylene microporous membrane |

Table 19 below shows the results of the charging/discharging cycle test at 50° C. and the ionic conductivity in Example 8.

TABLE 19

| | (1-2) Charging/discharging cycle test at 50° C. Capacity retention rate (%) | (1-3) Ionic conductivity (mS/cm) |
|---|---|---|
| Example 8 | 90 | 24.6 |

Example (No. 6)

Fabrication of Single-Layered Laminate Type Nonaqueous Secondary Battery
[Fabrication of Positive Electrode]

A composite oxide of lithium, nickel, manganese and cobalt ($LiNi_{0.8}Mn_{0.1}Co_{0.1}O_2$) as the positive electrode active material (A), acetylene black powder having a number-average particle size of 48 nm (density of 1.95 g/cm$^3$) as the conductive aid (B), and polyvinylidene fluoride (PVDF; density of 1.75 g/cm$^3$) as the binder (c) were mixed at a weight ratio of 92:4:4 to obtain a positive electrode mixture.

N-methyl-2-pyrrolidone was added as the solvent to the positive electrode mixture thus obtained, followed by mixing to prepare a positive electrode mixture-containing slurry. This positive electrode mixture-containing slurry was coated on one side of an aluminum foil having a thickness of 20 μm, which will serve as a positive electrode current collector, while adjusting the basis weight of the positive electrode mixture-containing slurry. When the positive electrode mixture-containing slurry was coated on the aluminum foil, an uncoated region was formed so that a part of the aluminum foil was exposed. Both sides of the electrode roll thus obtained were subjected to trimming cut, followed by drying under reduced pressure at 130° C. for 8 hours. Then, the electrode roll was rolled by a roll press so that the density of the positive electrode active material layer became 2.8 g/cm$^3$ to obtain a positive electrode composed of the positive electrode active material layer and the positive electrode current collector. The basis weight excluding the positive electrode current collector was 18.2 mg/cm$^2$, and the weight of the positive electrode active material excluding the positive electrode current collector was 16.7 mg/cm$^2$.

Then, this positive electrode was cut such that the positive electrode mixture layer had an area of 14 mm×20 mm and included the exposed portion of the aluminum foil. A lead piece formed of aluminum for extracting a current was welded to the exposed portion of the aluminum foil, and vacuum drying was carried out at 120° C. for 12 hours to obtain a lead-attached positive electrode.
[Fabrication of Negative Electrode]

Artificial graphite powder as the negative electrode active material (a), acetylene black powder having a number-average particle size of 48 nm (density of 1.95 g/cm$^3$) as the conductive aid (B), and polyvinylidene fluoride (PVDF; density of 1.75 g/cm$^3$) as the binder (c) were mixed at a weight ratio of 93:2:5 to obtain a negative electrode mixture.

N-methyl-2-pyrrolidone as the solvent was added to the negative electrode mixture thus obtained to prepare a negative electrode mixture-containing slurry. While adjusting the basis weight of the negative electrode mixture-containing slurry, the negative electrode mixture-containing slurry was coated on one side of a copper foil having a thickness of 10 μm, which serves as a negative electrode current collector, and then the solvent was dried and removed in a hot air drying furnace. When the negative electrode mixture-containing slurry was coated on the copper foil, an uncoated region was formed so that a part of the copper foil was exposed. Both sides of the electrode roll thus obtained were subjected to trimming cut, followed by drying under reduced pressure at 130° C. for 8 hours. Then, the electrode roll was rolled by a roll press so that the density of the positive electrode active material layer became 1.5 g/cm$^3$ to obtain a negative electrode composed of the negative electrode active material layer and the negative electrode current collector. The basis weight excluding the negative electrode current collector was 11.8 mg/cm$^2$, and the weight of the negative electrode active material excluding the negative electrode current collector was 11.0 mg/cm$^2$.

Then, this negative electrode was cut such that the negative electrode mixture layer had an area of 15 mm×21 mm and included the exposed portion of the copper foil. A lead body formed of nickel for extracting a current was welded to the exposed portion of the copper foil, and vacuum drying was carried out at 120° C. for 12 hours to obtain a lead-attached negative electrode.
[Assembling of Single-Layered Laminate Type Nonaqueous Secondary Battery]

The lead-attached positive electrode and the lead-attached negative electrode were overlapped by interposing a polyethylene microporous membrane separator (thickness of 21 μm) while the mixture coated surfaces of each electrode face each other to fabricate a laminated electrode structure. This laminated electrode structure was housed in an aluminum laminated sheet outer package body of 90 mm×80 mm, and vacuum drying was carried out at 80° C. for 5 hours in order to remove moisture. Subsequently, an electrolyte solution was injected into an outer package body and the outer package body was sealed to fabricate a single-layered laminated type (pouch type) nonaqueous secondary battery. This single-layered laminated type nonaqueous secondary battery has a design capacity value of 7.5 mAh and a rated voltage value of 4.2 V.
[Evaluation of Single-Layered Laminate Type Nonaqueous Secondary Battery]

The single-layered laminated type nonaqueous secondary battery obtained as mentioned above was first subjected to the initial charging/discharging treatment according to the following procedure (1-1). Then, according to the following procedure (1-2), each single-layered laminated type nonaqueous secondary battery was evaluated.

(1-1) Initial Charging/Discharging Treatment of Single-Layered Laminate Type Nonaqueous Secondary Battery The ambient temperature of the single-layered laminate type nonaqueous secondary battery was set at 25° C., and the battery was charged with a constant current of 0.025 C for 2 hours. After resting for 3 hours, the battery was charged with a constant current of 0.05 C to reach 4.2 V and then charged with a constant voltage of 4.2 V until the current attenuated to 0.02 C. Then, the battery was discharged to 2.7 V with a constant current corresponding to 0.05 C.

(1-2) Charging/Discharging Cycle Test at 35° C. of Single-Layered Laminate Type Nonaqueous Secondary Battery For the single-layered laminate type nonaqueous secondary battery subjected to the initial charging/discharging treatment by the method mentioned in (1-1), the ambient temperature of the battery was set at 35° C. After charging with a constant current of 0.5 C to reach 4.2 V, the battery was charged with a constant voltage of 4.2 V until the current attenuated to 0.05 C. Then, the battery was discharged to 2.7 V with a constant current of 0.5 C. With this process of carrying out charging and discharging once each serving as one cycle, charging/discharging was carried out for 50 cycles. The discharge capacity in the 50th cycle when the discharge capacity in the 1st cycle was 100% was defined as the capacity retention rate.

Table 20 below shows constituent components and the composition of the electrolyte solution of each nonaqueous secondary battery of Examples 9 to 11 and Comparative Example 8.

35° C. by the method mentioned in (1-2) was disassembled in an argon atmosphere and the positive electrode or the negative electrode was placed in a glass screw tube. Using a syringe, heavy water was injected into each glass screw tube, which was sealed with a lid. After allowing to stand for 72 hours, the electrode film was extracted and cotton plug filtration was carried out by a Pasteur pipette filled with glass wool to obtain an extract.

TABLE 20

| | Nonaqueous solvent (% by volume) | | | | | Lithium salt (mol/1 L solvent) | | Additives (% by weight) | |
|---|---|---|---|---|---|---|---|---|---|
| | AcN | DEC | DFA | EC | VC | $LiPF_6$ | LiFSI | MBTA | SAH |
| Example 9 | 49 | 28 | 0 | 21 | 2 | 0.3 | 1 | 0.25 | 0.2 |
| Example 10 | 47 | 28 | 0 | 21 | 4 | 0.3 | 1 | 0 | 0.14 |
| Example 11 | 47 | 0 | 28 | 21 | 4 | 0.3 | 1 | 0 | 0 |
| Comparative Example 8 | 47 | 28 | 0 | 21 | 4 | 0.3 | 1 | 0 | 0 |

| | | Positive electrode | | | | Negative electrode | | | | |
|---|---|---|---|---|---|---|---|---|---|---|
| | Type of battery | Positive electrode active material | Positive electrode current collector | One-sided coating weight [mg/cm$^2$] | Density [g/cc] | Negative electrode active material | Negative electrode current collector | One-sided coating weight [mg/cm$^2$] | Density [g/cc] | Separator |
| Example 9 | Single-layered laminate cell | $LiNi_{0.8}Mn_{0.1}Co_{0.1}O_2$ | Aluminum foil | 18.2 | 2.8 | Graphite | Copper foil | 11.8 | 1.5 | Polyethylene microporous membrane |
| Example 10 | Single-layered laminate cell | $LiNi_{0.8}Mn_{0.1}Co_{0.1}O_2$ | Aluminum foil | 18.2 | 2.8 | Graphite | Copper foil | 11.8 | 1.5 | Polyethylene microporous membrane |
| Example 11 | Single-layered laminate cell | $LiNi_{0.8}Mn_{0.1}Co_{0.1}O_2$ | Aluminum foil | 18.2 | 2.8 | Graphite | Copper foil | 11.8 | 1.5 | Polyethylene microporous membrane |
| Comparative Example 8 | Single-layered laminate cell | $LiNi_{0.8}Mn_{0.1}Co_{0.1}O_2$ | Aluminum foil | 18.2 | 2.8 | Graphite | Copper foil | 11.8 | 1.5 | Polyethylene microporous membrane |

Table 21 below shows the results of the charging/discharging cycle test at 35° C. of Examples 9 to 11 and Comparative Example 8.

TABLE 21

| | (1-2) Charging/discharging cycle test at 35° C. Capacity retention rate (%) |
|---|---|
| Example 9 | 81 |
| Example 10 | 81 |
| Example 11 | 80 |
| Comparative Example 8 | 65 |

(Analysis of Negative Electrode Protective Film Component)

The negative electrode protective film of the present example is hardly soluble in a nonaqueous electrolyte solution and therefore has low solubility in an organic solvent. Therefore, heavy water was used to extract the negative electrode protective film. As a method for analyzing the negative electrode protective film component, the NMR measurement was carried out.

(Extraction of Electrode Film)

The single-layered laminate type nonaqueous secondary battery subjected to the charging/discharging cycle test at The concentration of the negative electrode protective film component contained in 1 g of the active material of this example was calculated by the following measuring method.

(NMR Measurement)

The extract thus obtained was charged in an NMR tube having a diameter of 3 mm and sealed. Separately, tetrafluorobenzene (manufactured by Tokyo Chemical Industry Co., Ltd.) as a reference material was dissolved in deuterated chloroform (manufactured by Sigma-Aldrich) containing tetramethylsilane as a chemical shift standard, and the solution thus obtained was charged in an NMR tube having a diameter of 5 mm. The NMR tube having a diameter of 3 mm was inserted into this NMR tube, and $^1$H NMR measurement was carried out by the double tube method. A heavy water solution of dimethyl sulfoxide (concentration of 0.398 mg/mL) was prepared as a reference material for quantification, and $^1$H NMR measurement was carried out in the same manner.

As the measuring device, a JNM-ECS-400 type FT NMR device manufactured by JEOL RESONANCE Inc. was used. Deuterated chloroform was used as the lock solvent, the number of integrations was set at 256, and tetramethylsilane (0 ppm) was used as the chemical shift criteria. In the quantitative calculation, the integral value of the peak attributable to the proton of tetrafluorobenzene is set at 2,000, and the integral value corresponding to one proton per unit concentration was determined from the integral value of the signal of dimethyl sulfoxide, which is a reference material, and then the concentration in the extract from the integrated value of each peak was calculated using the value.

The negative electrode protective film component concentration (Y) per 1 g of the active material was calculated by the following formula.

$(Y)$=[Concentration $D$ in extract×heavy water amount $C$/(electrode weight $A$ excluding current collector×active material ratio $B$)]/1,000 [mg/g]

Table 22 below shows the concentration of the negative electrode protective film component of the general formula (3) in Example 11 and Comparative Example 8.

TABLE 22

| | Type of electrode | Electrode weight (mg) | Electrode weight A excluding current collector (mg) | Active material ratio B (%) | Amount of heavy water C (mL) | Molecular weight | Number of intramolecular protons |
|---|---|---|---|---|---|---|---|
| Example 11 | Positive electrode | 61.5 | 47.4 | 92 | 1 | 81.08 | 3 |
| | Negative electrode | 69.4 | 39.5 | 93 | 1 | 81.08 | 3 |
| Comparative Example 8 | Positive electrode | 66.1 | 50.9 | 92 | 1 | 81.08 | 3 |
| | Negative electrode | 62.2 | 35.4 | 93 | 1 | 81.08 | 3 |
| DMSO (Internal Standard) | — | — | — | — | — | 78.13 | 6 |

| | Integration ratio | Molar ratio (integration ratio/proton number) | Weight ratio (molecular weight × molar ratio) | Concentration D in extract (μg/mL) | Concentration of negative electrode protective film component (Y) (mg/g) |
|---|---|---|---|---|---|
| Example 11 | 0 | 0 | 0 | 0 | 0 |
| | 0.95 | 0.32 | 25.68 | 15.00 | 0.4085 |
| Comparative Example 8 | 0 | 0 | 0 | 0 | 0 |
| | 0.22 | 0.07 | 5.95 | 3.40 | 0.1033 |
| DMSO (Internal Standard) | 54.7 | 9.12 | 712.29 | 398 | — |

Table 23 below shows the concentration of the negative electrode protective film component of the general formula (2) in Example 11 and Comparative Example 8.

TABLE 23

| | Type of electrode | Electrode weight (mg) | Electrode weight A excluding current collector (mg) | Active material ratio B (%) | Amount of heavy water C (mL) | Molecular weight | Number of intramolecular protons |
|---|---|---|---|---|---|---|---|
| Example 11 | Positive electrode | 61.5 | 47.4 | 92 | 1 | 96.01 | 3 |
| | Negative electrode | 69.4 | 39.5 | 93 | 1 | 96.01 | 3 |
| Comparative Example 8 | Positive electrode | 66.1 | 50.9 | 92 | 1 | 96.01 | 3 |
| | Negative electrode | 62.2 | 35.4 | 93 | 1 | 96.01 | 3 |
| DMSO (Internal Standard) | — | — | — | — | — | 78.13 | 6 |

| | Integration ratio | Molar ratio (integration ratio/proton number) | Weight ratio (molecular weight × molar ratio) | Concentration D in extract (μg/mL) | Negative electrode protective film Component concentration (Y) (mg/g) |
|---|---|---|---|---|---|
| Example 11 | 1.54 | 0.51 | 49.29 | 27.50 | 0.6310 |
| | 2.55 | 0.85 | 81.61 | 45.6 | 1.2418 |
| Comparative Example 8 | 1.69 | 0.56 | 54.09 | 30.20 | 0.6448 |
| | 3.86 | 1.29 | 123.53 | 69.00 | 2.0965 |

TABLE 23-continued

| | | | | | | |
|---|---|---|---|---|---|---|
| DMSO (Internal Standard) | 54.7 | 9.12 | 712.29 | 398 | — | |

Table 24 below shows the concentration of the negative electrode protective film component of the general formula (1) in Example 11 and Comparative Example 8.

TABLE 24

| | Type of electrode | Electrode weight (mg) | Electrode weight A excluding current collector (mg) | Active material ratio B (%) | Amount of heavy water C (mL) | Molecular weight | Number of intramolecular protons |
|---|---|---|---|---|---|---|---|
| Example 11 | Positive electrode | 61.5 | 47.4 | 92 | 1 | 161.95 | 4 |
| | Negative electrode | 69.4 | 39.5 | 93 | 1 | 161.95 | 4 |
| Comparative Example 8 | Positive electrode | 66.1 | 50.9 | 92 | 1 | 161.95 | 4 |
| | Negative electrode | 62.2 | 35.4 | 93 | 1 | 161.95 | 4 |
| DMSO (Internal Standard) | — | — | — | — | — | 78.13 | 6 |

| | Integration ratio | Molar ratio (integration ratio/proton number) | Weight ratio (molecular weight × molar ratio) | Concentration D in extract (µg/mL) | Concentration of negative electrode protective film component (Y) (mg/g) |
|---|---|---|---|---|---|
| Example 11 | 0.78 | 0.20 | 31.58 | 18.00 | 0.4130 |
| | 12.9 | 3.23 | 522.29 | 291.80 | 7.9464 |
| Comparative Example 8 | 0.2 | 0.05 | 8.10 | 4.50 | 0.0961 |
| | 1.16 | 1.16 | 187.46 | 105.00 | 3.1904 |
| DMSO (Internal Standard) | 54.7 | 9.12 | 712.29 | 398 | — |

Table 25 below shows the sum of the concentration of the negative electrode protective film component (Y1) of the general formula (3) and the concentration of the negative electrode protective film component (Y2) of the general formula (2) in Example 11 and Comparative Example 8.

TABLE 25

| | | Concentration of negative electrode protective film component (Y) (mg/g) | | |
|---|---|---|---|---|
| | Type of electrode | $CH_3OCOOLi$ (Y1) | $CH_3CH_2OCOOLi$ (Y2) | Sum of contents (Y1) + (Y2) |
| Example 11 | Positive electrode | 0 | 0.6310 | 0.6310 |
| | Negative electrode | 0.4085 | 1.2418 | 1.6503 |
| Comparative Example 8 | Positive electrode | 0 | 0.6448 | 0.6448 |
| | Negative electrode | 0.1033 | 2.0965 | 3.0683 |

From the results of the cycle test at 35° C., the capacity retention rate of Example 11 was 80% or more, whereas the capacity retention rate of Comparative Example 8 was 65% or less. That is, the results revealed that the general formula (3) and the general formula (2) are excellent in terms of durability as a negative electrode protective film. Meanwhile, since they act as a high-resistant component, the battery performance deteriorates if the concentration is too high.

Another Example (No. 1)

Examples 1-1 to 1-5 and Comparative Examples 1-1 to 1-2 will be described below.

Example 1-1

(1) Preparation of Nonaqueous Electrolyte Solution

In an inert atmosphere, acetonitrile, diethyl carbonate, ethylene carbonate and vinylene carbonate were mixed at a volume ratio of 49:28:21:2. In this mixed solution, 0.3 mol of lithium hexafluorophosphate ($LiPF_6$) and 1.0 mol of lithium bis(fluorosulfonyl)imide ($LiN(SO_2F)_2$) were dissolved as the amount per a total of 1 L of the nonaqueous solvents, and 0.2% by weight of succinic anhydride and 0.2% by weight of lithium nitrate were added as the additives, followed by mixing to obtain a nonaqueous electrolyte solution.

Visual observation of nonaqueous electrolyte solution thus obtained revealed that all the lithium salts and additives were dissolved.

(2) Fabrication of Positive Electrode

A composite oxide of lithium, nickel, manganese and cobalt ($LiNi_{0.5}Mn_{0.3}Co_{0.2}O_2$) as the positive electrode active material, acetylene black powder as the conductive aid, and polyvinylidene fluoride (PVDF) as the binder were mixed at a weight ratio of 100:3.5:3 to obtain a positive electrode mixture. N-methyl-2-pyrrolidone was added as the solvent to the positive electrode mixture thus obtained, followed by mixing to prepare a positive electrode mixture-containing slurry. While adjusting the basis weight to about 95.0 g/m², this positive electrode mixture-containing slurry was coated on one side of an aluminum foil having a thickness of 15 µm, which will serve as a positive electrode current collector. When the positive electrode mixture-containing slurry was coated on the aluminum foil, an uncoated region was formed so that a part of the aluminum foil was exposed. Then, rolling was carried out using a roll press so that the density of the positive electrode active material layer was 2.74 g/cm³ to obtain a positive electrode composed of a positive electrode active material layer and a positive electrode current collector.

Then, this positive electrode was cut such that the positive electrode mixture layer had an area of 30 mm×50 mm and included the exposed portion of the aluminum foil. A lead piece formed of aluminum for extracting a current was welded to the exposed portion of the aluminum foil, and vacuum drying was carried out at 120° C. for 12 hours to obtain a lead-attached positive electrode.

(3) Fabrication of Negative Electrode

Graphite as the negative electrode active material, carboxymethyl cellulose as the binder, and latex of a styrene-butadiene rubber which is also the binder, were mixed at a weight ratio of 100:1.1:1.5 to obtain a negative electrode mixture. An appropriate amount of water was added to the negative electrode mixture thus obtained, followed by sufficient mixing to prepare a negative electrode mixture-containing slurry. While adjusting the basis weight to about 61.0 g/m², this slurry was coated on one side of a copper foil having a thickness of 10 µm at a given thickness. When the negative electrode mixture-containing slurry was coated on the copper foil, an uncoated region was formed so that a part of the copper foil was exposed. Then, rolling was carried out using a roll press so that the density of the negative electrode active material layer was 1.35 g/cm³ to obtain a negative electrode composed of a negative electrode active material layer and a negative electrode current collector.

Then, this negative electrode was cut such that the negative electrode mixture layer had an area of 32 mm×52 mm and included the exposed portion of the copper foil. A lead body formed of nickel for extracting a current was welded to the exposed portion of the copper foil, and vacuum drying was carried out at 80° C. for 12 hours to obtain a lead-attached negative electrode.

(4) Fabrication of Single-Layered Laminate Battery

The lead-attached positive electrode and the lead-attached negative electrode were overlapped by interposing a polyethylene microporous membrane separator (thickness of 21 µm, air permeability of 285 s/100 cc, porosity of 41% by volume) while the mixture coated surfaces of each electrode face each other to fabricate a laminated electrode structure. This laminated electrode structure was housed in an aluminum laminated sheet outer package body of 90 mm×80 mm, and vacuum drying was carried out at 80° C. for 5 hours in order to remove moisture. Subsequently, an electrolyte solution was injected into an outer package body and the outer package body was sealed to fabricate a single-layered laminated type (pouch type) nonaqueous secondary battery (hereinafter also simply referred to as "single-layered laminate battery").

The single-layered laminate battery thus obtained has a design capacity value of 23 mAh and a rated voltage value of 4.2 V.

(5) Evaluation of Single-Layered Laminate Battery

The thus-obtained batteries for evaluation were first subjected to the initial charging/discharging treatment according to the following procedure (5-1). Then, according to the following procedures (5-2) and (5-3), each battery was evaluated. The charging/discharging was carried out using a charging/discharging apparatus ACD-01 (trade name) manufactured by Aska Electronics Co., Ltd., and a thermostatic bath PLM-63S (trade name) manufactured by Futaba Science Co., Ltd.

Here, "1 C" refers to the current value at which a fully charged battery is expected to be discharged in one hour with a constant current to terminate discharging.

(5-1) Initial Charging/Discharging Treatment of Single-Layered Laminate Battery

After setting the ambient temperature of the battery at 25° C. and charging with a constant current of 2.3 mA corresponding to 0.1 C to reach 4.2 V, the battery was charged with a constant voltage of 4.2 V until the current attenuated to a current of 0.46 mA corresponding to 0.02 C. Then, the battery was discharged to 3.0 V with a constant current of 6.9 mA corresponding to 0.3 C.

(5-2) Output Test of Single-Layered Laminate Battery

For the battery subjected to the initial charging/discharging treatment by the method mentioned in (5-1), the ambient temperature of the battery was set at 25° C., and after charging with a constant current of 23 mA corresponding to 1 C to reach 4.2 V, the battery was discharged to 3.0 V with a constant current of 23 mA corresponding to 1 C. The same charging/discharging as above was carried out, except that the current value during discharging with a constant current was changed to 230 mA corresponding to 10 C, the capacity retention rate was calculated by the following formula.

Capacity retention rate=(capacity during 10 C discharging/capacity during 1 C discharging)×100 [%]

Evaluation Criteria:

A: Case where the capacity retention rate is 60% or more

B: Case where the capacity retention rate is 40% or more and less than 60%

C: Case where the capacity retention rate is less than 40%

(5-3) Charging/Discharging Cycle Test of Single-Layered Laminate Battery

For the battery subjected to the initial charging/discharging treatment by the method mentioned in (5-1), the ambient temperature of the battery was set at 25° C., and after charging with a constant current of 23 mA corresponding to 1 C to reach 4.2 V, the battery was charged with a constant voltage of 4.2 V for a total of 3 hours. Then, the battery was discharged to 3 V with a constant current of 23 mA. With this process of carrying out charging and discharging once each serving as one cycle, charging/discharging was carried out for 100 cycles. The discharge capacity in the 100th cycle when the discharge capacity in the 1st cycle was 100% was defined as the capacity retention rate, and evaluation was carried out according to the following criteria.

Evaluation Criteria:

A: Case where the capacity retention rate is 90% or more

B: Case where the capacity retention rate is 80% or more and less than 90%

C: Case where the capacity retention rate is less than 80%

Examples 1-2 to 1-4 and Comparative Example 1-1

In the same manner as in Example 1-1, except that the composition of the nonaqueous electrolyte solution was changed as shown in Table 26, a nonaqueous electrolyte solution was prepared, and using this nonaqueous electrolyte solution, a single-layer laminated battery was prepared.

In Table 26, abbreviations of each component have the following meanings.

<Nonaqueous Solvent>
  AcN: acetonitrile
  DEC: diethyl carbonate
  EC: ethylene carbonate
  VC: vinylene carbonate
<Additives>
  SAH: succinic anhydride
  Li nitrate: lithium nitrate
  $^i$Bu nitrate: isobutyl nitrate
  TMA nitrate: trimethylammonium nitrate Table 26 shows the formulation of the nonaqueous electrolyte solution and the evaluation results of the nonaqueous secondary battery in the above Examples and Comparative Examples.

5 mm. The NMR tube having a diameter of 3 mm was inserted into this NMR tube, and $^1$H NMR measurement was carried out by the double tube method. A heavy water solution of dimethyl sulfoxide (0.398 mg/mL) was prepared as a reference material for quantification, and $^1$H NMR measurement was carried out in the same manner.

As a result, $Li(CO_3)CH_2CH_2(CO_3)Li$ (compound represented by formula (1)), $Li(CO_3)CH_2CH_3$ (compound represented by formula (2)), and $Li(CO_3)CH_3$ were detected.

Example 1-5

(1) Preparation of Nonaqueous Electrolyte Solution

In an inert atmosphere, acetonitrile, diethyl carbonate, ethylene carbonate and vinylene carbonate were mixed at a volume ratio of 49:28:21:2 as nonaqueous solvents. In this mixed solution, 0.3 mol of lithium hexafluorophosphate ($LiPF_6$) and 1.0 mol of lithium bis(fluorosulfonyl)imide ($LiN(SO_2F)_2$) were dissolved as the amount per a total of 1 L of the nonaqueous solvents, and 5.0% by weight of 4-fluoro-1,3-dioxolan-2-one (FEC) and 0.2% by weight of lithium nitrate were added as the additives, followed by mixing to obtain a nonaqueous electrolyte solution.

TABLE 26

| | Composition of nonaqueous electrolyte solution | | | | | | | | | Evaluation results of secondary battery | |
|---|---|---|---|---|---|---|---|---|---|---|---|
| | Composition of nonaqueous solvent (% by volume) | | | | Li salt (molar amount per 1 L of nonaqueous solvent) | | Additives | | | Output test | Cycle test |
| | AcN | DEC | EC | VC | LiPF6 | LiN(SO$_2$F)$_2$ | Type | Amount (% by weight) | Type | Amount (% by weight) | 10 C/1 C capacity retention rate | Capacity retention rate at 100th cycle |
| Example 1-1 | 49 | 28 | 21 | 2 | 0.3 | 1.0 | SAH | 0.2 | Li nitrate | 0.2 | A | A |
| Example 1-2 | 49 | 28 | 21 | 2 | 0.3 | 1.0 | — | 0 | Li nitrate | 1.0 | A | A |
| Example 1-3 | 49 | 28 | 21 | 2 | 0.3 | 1.0 | — | 0 | $^i$Bu nitrate | 0.2 | A | A |
| Example 1-4 | 49 | 28 | 21 | 2 | 0.3 | 1.0 | — | 0 | TMA nitrate | 0.2 | A | A |
| Comparative Example 1-1 | 0 | 68 | 30 | 2 | 0.3 | 1.0 | — | 0 | Li nitrate | 0.2 | C | A |

[Example of Analysis of Negative Electrode]
(1) Preparation of Negative Electrode Extract The nonaqueous secondary battery fabricated in Example 1-1 was subjected to the initial charge/discharge treatment by the method mentioned in (5-1) and then disassembled in an argon atmosphere, and the negative electrode was taken out.

Subsequently, the negative electrode taken out was cut in an argon atmosphere and the weight equivalent to 130 mg including the current collector was placed in a screw tube, and then 1 mL of heavy water was injected into the screw tube, which was sealed with a lid. After allowing to stand for 72 hours, extraction was carried out and cotton plug filtration was carried out by a Pasteur pipette filled with glass wool to obtain an extract.

This extract was subjected to $^1$H-NMR analysis by the following method.

(2) $^1$H-NMR Analysis

The extract thus obtained was charged in an NMR tube having a diameter of 3 mm and sealed.

Separately, tetrafluorobenzene as a reference material was dissolved in deuterated chloroform containing tetramethylsilane as a chemical shift standard, and the solution thus obtained was charged in an NMR tube having a diameter of Visual observation of nonaqueous electrolyte solution thus obtained revealed that all the lithium salts and additives were dissolved.

(2) Fabrication of Positive Electrode

A composite oxide of lithium, nickel, manganese and cobalt ($LiNi_{0.8}Mn_{0.1}Co_{0.1}O_2$) as the positive electrode active material, acetylene black powder having a number-average particle size of 48 nm (density of 1.95 g/cm$^3$) as the conductive aid, and polyvinylidene fluoride (PVDF; density of 1.75 g/cm$^3$) as the binder were mixed at a weight ratio of 92:4:4 to obtain a positive electrode mixture.

N-methyl-2-pyrrolidone was added as the solvent to the positive electrode mixture thus obtained, followed by mixing to prepare a positive electrode mixture-containing slurry. While adjusting the basis weight of this positive electrode mixture-containing slurry, the positive electrode mixture-containing slurry was coated on one side of an aluminum foil having a thickness of 20 μm, which will serve as a positive electrode current collector, and then the solvent was dried and removed in a hot air drying furnace. When the positive electrode mixture-containing slurry was coated on the aluminum foil, an uncoated region was formed so that a part of the aluminum foil was exposed. Both sides of the electrode roll thus obtained were subjected to trimming cut, followed by drying under reduced pressure at 130° C. for 8 hours. Then, the electrode roll was rolled by a roll press so that the density of the positive electrode active material layer was 2.8 g/cm$^3$ to obtain a positive electrode composed of a positive electrode active material layer and a positive electrode current collector. The basis weight was 18.1 mg/cm$^2$ and the weight of the positive electrode active material was 16.7 mg/cm$^2$.

Then, this positive electrode was cut such that the positive electrode mixture layer had an area of 14 mm×20 mm and included the exposed portion of the aluminum foil. A lead piece formed of aluminum for extracting a current was welded to the exposed portion of the aluminum foil, and vacuum drying was carried out at 120° C. for 12 hours to obtain a lead-attached positive electrode.

(3) Fabrication of Negative Electrode

A mixture of Si/SiO$_2$/graphite (weight ratio of 3.19:6.81:90, Si:O=1:1 (molar ratio)) as the negative electrode active material powder, acetylene black powder having a number-average particle size of 48 nm (density of 1.95 g/cm$^3$) as the conductive aid, carboxymethyl cellulose and latex of a styrene-butadiene rubber as the binders were mixed at a weight ratio of 92:4.0:1.5:2.5 to obtain a negative electrode mixture.

An appropriate amount of water was added to the negative electrode mixture thus obtained, followed by mixing to prepare a negative electrode mixture-containing slurry. The solid content concentration of the negative electrode mixture-containing slurry thus obtained was 39.8% by weight. While adjusting the basis weight of this negative electrode mixture-containing slurry, the slurry was coated on one side of a copper foil having a thickness of 10 μm at a given thickness, and then the solvent was dried and removed in a hot air drying furnace. When the negative electrode mixture-containing slurry was coated on the copper foil, an uncoated region was formed so that a part of the copper foil was exposed. Both sides of the electrode roll thus obtained were subjected to trimming cut, followed by drying under reduced pressure at 130° C. for 8 hours. Then, rolling was carried out using a roll press so that the density of the negative electrode active material layer was 1.43 g/cm$^3$ to obtain a negative electrode composed of a negative electrode active material layer and a negative electrode current collector. The basis weight was 7.14 mg/cm$^2$ and the weight of the positive electrode active material was 6.57 mg/cm$^2$. Then, this negative electrode was cut such that the negative electrode mixture layer had an area of 15 mm×21 mm and included the exposed portion of the copper foil. A lead body formed of nickel for extracting a current was welded to the exposed portion of the copper foil, and vacuum drying was carried out at 80° C. for 12 hours to obtain a lead-attached negative electrode.

(4) Fabrication of Single-Layered Laminate Battery

The lead-attached positive electrode and the lead-attached negative electrode were overlapped by interposing a polyethylene microporous membrane separator (thickness of 21 μm, air permeability of 285 s/100 cc, porosity of 41% by volume) while the mixture coated surfaces of each electrode face each other to fabricate a laminated electrode structure. This laminated electrode structure was housed in an aluminum laminated sheet outer package body of 50 mm×100 mm, and vacuum drying was carried out at 80° C. for 5 hours in order to remove moisture. Subsequently, an electrolyte solution was injected into an outer package body and the outer package body was sealed to fabricate a single-layered laminated type (pouch type) nonaqueous secondary battery (single-layered laminate battery). The single-layered laminate battery thus obtained has a design capacity value of 7.5 mAh and a rated voltage value of 4.2 V.

(5) Evaluation of Single-Layered Laminate Battery

The thus-obtained batteries for evaluation were first subjected to the initial charging/discharging treatment according to the following procedure (5-1). Then, according to the following procedures (5-2) and (5-3), each battery was evaluated. The charging/discharging was carried out using a charging/discharging apparatus ACD-01 (trade name) manufactured by Aska Electronics Co., Ltd., and a thermostatic bath PLM-63S (trade name) manufactured by Futaba Science Co., Ltd.

(5-1) Initial Charging/Discharging Treatment of Single-Layered Laminate Battery

After setting the ambient temperature of the battery at 25° C., the battery was charged with a constant current of 0.188 mA corresponding to 0.025 C for 2 hours. After resting for 3 hours, the battery was charged with a constant current of 0.375 mA corresponding to 0.05 C to reach 4.2 V, and then charged with a constant voltage of 4.2 V until the current attenuated to a current of 0.15 mA corresponding to 0.02 C. Then, the battery was discharged to 2.7 V with a constant current of 0.375 mA corresponding to 0.05 C.

(5-2) Output Test of Single-Layered Laminate Battery

For the battery subjected to the initial charging/discharging treatment by the method mentioned in (5-1), the ambient temperature of the battery was set at 25° C., and after charging with a constant current of 1.5 mA corresponding to 0.2 C to reach 4.2 V, the battery was charged with a constant voltage of 4.2 V until the current attenuated to a current of 0.15 mA corresponding to 0.02 C. Then, the battery was discharged to 2.7 V at a current value of 1.5 mA corresponding to 0.2 C. The same charging/discharging as above was carried out, except that the current value during discharging with a constant current was changed to 30 mA corresponding to 4 C, the capacity retention rate was calculated by the following formula.

Capacity retention rate=(capacity during 4 C discharging/capacity during 0.2 C discharging)×100[%]

Evaluation Criteria:
A: Case where the capacity retention rate is 60% or more
B: Case where the capacity retention rate is 40% or more and less than 60%
C: Case where the capacity retention rate is less than 40%

(5-3) Charging/Discharging Cycle Test of Single-Layered Laminate Battery

For the battery subjected to the initial charging/discharging treatment by the method mentioned in (5-1), the ambient temperature of the battery was set at 25° C., and after charging with a constant current of 3.75 mA corresponding to 0.5 C to reach 4.2 V, the battery was charged with a constant voltage of 4.2 V until the current attenuated to 0.15 mA corresponding to 0.02 C. Then, the battery was discharged to 2.7 V with a constant current of 3.75 mA corresponding to 0.5 C. With this process of carrying out charging and discharging once each serving as one cycle, charging/discharging was carried out for 100 cycles. The discharge capacity in the 100th cycle when the discharge capacity in the 1st cycle was 100% was defined as the capacity retention rate, and evaluation was carried out according to the following criteria.

Evaluation Criteria:
A: Case where the capacity retention rate is 90% or more
B: Case where the capacity retention rate is 80% or more and less than 90%
C: Case where the capacity retention rate is less than 80%

Comparative Example 1-2

In the same manner as in Example 1-5, except that the composition of the nonaqueous electrolyte solution was changed as shown in Table 27, a nonaqueous electrolyte solution was prepared, and using this nonaqueous electrolyte solution, a single-layer laminated battery was fabricated and evaluated.

Table 27 shows the formulation of the nonaqueous electrolyte solution in Example 1-5 and Comparative Example 1-2, and the evaluation results of the nonaqueous secondary battery.

In "(5-3) Charging/Discharging Cycle Test of Single-Layer Laminated Battery" of Comparative Example 1-2, the capacity retention rate rapidly decreased at the 25th cycle and was rated "C".

In Table 27, abbreviations of each component have the following meanings.

<Nonaqueous Solvent>
AcN: acetonitrile
DEC: diethyl carbonate
EC: ethylene carbonate
VC: vinylene carbonate
<Additives>
FEC: 4-fluoro-1,3-dioxolan-2-one
Li nitrate: lithium nitrate

TABLE 27

| | Composition of nonaqueous electrolyte solution | | | | | | | | | Evaluation results of secondary battery | |
|---|---|---|---|---|---|---|---|---|---|---|---|
| | Composition of nonaqueous solvent (% by volume) | | | | Li salt (molar amount per 1 L of nonaqueous solvent) | | Additives | | | Output test 4 C/0.2 C capacity retention rate | Cycle test Capacity retention rate at 100th cycle |
| | AcN | DEC | EC | VC | LiPF$_6$ | LiN(SO$_2$F)$_2$ | Type | Amount (% by weight) | Type | Amount (% by weight) | |
| Example 1-5 | 49 | 28 | 21 | 2 | 0.3 | 1.0 | FEC | 5.0 | Li nitrate | 0.2 | A | B |
| Comparative Example 1-2 | 49 | 28 | 21 | 2 | 0.3 | 1.0 | — | 0 | — | 0 | A | C |

Another Example (No. 2)

Examples 2-1 to 2-5 and Comparative Examples 2-1 to 2-2 will be described below.

Example 2-1

(1) Preparation of Nonaqueous Electrolyte Solution

In an inert atmosphere, acetonitrile, diethyl carbonate, ethylene carbonate and vinylene carbonate were mixed at a volume ratio of 49:28:21:2 as the nonaqueous solvents. In this mixed solution, 0.3 mol of lithium hexafluorophosphate (LiPF$_6$) and 1.0 mol of lithium bis(fluorosulfonyl)imide (LiN(SO$_2$F)$_2$) were dissolved as the amount per a total of 1 L of the nonaqueous solvents, and 0.2% by weight of succinic anhydride and 0.2% by weight of polyethylene glycol methyl ether acrylate (number of repeating units of ethylene glycol unit: about 9) were added as the additives, followed by mixing to obtain a nonaqueous electrolyte solution.

Visual observation of nonaqueous electrolyte solution thus obtained revealed that all the lithium salts and additives were dissolved.

(2) Fabrication of Positive Electrode

A composite oxide of lithium, nickel, manganese and cobalt (LiNi$_{0.5}$Mn$_{0.3}$Co$_{0.2}$O$_2$) as the positive electrode active material, acetylene black powder as the conductive aid, and polyvinylidene fluoride (PVDF) as the binder were mixed at a weight ratio of 100:3.5:3 to obtain a positive electrode mixture. N-methyl-2-pyrrolidone was added as the solvent to the positive electrode mixture thus obtained, followed by mixing to prepare a positive electrode mixture-containing slurry. While adjusting the basis weight to about 95.0 g/m$^2$, this positive electrode mixture-containing slurry was coated on one side of an aluminum foil having a thickness of 15 μm, which will serve as a positive electrode current collector. When the positive electrode mixture-containing slurry was coated on the aluminum foil, an uncoated region was formed so that a part of the aluminum foil was exposed. Then, rolling was carried out using a roll press so that the density of the positive electrode active material layer was 2.74 g/cm$^3$ to obtain a positive electrode composed of a positive electrode active material layer and a positive electrode current collector.

Then, this positive electrode was cut such that the positive electrode mixture layer had an area of 30 mm×50 mm and included the exposed portion of the aluminum foil. A lead piece formed of aluminum for extracting a current was welded to the exposed portion of the aluminum foil, and vacuum drying was carried out at 120° C. for 12 hours to obtain a lead-attached positive electrode.

(3) Fabrication of Negative Electrode

Graphite as the negative electrode active material, carboxymethyl cellulose as the binder, and latex of a styrene-butadiene rubber which is also the binder, were mixed at a weight ratio of 100:1.1:1.5 to obtain a negative electrode mixture. An appropriate amount of water was added to the negative electrode mixture thus obtained, followed by sufficient mixing to prepare a negative electrode mixture-containing slurry. While adjusting the basis weight to about 61.0 g/m$^2$, this slurry was coated on one side of a copper foil having a thickness of 10 μm at a given thickness. When the negative electrode mixture-containing slurry was coated on the copper foil, an uncoated region was formed so that a part of the copper foil was exposed. Then, rolling was carried out using a roll press so that the density of the negative electrode active material layer was 1.35 g/cm$^3$ to obtain a negative electrode composed of a negative electrode active material layer and a negative electrode current collector.

Then, this negative electrode was cut such that the negative electrode mixture layer had an area of 32 mm×52 mm and included the exposed portion of the copper foil. A lead body formed of nickel for extracting a current was welded to the exposed portion of the copper foil, and vacuum drying was carried out at 80° C. for 12 hours to obtain a lead-attached negative electrode.

(4) Fabrication of Single-Layered Laminate Battery

The lead-attached positive electrode and the lead-attached negative electrode were overlapped by interposing a polyethylene microporous membrane separator (thickness of 21 μm, air permeability of 285 s/100 cc, porosity of 41% by volume) while the mixture coated surfaces of each electrode face each other to fabricate a laminated electrode structure. This laminated electrode structure was housed in an aluminum laminated sheet outer package body of 90 mm×80 mm, and vacuum drying was carried out at 80° C. for 5 hours in order to remove moisture. Subsequently, an electrolyte solution was injected into an outer package body and the outer package body was sealed to fabricate a single-layered laminated type (pouch type) nonaqueous secondary battery (hereinafter also simply referred to as "single-layered laminate battery").

The single-layered laminate battery thus obtained has a design capacity value of 23 mAh and a rated voltage value of 4.2 V.

(5) Evaluation of Single-Layered Laminate Battery

The thus-obtained batteries for evaluation were first subjected to the initial charging/discharging treatment according to the following procedure (5-1). Then, according to the following procedures (5-2), (5-3) and (5-4), each battery was evaluated. The charging/discharging was carried out using a charging/discharging apparatus ACD-01 (trade name) manufactured by Aska Electronics Co., Ltd., and a thermostatic bath PLM-63S (trade name) manufactured by Futaba Science Co., Ltd.

Here, "1 C" refers to the current value at which a fully charged battery is expected to be discharged in one hour with a constant current to terminate discharging.

(5-1) Initial Charging/Discharging Treatment of Single-Layered Laminate Battery

After setting the ambient temperature of the battery at 25° C. and charging with a constant current of 2.3 mA corresponding to 0.1 C to reach 4.35 V, the battery was charged with a constant voltage of 4.35 V until the current attenuated to a current of 0.46 mA corresponding to 0.02 C. Then, the battery was discharged to 3.0 V with a constant current of 6.9 mA corresponding to 0.3 C.

(5-2) Output Test of Single-Layered Laminate Battery

For the battery subjected to the initial charging/discharging treatment by the method mentioned in (5-1), the ambient temperature of the battery was set at 25° C., and after charging with a constant current of 23 mA corresponding to 1 C to reach 4.35 V, the battery was charged with a constant voltage of 4.35 V for a total of 3 hours. Then, the battery was discharged to 3.0 V with a constant current of 23 mA corresponding to 1 C. The same charging/discharging as above was carried out, except that the current value during discharging with a constant current was changed to 230 mA corresponding to 10 C, the capacity retention rate was calculated by the following formula.

Capacity retention rate=(capacity during 10 C discharging/capacity during 1 C discharging)×100 [%]

Evaluation Criteria:
A: Case where the capacity retention rate is 60% or more
B: Case where the capacity retention rate is 40% or more and less than 60%
C: Case where the capacity retention rate is less than 40%

(5-3) Charging/Discharging Cycle Test at 25° C. of Single-Layered Laminate Battery For the battery subjected to the initial charging/discharging treatment by the method mentioned in (5-1), a cycle test was carried out. This cycle test was carried out by setting the ambient temperature of the battery at 25° C. and maintaining this temperature until completion of the test.

The battery was first charged with a constant current of 23 mA corresponding to 1 C to reach 4.35 V, and then charged with a constant voltage of 4.35 V for a total of 3 hours. Then, the battery was discharged to 3 V with a constant current of 23 mA. With this process of carrying out charging and discharging once each serving as one cycle, charging/discharging was carried out for 100 cycles. The discharge capacity in the 100th cycle when the discharge capacity in the 1st cycle was 100% was defined as the capacity retention rate, and evaluation was carried out according to the following criteria.

Evaluation Criteria:
A: Case where the capacity retention rate is 90% or more
B: Case where the capacity retention rate is 80% or more and less than 90%
C: Case where the capacity retention rate is less than 80%

(5-4) Charging/Discharging Cycle Test at 50° C. of Single-Layered Laminate Battery For the battery subjected to the initial charging/discharging treatment by the method mentioned in (5-1), a cycle test was carried out. This cycle test was started 3 hours after setting the ambient temperature of the battery at 50° C. and maintaining 50° C. until completion of the test.

The battery was first charged with a constant current of 23 mA corresponding to 1 C to reach 4.2 V, and then charged with a constant voltage of 4.2 V for a total of 3 hours. Then, the battery was discharged to 3 V with a constant current of 23 mA. With this process of carrying out charging and discharging once each serving as one cycle, charging/discharging was carried out for 100 cycles. The discharge capacity in the 100th cycle when the discharge capacity in the 1st cycle was 100% was defined as the capacity retention rate, and evaluation was carried out according to the following criteria.

Evaluation Criteria:
A: Case where the capacity retention rate is 80% or more
B: Case where the capacity retention rate is 70% or more and less than 80%
C: Case where the capacity retention rate is less than 70%

Examples 2-2 to 2-4, and Comparative Example 2-1

In the same manner as in Example 2-1, except that the composition of the nonaqueous electrolyte solution was changed as shown in Tables 28 to 29, a nonaqueous electrolyte solution was prepared, and using this nonaqueous electrolyte solution, a single-layer laminated battery was prepared and evaluated.

Tables 28 to 29 show the formulation of the nonaqueous electrolyte solution and the evaluation results of the nonaqueous secondary battery in the above Examples and Comparative Examples.

In Tables 28 to 29, abbreviations of each component have the following meanings.

<Nonaqueous Solvent>
AcN: acetonitrile
DEC: diethyl carbonate
EC: ethylene carbonate
VC: vinylene carbonate <Additives>
  SAH: succinic anhydride
  PEGMEA: polyethylene glycol methyl ether acrylate, number of repeating units of ethylene glycol unit: about 9
  P12BAD: poly(1,2-butylene adipate)
  BUAC: n-butyl acrylate

TABLE 28

| | Composition of nonaqueous electrolyte solution | | | | | | | | |
|---|---|---|---|---|---|---|---|---|---|
| | Composition of nonaqueous solvent (% by volume) | | | | Li salt (molar amount per 1 L of nonaqueous solvent) | | Additives | | |
| | AcN | DEC | EC | VC | LiPF$_6$ | LiN(SO$_2$F)$_2$ | Type | Amount (% by weight) | Type | Amount (% by weight) |
| Example 2-1 | 49 | 28 | 21 | 2 | 0.3 | 1.0 | SAH | 0.2 | PEGMEA | 0.2 |
| Example 2-2 | 49 | 28 | 21 | 2 | 0.3 | 1.0 | — | 0.0 | PEGMEA | 1.0 |
| Example 2-3 | 49 | 28 | 21 | 2 | 0.3 | 1.0 | — | 0.0 | P12BAD | 0.2 |
| Example 2-4 | 49 | 28 | 21 | 2 | 0.3 | 1.0 | — | 0.0 | BUAC | 0.2 |
| Comparative Example 2-1 | 0 | 68 | 30 | 2 | 0.3 | 1.0 | — | 0.0 | PEGMEA | 0.2 |

TABLE 29

| | Evaluation results of secondary battery | | |
|---|---|---|---|
| | | Cycle test | |
| | Output test 10 C/1 C capacity retention rate | 25° C. Capacity retention rate at 100th cycle | 50° C. Capacity retention rate at 100th cycle |
| Example 2-1 | A | A | A |
| Example 2-2 | A | A | A |
| Example 2-3 | A | A | A |
| Example 2-4 | A | A | A |
| Comparative Example 2-1 | C | A | C |

[Example of Analysis of Negative Electrode]
(1) Preparation of Negative Electrode Extract The nonaqueous secondary battery fabricated in Example 2-1 was subjected to the initial charge/discharge treatment by the method mentioned in (5-1) and then disassembled in an argon atmosphere, and the negative electrode was taken out.

Subsequently, the negative electrode taken out was cut in an argon atmosphere and the weight equivalent to 130 mg including the current collector was placed in a screw tube, and then 1 mL of heavy water was injected into the screw tube, which was sealed with a lid. After allowing to stand for 72 hours, extraction was carried out and cotton plug filtration was carried out by a Pasteur pipette filled with glass wool to obtain an extract.

This extract was subjected to $^1$H-NMR analysis by the following method.

(2)$^1$H-NMR Analysis

The extract thus obtained was charged in an NMR tube having a diameter of 3 mm and sealed.

Separately, tetrafluorobenzene as a reference material was dissolved in deuterated chloroform containing tetramethylsilane as a chemical shift standard, and the solution thus obtained was charged in an NMR tube having a diameter of 5 mm. The NMR tube having a diameter of 3 mm was inserted into this NMR tube, and $^1$H NMR measurement was carried out by the double tube method. A heavy water solution of dimethyl sulfoxide (0.398 mg/mL) was prepared as a reference material for quantification, and $^1$H NMR measurement was carried out in the same manner.

As a result, Li(CO$_3$)CH$_2$CH$_2$(CO$_3$)Li (compound represented by formula (1)), Li(CO$_3$)CH$_2$CH$_3$ (compound represented by formula (2)), and Li(CO$_3$)CH$_3$ (compound represented by formula (3)) were detected.

Example 2-5

(1) Preparation of Nonaqueous Electrolyte Solution

In an inert atmosphere, acetonitrile, diethyl carbonate, ethylene carbonate and vinylene carbonate were mixed at a volume ratio of 49:28:21:2 as nonaqueous solvents. In this mixed solution, 0.3 mol of lithium hexafluorophosphate (LiPF$_6$) and 1.0 mol of lithium bis(fluorosulfonyl)imide (LiN(SO$_2$F)$_2$) were dissolved as the amount per a total of 1 L of the nonaqueous solvents, and 5.0% by weight of 4-fluoro-1,3-dioxolan-2-one (FEC) and 0.2% by weight of polyethylene glycol methyl ether acrylate (number of repeating units of ethylene glycol unit: about 9) as the additives, followed by mixing to obtain a nonaqueous electrolyte solution.

Visual observation of nonaqueous electrolyte solution thus obtained revealed that all the lithium salts and additives were dissolved.

(2) Fabrication of Positive Electrode

A composite oxide of lithium, nickel, manganese and cobalt (LiNi$_{0.8}$Mn$_{0.1}$Co$_{0.1}$O$_2$) as the positive electrode active material, acetylene black powder having a number-average particle size of 48 nm (density of 1.95 g/cm$^3$) as the conductive aid, and polyvinylidene fluoride (PVDF; density of 1.75 g/cm$^3$) as the binder were mixed at a weight ratio of 92:4:4 to obtain a positive electrode mixture.

N-methyl-2-pyrrolidone was added as the solvent to the positive electrode mixture thus obtained, followed by mixing to prepare a positive electrode mixture-containing slurry. While adjusting the basis weight of this positive electrode mixture-containing slurry, the positive electrode mixture-containing slurry was coated on one side of an aluminum foil having a thickness of 20 μm, which will serve as a positive electrode current collector and then the solvent was dried and removed in a hot air drying furnace. When the positive electrode mixture-containing slurry was coated on the aluminum foil, an uncoated region was formed so that a part of the aluminum foil was exposed. Both sides of the electrode roll thus obtained were subjected to trimming cut, followed by drying under reduced pressure at 130° C. for 8 hours. Then, the electrode roll was rolled by a roll press so that the density of the positive electrode active material layer was 2.8 g/cm³ to obtain a positive electrode composed of a positive electrode active material layer and a positive electrode current collector. The basis weight was 18.1 mg/cm² and the weight of the positive electrode active material was 16.7 mg/cm².

Then, this positive electrode was cut such that the positive electrode mixture layer had an area of 14 mm×20 mm and included the exposed portion of the aluminum foil. A lead piece formed of aluminum for extracting a current was welded to the exposed portion of the aluminum foil, and vacuum drying was carried out at 120° C. for 12 hours to obtain a lead-attached positive electrode.

(3) Fabrication of Negative Electrode

A mixture of Si/SiO$_2$/graphite (weight ratio of 3.19:6.81:90, Si:O=1:1 (molar ratio)) as the negative electrode active material powder, acetylene black powder having a number-average particle size of 48 nm (density of 1.95 g/cm³) as the conductive aid, carboxymethyl cellulose and latex of a styrene-butadiene rubber as the binders were mixed at a weight ratio of 92:4.0:1.5:2.5 to obtain a negative electrode mixture.

An appropriate amount of water was added to the negative electrode mixture thus obtained, followed by mixing to prepare a negative electrode mixture-containing slurry. The solid content concentration of the negative electrode mixture-containing slurry thus obtained was 39.8% by weight. While adjusting the basis weight of this negative electrode mixture-containing slurry, the slurry was coated on one side of a copper foil having a thickness of 10 µm at a given thickness, and then the solvent was dried and removed in a hot air drying furnace. When the negative electrode mixture-containing slurry was coated on the copper foil, an uncoated region was formed so that a part of the copper foil was exposed. Both sides of the electrode roll thus obtained were subjected to trimming cut, followed by drying under reduced pressure at 130° C. for 8 hours. Then, rolling was carried out using a roll press so that the density of the negative electrode active material layer was 1.43 g/cm³ to obtain a negative electrode composed of a negative electrode active material layer and a negative electrode current collector. The basis weight was 7.14 mg/cm² and the weight of the positive electrode active material was 6.57 mg/cm².

Then, this negative electrode was cut such that the negative electrode mixture layer had an area of 15 mm×21 mm and included the exposed portion of the copper foil. A lead body formed of nickel for extracting a current was welded to the exposed portion of the copper foil, and vacuum drying was carried out at 80° C. for 12 hours to obtain a lead-attached negative electrode.

(4) Fabrication of Single-Layered Laminate Battery

The lead-attached positive electrode and the lead-attached negative electrode were overlapped by interposing a polyethylene microporous membrane separator (thickness of 21 µm, air permeability of 285 s/100 cc, porosity of 41% by volume) while the mixture coated surfaces of each electrode face each other to fabricate a laminated electrode structure. This laminated electrode structure was housed in an aluminum laminated sheet outer package body of 50 mm×100 mm, and vacuum drying was carried out at 80° C. for 5 hours in order to remove moisture. Subsequently, an electrolyte solution was injected into an outer package body and the outer package body was sealed to fabricate a single-layered laminated type (pouch type) nonaqueous secondary battery (single-layered laminate battery). The single-layered laminate battery thus obtained has a design capacity value of 7.5 mAh and a rated voltage value of 4.2 V.

(5) Evaluation of Single-Layered Laminate Battery

The thus-obtained batteries for evaluation were first subjected to the initial charging/discharging treatment according to the following procedure (5-1). Then, according to the following procedures (5-2) and (5-3), each battery was evaluated. The charging/discharging was carried out using a charging/discharging apparatus ACD-01 (trade name) manufactured by Aska Electronics Co., Ltd., and a thermostatic bath PLM-63S (trade name) manufactured by Futaba Science Co., Ltd.

(5-1) Initial Charging/Discharging Treatment of Single-Layered Laminate Battery

After setting the ambient temperature of the battery at 25° C., the battery was charged with a constant current of 0.188 mA corresponding to 0.025 C for 2 hours. After resting for 3 hours, the battery was charged with a constant current of 0.375 mA corresponding to 0.05 C to reach 4.2 V, and then charged with a constant voltage of 4.2 V until the current attenuated to a current of 0.15 mA corresponding to 0.02 C. Then, the battery was discharged to 2.7 V with a constant current of 0.375 mA corresponding to 0.05 C.

(5-2) Output Test of Single-Layered Laminate Battery

For the battery subjected to the initial charging/discharging treatment by the method mentioned in (5-1), the ambient temperature of the battery was set at 25° C., and after charging with a constant current of 1.5 mA corresponding to 0.2 C to reach 4.2 V, the battery was charged with a constant voltage of 4.2 V until the current attenuated to a current of 0.15 mA corresponding to 0.02 C. Then, the battery was discharged to 2.7 V at a current value of 1.5 mA corresponding to 0.2 C. The same charging/discharging as above was carried out, except that the current value during discharging with a constant current was changed to 30 mA corresponding to 4 C, the capacity retention rate was calculated by the following formula.

Capacity retention rate=(capacity during 4 C discharging/capacity during 0.2 C discharging)×100[%]

Evaluation Criteria:
A: Case where the capacity retention rate is 60% or more
B: Case where the capacity retention rate is 40% or more and less than 60%
C: Case where the capacity retention rate is less than 40%

(5-3) Charging/Discharging Cycle Test of Single-Layered Laminate Battery

For the battery subjected to the initial charging/discharging treatment by the method mentioned in (5-1), the ambient temperature of the battery was set at 25° C., and after charging with a constant current of 3.75 mA corresponding to 0.5 C to reach 4.2 V, the battery was charged with a constant voltage of 4.2 V until the current attenuated to 0.15 mA corresponding to 0.02 C. Then, the battery was discharged to 2.7 V with a constant current of 3.75 mA corresponding to 0.5 C. With this process of carrying out charging and discharging once each serving as one cycle, charging/discharging was carried out for 100 cycles. The discharge capacity in the 100th cycle when the discharge capacity in the 1st cycle was 100% was defined as the capacity retention rate, and evaluation was carried out according to the following criteria.

Evaluation Criteria:
A: Case where the capacity retention rate is 90% or more
B: Case where the capacity retention rate is 80% or more and less than 90%
C: Case where the capacity retention rate is less than 80%

Comparative Example 2-2

In the same manner as in Example 2-5, except that the composition of the nonaqueous electrolyte solution was changed as shown in Tables 30 to 31, a nonaqueous electrolyte solution was prepared, and using this nonaqueous electrolyte solution, a single-layer laminated battery was fabricated and evaluated.

Tables 30 to 31 show the formulation of the nonaqueous electrolyte solution in Example 2-5 and Comparative Example 2-2, and the evaluation results of the nonaqueous secondary battery.

In "(5-3) Charging/Discharging Cycle Test of Single-Layer Laminated Battery" of Comparative Example 2-2, the capacity retention rate rapidly decreased at the 25th cycle and was rated "C".

In Tables 30 to 31, abbreviations of each component have the following meanings.

<Nonaqueous Solvent>
AcN: acetonitrile
DEC: diethyl carbonate
EC: ethylene carbonate
VC: vinylene carbonate <Additives>
FEC: 4-fluoro-1,3-dioxolan-2-one
PEGMEA: polyethylene glycol methyl ether acrylate, number of repeating units of ethylene glycol unit: about 9

TABLE 30

| | Composition of nonaqueous electrolyte solution | | | | | | | | |
|---|---|---|---|---|---|---|---|---|---|
| Composition of nonaqueous solvent (% by volume) | | | | Li salt (molar amount per 1 L of nonaqueous solvent) | | Additives | | | |
| AcN | DEC | EC | VC | $LiPF_6$ | $LiN(SO_2F)_2$ | Type | Amount (% by weight) | Type | Amount (% by weight) |
| Example 2-5 | 49 | 28 | 21 | 2 | 0.3 | 1.0 | FEC | 5.0 | PEGMEA | 0.2 |
| Comparative Example 2-2 | 49 | 28 | 21 | 2 | 0.3 | 1.0 | — | 0 | — | 0 |

TABLE 31

| | Evaluation results of secondary battery | |
|---|---|---|
| | Output test 10 C/1 C capacity retention rate | Cycle test 25° C. Capacity retention rate at 100th cycle |
| Example 2-5 | A | B |
| Comparative Example 2-2 | A | C |

Another Example (No. 3)

Examples 3-1 to 3-5 and Comparative Examples 3-1 to 3-2 will be described below.

Example 3-1

(1) Preparation of Nonaqueous Electrolyte Solution

In an inert atmosphere, acetonitrile, diethyl carbonate, ethylene carbonate and vinylene carbonate were mixed at a volume ratio of 49:28:21:2 as the nonaqueous solvents. In this mixed solution, 0.3 mol of lithium hexafluorophosphate ($LiPF_6$) and 1.0 mol of lithium bis(fluorosulfonyl)imide ($LiN(SO_2F)_2$) were dissolved as the amount per a total of 1 L of the nonaqueous solvents, and 0.2% by weight of succinic anhydride and 0.2% by weight of sodium cyanoborohydride were added as the additives, followed by mixing to obtain a nonaqueous electrolyte solution.

Visual observation of nonaqueous electrolyte solution thus obtained revealed that all the lithium salts and additives were dissolved.

(2) Fabrication of Positive Electrode

A composite oxide of lithium, nickel, manganese and cobalt ($LiNi_{0.5}Mn_{0.3}Co_{0.2}O_2$) as the positive electrode active material, acetylene black powder as the conductive aid, and polyvinylidene fluoride (PVDF) as the binder were mixed at a weight ratio of 100:3.5:3 to obtain a positive electrode mixture. N-methyl-2-pyrrolidone was added as the solvent to the positive electrode mixture thus obtained, followed by mixing to prepare a positive electrode mixture-containing slurry. While adjusting the basis weight to about 95.0 g/m², this positive electrode mixture-containing slurry was coated on one side of an aluminum foil having a thickness of 15 μm, which will serve as a positive electrode current collector. When the positive electrode mixture-containing slurry was coated on the aluminum foil, an uncoated region was formed so that a part of the aluminum foil was exposed. Then, rolling was carried out using a roll press so that the density of the positive electrode active material layer was 2.74 g/cm³ to obtain a positive electrode composed of a positive electrode active material layer and a positive electrode current collector.

Then, this positive electrode was cut such that the positive electrode mixture layer had an area of 30 mm×50 mm and included the exposed portion of the aluminum foil. A lead piece formed of aluminum for extracting a current was welded to the exposed portion of the aluminum foil, and vacuum drying was carried out at 120° C. for 12 hours to obtain a lead-attached positive electrode.

(3) Fabrication of Negative Electrode

Graphite as the negative electrode active material, carboxymethyl cellulose as the binder, and latex of a styrene-butadiene rubber which is also the binder, were mixed at a weight ratio of 100:1.1:1.5 to obtain a negative electrode mixture. An appropriate amount of water was added to the negative electrode mixture thus obtained, followed by sufficient mixing to prepare a negative electrode mixture-containing slurry. While adjusting the basis weight to about 61.0 g/m², this slurry was coated on one side of a copper foil having a thickness of 10 μm at a given thickness. When the negative electrode mixture-containing slurry was coated on the copper foil, an uncoated region was formed so that a part of the copper foil was exposed. Then, rolling was carried out using a roll press so that the density of the negative electrode active material layer was 1.35 g/cm³ to obtain a negative electrode composed of a negative electrode active material layer and a negative electrode current collector.

Then, this negative electrode was cut such that the negative electrode mixture layer had an area of 32 mm×52 mm and included the exposed portion of the copper foil. A lead body formed of nickel for extracting a current was welded to the exposed portion of the copper foil, and vacuum drying was carried out at 80° C. for 12 hours to obtain a lead-attached negative electrode.

(4) Fabrication of Single-Layered Laminate Battery

The lead-attached positive electrode and the lead-attached negative electrode were overlapped by interposing a polyethylene microporous membrane separator (thickness of 21 µm, air permeability of 285 s/100 cc, porosity of 41% by volume) while the mixture coated surfaces of each electrode face each other to fabricate a laminated electrode structure. This laminated electrode structure was housed in an aluminum laminated sheet outer package body of 90 mm×80 mm, and vacuum drying was carried out at 80° C. for 5 hours in order to remove moisture. Subsequently, an electrolyte solution was injected into an outer package body and the outer package body was sealed to fabricate a single-layered laminated type (pouch type) nonaqueous secondary battery (hereinafter also simply referred to as "single-layered laminate battery").

The single-layered laminate battery thus obtained has a design capacity value of 23 mAh and a rated voltage value of 4.2 V.

(5) Evaluation of Single-Layered Laminate Battery

The thus-obtained batteries for evaluation were first subjected to the initial charging/discharging treatment according to the following procedure (5-1). Then, according to the following procedures (5-2) and (5-3), each battery was evaluated. The charging/discharging was carried out using a charging/discharging apparatus ACD-01 (trade name) manufactured by Aska Electronics Co., Ltd., and a thermostatic bath PLM-63S (trade name) manufactured by Futaba Science Co., Ltd.

Here, "1 C" refers to the current value at which a fully charged battery is expected to be discharged in one hour with a constant current to terminate discharging.

(5-1) Initial Charging/Discharging Treatment of Single-Layered Laminate Battery

After setting the ambient temperature of the battery at 25° C. and charging with a constant current of 2.3 mA corresponding to 0.1 C to reach 4.2 V, the battery was charged with a constant voltage of 4.2 V until the current attenuated to a current of 0.46 mA corresponding to 0.02 C. Then, the battery was discharged to 3.0 V with a constant current of 6.9 mA corresponding to 0.3 C.

(5-2) Output Test of Single-Layered Laminate Battery

For the battery subjected to the initial charging/discharging treatment by the method mentioned in (5-1), the ambient temperature of the battery was set at 25° C., and after charging with a constant current of 23 mA corresponding to 1 C to reach 4.2 V, the battery was charged with a constant voltage of 4.2 V for a total of 3 hours. Then, the battery was discharged to 3.0 V with a constant current of 23 mA corresponding to 1 C. The same charging/discharging as above was carried out, except that the current value during discharging with a constant current was changed to 230 mA corresponding to 10 C, the capacity retention rate was calculated by the following formula.

Capacity retention rate=(capacity during 10 C discharging/capacity during 1 C discharging)×100 [%]

Evaluation Criteria:
A: Case where the capacity retention rate is 60% or more
B: Case where the capacity retention rate is 40% or more and less than 60%
C: Case where the capacity retention rate is less than 40%

(5-3) Charging/Discharging Cycle Test of Single-Layered Laminate Battery

For the battery subjected to the initial charging/discharging treatment by the method mentioned in (5-1), the ambient temperature of the battery was set at 25° C., and after charging with a constant current of 23 mA corresponding to 1 C to reach 4.2 V, the battery was charged with a constant voltage of 4.2 V for a total of 3 hours. Then, the battery was discharged to 3 V with a constant current of 23 mA. With this process of carrying out charging and discharging once each serving as one cycle, charging/discharging was carried out for 100 cycles. The discharge capacity in the 100th cycle when the discharge capacity in the 1st cycle was 100% was defined as the capacity retention rate, and evaluation was carried out according to the following criteria.

Evaluation Criteria:
A: Case where the capacity retention rate is 90% or more
B: Case where the capacity retention rate is 80% or more and less than 90%
C: Case where the capacity retention rate is less than 80%

Examples 3-2 to 3-4, and Comparative Example 3-1

In the same manner as in Example 3-1, except that the composition of the nonaqueous electrolyte solution was changed as shown in Table 32, a nonaqueous electrolyte solution was prepared, and using this nonaqueous electrolyte solution, a single-layer laminated battery was prepared and evaluated.

In Table 32, abbreviations of each component have the following meanings.

<Nonaqueous Solvent>
AcN: acetonitrile
DEC: diethyl carbonate
EC: ethylene carbonate
VC: vinylene carbonate <Additives>
SAH: succinic anhydride
CHBNa: sodium cyanoborohydride
PhSiH: phenylsilane
TBSH: tri-n-butyltin hydride Table 32 shows the formulation of the nonaqueous electrolyte solution, and the evaluation results of the nonaqueous secondary battery in the above Examples and Comparative Examples.

TABLE 32

| | Composition of nonaqueous electrolyte solution | | | | | | | | | Evaluation results of secondary battery | |
|---|---|---|---|---|---|---|---|---|---|---|---|
| | Composition of nonaqueous solvent (% by volume) | | | | Li salt (molar amount per 1 L of nonaqueous solvent) | | Additives | | | Output test | Cycle test |
| | | | | | | | | Amount | | 10 C/1 C | Capacity retention rate at |
| | | | | | | | | (% by | Amount | capacity | |
| | AcN | DEC | EC | VC | LiPF$_6$ | LiN(SO$_2$F)$_2$ | Type | weight) | Type | (% by weight) | retention rate | 100th cycle |
| Example 3-1 | 49 | 28 | 21 | 2 | 0.3 | 1.0 | SAH | 0.2 | CHBNa | 0.2 | A | A |
| Example 3-2 | 49 | 28 | 21 | 2 | 0.3 | 1.0 | — | 0 | CHBNa | 1.0 | A | A |
| Example 3-3 | 49 | 28 | 21 | 2 | 0.3 | 1.0 | — | 0 | PhSiH | 0.2 | A | A |
| Example 3-4 | 49 | 28 | 21 | 2 | 0.3 | 1.0 | — | 0 | TBSH | 0.2 | A | A |
| Comparative Example 3-1 | 0 | 68 | 30 | 2 | 0.3 | 1.0 | — | 0 | CHBNa | 0.2 | C | A |

[Example of Analysis of Negative Electrode]
(1) Preparation of Negative Electrode Extract The nonaqueous secondary battery fabricated in Example 3-1 was subjected to the initial charge/discharge treatment by the method mentioned in (5-1) and then disassembled in an argon atmosphere, and the negative electrode was taken out.

Subsequently, the negative electrode taken out was cut in an argon atmosphere and the weight equivalent to 130 mg including the current collector was placed in a screw tube, and then 1 mL of heavy water was injected into the screw tube, which was sealed with a lid. After allowing to stand for 72 hours, extraction was carried out and cotton plug filtration was carried out by a Pasteur pipette filled with glass wool to obtain an extract.

This extract was subjected to $^1$H-NMR analysis by the following method.

(2) $^1$H-NMR Analysis

The extract thus obtained was charged in an NMR tube having a diameter of 3 mm and sealed.

Separately, tetrafluorobenzene as a reference material was dissolved in deuterated chloroform containing tetramethylsilane as a chemical shift standard, and the solution thus obtained was charged in an NMR tube having a diameter of 5 mm. The NMR tube having a diameter of 3 mm was inserted into this NMR tube, and $^1$H NMR measurement was carried out by the double tube method. A heavy water solution of dimethyl sulfoxide (0.398 mg/mL) was prepared as a reference material for quantification, and $^1$H NMR measurement was carried out in the same manner.

As a result, Li(CO$_3$)CH$_2$CH$_2$(CO$_3$)Li (compound represented by formula (1)), Li(CO$_3$)CH$_2$CH$_3$ (compound represented by formula (2)), and Li(CO$_3$)CH$_3$ (compound represented by formula (3)) were detected.

Example 3-5

(1) Preparation of Nonaqueous Electrolyte Solution

In an inert atmosphere, acetonitrile, diethyl carbonate, ethylene carbonate and vinylene carbonate were mixed at a volume ratio of 49:28:21:2 as nonaqueous solvents. In this mixed solution, 0.3 mol of lithium hexafluorophosphate (LiPF$_6$) and 1.0 mol of lithium bis(fluorosulfonyl)imide (LiN(SO$_2$F)$_2$) were dissolved as the amount per a total of 1 L of the nonaqueous solvents, and 5.0% by weight of 4-fluoro-1,3-dioxolan-2-one (FEC) and 0.2% by weight of sodium cyanoborohydride (CHBNa) were added as the additives, followed by mixing to obtain a nonaqueous electrolyte solution.

Visual observation of nonaqueous electrolyte solution thus obtained revealed that all the lithium salts and additives were dissolved.

(2) Fabrication of Positive Electrode

A composite oxide of lithium, nickel, manganese and cobalt (LiNi$_{0.8}$Mn$_{0.1}$Co$_{0.1}$O$_2$) as the positive electrode active material, acetylene black powder having a number-average particle size of 48 nm (density of 1.95 g/cm$^3$) as the conductive aid, and polyvinylidene fluoride (PVDF; density of 1.75 g/cm$^3$) as the binder were mixed at a weight ratio of 92:4:4 to obtain a positive electrode mixture.

N-methyl-2-pyrrolidone was added as the solvent to the positive electrode mixture thus obtained, followed by mixing to prepare a positive electrode mixture-containing slurry. While adjusting the basis weight of this positive electrode mixture-containing slurry, the positive electrode mixture-containing slurry was coated on one side of an aluminum foil having a thickness of 20 μm, which will serve as a positive electrode current collector, and then the solvent was dried and removed in a hot air drying furnace. When the positive electrode mixture-containing slurry was coated on the aluminum foil, an uncoated region was formed so that a part of the aluminum foil was exposed. Both sides of the electrode roll thus obtained were subjected to trimming cut, followed by drying under reduced pressure at 130° C. for 8 hours. Then, the electrode roll was rolled by a roll press so that the density of the positive electrode active material layer was 2.8 g/cm$^3$ to obtain a positive electrode composed of a positive electrode active material layer and a positive electrode current collector. The basis weight was 18.1 mg/cm$^2$ and the weight of the positive electrode active material was 16.7 mg/cm$^2$.

Then, this positive electrode was cut such that the positive electrode mixture layer had an area of 14 mm×20 mm and included the exposed portion of the aluminum foil. A lead piece formed of aluminum for extracting a current was welded to the exposed portion of the aluminum foil, and vacuum drying was carried out at 120° C. for 12 hours to obtain a lead-attached positive electrode.

(3) Fabrication of Negative Electrode

A mixture of Si/SiO$_2$/graphite (weight ratio of 3.19:6.81: 90, Si:O=1:1 (molar ratio)) as the negative electrode active material powder, acetylene black powder having a number-average particle size of 48 nm (density of 1.95 g/cm$^3$) as the conductive aid, carboxymethyl cellulose and latex of a styrene-butadiene rubber as the binders were mixed at a weight ratio of 92:4.0:1.5:2.5 to obtain a negative electrode mixture.

An appropriate amount of water was added to the negative electrode mixture thus obtained, followed by mixing to prepare a negative electrode mixture-containing slurry. The solid content concentration of the negative electrode mixture-containing slurry thus obtained was 39.8% by weight. While adjusting the basis weight of this negative electrode mixture-containing slurry, the slurry was coated on one side of a copper foil having a thickness of 10 μm at a given thickness, and then the solvent was dried and removed in a hot air drying furnace. When the negative electrode mixture-containing slurry was coated on the copper foil, an uncoated region was formed so that a part of the copper foil was exposed. Both sides of the electrode roll thus obtained were subjected to trimming cut, followed by drying under reduced pressure at 130° C. for 8 hours. Then, rolling was carried out using a roll press so that the density of the negative electrode active material layer was 1.43 g/cm$^3$ to obtain a negative electrode composed of a negative electrode active material layer and a negative electrode current collector. The basis weight was 7.14 mg/cm$^2$ and the weight of the positive electrode active material was 6.57 mg/cm$^2$.

Then, this negative electrode was cut such that the negative electrode mixture layer had an area of 15 mm×21 mm and included the exposed portion of the copper foil. A lead body formed of nickel for extracting a current was welded to the exposed portion of the copper foil, and vacuum drying was carried out at 80° C. for 12 hours to obtain a lead-attached negative electrode.

(4) Fabrication of Single-Layered Laminate Battery

The lead-attached positive electrode and the lead-attached negative electrode were overlapped by interposing a polyethylene microporous membrane separator (thickness of 21 μm, air permeability of 285 s/100 cc, porosity of 41% by volume) while the mixture coated surfaces of each electrode face each other to fabricate a laminated electrode structure. This laminated electrode structure was housed in an aluminum laminated sheet outer package body of 50 mm×100 mm, and vacuum drying was carried out at 80° C. for 5 hours in order to remove moisture. Subsequently, an electrolyte solution was injected into an outer package body and the outer package body was sealed to fabricate a single-layered laminated type (pouch type) nonaqueous secondary battery (single-layered laminate battery). The single-layered laminate battery thus obtained has a design capacity value of 7.5 mAh and a rated voltage value of 4.2 V.

(5) Evaluation of Single-Layered Laminate Battery

The thus-obtained batteries for evaluation were first subjected to the initial charging/discharging treatment according to the following procedure (5-1). Then, according to the following procedures (5-2) and (5-3), each battery was evaluated. The charging/discharging was carried out using a charging/discharging apparatus ACD-01 (trade name) manufactured by Aska Electronics Co., Ltd., and a thermostatic bath PLM-63S (trade name) manufactured by Futaba Science Co., Ltd.

(5-1) Initial Charging/Discharging Treatment of Single-Layered Laminate Battery

After setting the ambient temperature of the battery at 25° C., the battery was charged with a constant current of 0.188 mA corresponding to 0.025 C for 2 hours. After resting for 3 hours, the battery was charged with a constant current of 0.375 mA corresponding to 0.05 C to reach 4.2 V, and then charged with a constant voltage of 4.2 V until the current attenuated to a current of 0.15 mA corresponding to 0.02 C. Then, the battery was discharged to 2.7 V with a constant current of 0.375 mA corresponding to 0.05 C.

(5-2) Output Test of Single-Layered Laminate Battery

For the battery subjected to the initial charging/discharging treatment by the method mentioned in (5-1), the ambient temperature of the battery was set at 25° C., and after charging with a constant current of 1.5 mA corresponding to 0.2 C to reach 4.2 V, the battery was charged with a constant voltage of 4.2 V until the current attenuated to a current of 0.15 mA corresponding to 0.02 C. Then, the battery was discharged to 2.7 V at a current value of 1.5 mA corresponding to 0.2 C. The same charging/discharging as above was carried out, except that the current value during discharging with a constant current was changed to 30 mA corresponding to 4 C, the capacity retention rate was calculated by the following formula.

Capacity retention rate=(capacity during 4 C discharging/capacity during 0.2 C discharging)× 100[%]

Evaluation Criteria:
A: Case where the capacity retention rate is 60% or more
B: Case where the capacity retention rate is 40% or more and less than 60%
C: Case where the capacity retention rate is less than 40%

(5-3) Charging/Discharging Cycle Test of Single-Layered Laminate Battery

For the battery subjected to the initial charging/discharging treatment by the method mentioned in (5-1), the ambient temperature of the battery was set at 25° C., and after charging with a constant current of 3.75 mA corresponding to 0.5 C to reach 4.2 V, the battery was charged with a constant voltage of 4.2 V until the current attenuated to 0.15 mA corresponding to 0.02 C. Then, the battery was discharged to 2.7 V with a constant current of 3.75 mA corresponding to 0.5 C. With this process of carrying out charging and discharging once each serving as one cycle, charging/discharging was carried out for 100 cycles. The discharge capacity in the 100th cycle when the discharge capacity in the 1st cycle was 100% was defined as the capacity retention rate, and evaluation was carried out according to the following criteria.

Evaluation Criteria:
A: Case where the capacity retention rate is 90% or more
B: Case where the capacity retention rate is 80% or more and less than 90%
C: Case where the capacity retention rate is less than 80%

Comparative Example 3-2

In the same manner as in Example 3-5, except that the composition of the nonaqueous electrolyte solution was changed as shown in Table 33, a nonaqueous electrolyte solution was prepared, and using this nonaqueous electrolyte solution, a single-layer laminated battery was fabricated and evaluated.

Table 33 shows the formulation of the nonaqueous electrolyte solution in Example 3-5 and Comparative Example 3-2, and the evaluation results of the nonaqueous secondary battery.

In "(5-3) Charging/Discharging Cycle Test of Single-Layer Laminated Battery" of Comparative Example 3-2, the capacity retention rate rapidly decreased at the 25th cycle and was rated "C".

In Table 33, abbreviations of each component have the following meanings.

<Nonaqueous Solvent>
AcN: acetonitrile
DEC: diethyl carbonate
EC: ethylene carbonate
VC: vinylene carbonate <Additives>
FEC: 4-fluoro-1,3-dioxolan-2-one
CHBNa: sodium cyanoborohydride

TABLE 33

| | Composition of nonaqueous electrolyte solution | | | | | | | | | | Evaluation results of secondary battery | |
|---|---|---|---|---|---|---|---|---|---|---|---|---|
| | Composition of nonaqueous solvent (% by volume) | | | | Li salt (molar amount per 1 L of nonaqueous solvent) | | Additives | | | | Output test 4 C/0.2 C capacity retention rate | Cycle test Capacity retention rate at 100th cycle |
| | AcN | DEC | EC | VC | LiPF6 | LiN(SO$_2$F)$_2$ | Type | Amount (% by weight) | Type | Amount (% by weight) | | |
| Example 3-5 | 49 | 28 | 21 | 2 | 0.3 | 1.0 | FEC | 5.0 | CHBNa | 0.2 | A | B |
| Comparative Example 3-2 | 49 | 28 | 21 | 2 | 0.3 | 1.0 | — | 0 | — | 0 | A | C |

Another Example (No. 4)

Examples 4-1 to 4-6 and Comparative Examples 4-1 to 4-2 will be described below.

Example 4-1

(1) Preparation of Nonaqueous Electrolyte Solution

In an inert atmosphere, acetonitrile, diethyl carbonate, ethylene carbonate and vinylene carbonate were mixed at a volume ratio of 49:28:21:2 as the nonaqueous solvents. In this mixed solution, 0.3 mol of lithium hexafluorophosphate (LiPF$_6$) and 1.0 mol of lithium bis(fluorosulfonyl)imide (LiN(SO$_2$F)$_2$) were dissolved as the amount per a total of 1 L of the nonaqueous solvents, and 0.2% by weight of succinic anhydride and 0.2% by weight of tris(trimethylsilyl)phosphate were added as the additives, followed by mixing to obtain a nonaqueous electrolyte solution.

Visual observation of nonaqueous electrolyte solution thus obtained revealed that all the lithium salts and additives were dissolved.

(2) Fabrication of Positive Electrode

A composite oxide of lithium, nickel, manganese and cobalt (LiNi$_{0.5}$Mn$_{0.3}$Co$_{0.2}$O$_2$) as the positive electrode active material, acetylene black powder as the conductive aid, and polyvinylidene fluoride (PVDF) as the binder were mixed at a weight ratio of 100:3.5:3 to obtain a positive electrode mixture. N-methyl-2-pyrrolidone was added as the solvent to the positive electrode mixture thus obtained, followed by mixing to prepare a positive electrode mixture-containing slurry. While adjusting the basis weight to about 95.0 g/m$^2$, this positive electrode mixture-containing slurry was coated on one side of an aluminum foil having a thickness of 15 μm, which will serve as a positive electrode current collector. When the positive electrode mixture-containing slurry was coated on the aluminum foil, an uncoated region was formed so that a part of the aluminum foil was exposed. Then, rolling was carried out using a roll press so that the density of the positive electrode active material layer was 2.74 g/cm$^3$ to obtain a positive electrode composed of a positive electrode active material layer and a positive electrode current collector.

Then, this positive electrode was cut such that the positive electrode mixture layer had an area of 30 mm×50 mm and included the exposed portion of the aluminum foil. A lead piece formed of aluminum for extracting a current was welded to the exposed portion of the aluminum foil, and vacuum drying was carried out at 120° C. for 12 hours to obtain a lead-attached positive electrode.

(3) Fabrication of Negative Electrode

Graphite as the negative electrode active material, carboxymethyl cellulose as the binder, and latex of a styrene-butadiene rubber which is also the binder, were mixed at a weight ratio of 100:1.1:1.5 to obtain a negative electrode mixture. An appropriate amount of water was added to the negative electrode mixture thus obtained, followed by sufficient mixing to prepare a negative electrode mixture-containing slurry. While adjusting the basis weight to about 61.0 g/m$^2$, this slurry was coated on one side of a copper foil having a thickness of 10 μm at a given thickness. When the negative electrode mixture-containing slurry was coated on the copper foil, an uncoated region was formed so that a part of the copper foil was exposed. Then, rolling was carried out using a roll press so that the density of the negative electrode active material layer was 1.35 g/cm$^3$ to obtain a negative electrode composed of a negative electrode active material layer and a negative electrode current collector.

Then, this negative electrode was cut such that the negative electrode mixture layer had an area of 32 mm×52 mm and included the exposed portion of the copper foil. A lead body formed of nickel for extracting a current was welded to the exposed portion of the copper foil, and vacuum drying was carried out at 80° C. for 12 hours to obtain a lead-attached negative electrode.

(4) Fabrication of Single-Layered Laminate Battery

The lead-attached positive electrode and the lead-attached negative electrode were overlapped by interposing a polyethylene microporous membrane separator (thickness of 21 μm, air permeability of 285 s/100 cc, porosity of 41% by volume) while the mixture coated surfaces of each electrode face each other to fabricate a laminated electrode structure. This laminated electrode structure was housed in an aluminum laminated sheet outer package body of 90 mm×80 mm, and vacuum drying was carried out at 80° C. for 5 hours in order to remove moisture. Subsequently, an electrolyte solution was injected into an outer package body and the outer package body was sealed to fabricate a single-layered laminated type (pouch type) nonaqueous secondary battery (hereinafter also simply referred to as "single-layered laminate battery").

The single-layered laminate battery thus obtained has a design capacity value of 23 mAh and a rated voltage value of 4.2 V.

(5) Evaluation of Single-Layered Laminate Battery

The thus-obtained batteries for evaluation were first subjected to the initial charging/discharging treatment according to the following procedure (5-1). Then, according to the following procedures (5-2), (5-3), (5-4) and (5-5), each battery was evaluated. The charging/discharging was carried out using a charging/discharging apparatus ACD-01 (trade name) manufactured by Aska Electronics Co., Ltd., and a thermostatic bath PLM-63S (trade name) manufactured by Futaba Science Co., Ltd.

Here, "1 C" refers to the current value at which a fully charged battery is expected to be discharged in one hour with a constant current to terminate discharging.

(5-1) Initial Charging/Discharging Treatment of Single-Layered Laminate Battery

After setting the ambient temperature of the battery at 25° C. and charging with a constant current of 2.3 mA corresponding to 0.1 C to reach 4.35 V, the battery was charged with a constant voltage of 4.35 V until the current attenuated to a current of 0.46 mA corresponding to 0.02 C. Then, the battery was discharged to 3.0 V with a constant current of 6.9 mA corresponding to 0.3 C.

(5-2) Output Test of Single-Layered Laminate Battery

For the battery subjected to the initial charging/discharging treatment by the method mentioned in (5-1), the ambient temperature of the battery was set at 25° C., and after charging with a constant current of 23 mA corresponding to 1 C to reach 4.35 V, the battery was charged with a constant voltage of 4.35 V for a total of 3 hours. Then, the battery was discharged to 3.0 V with a constant current of 23 mA corresponding to 1 C. The same charging/discharging as above was carried out, except that the current value during discharging with a constant current was changed to 230 mA corresponding to 10 C, the capacity retention rate was calculated by the following formula.

Capacity retention rate=(capacity during 10 C discharging/capacity during 1 C discharging)×100 [%]

Evaluation Criteria:
  A: Case where the capacity retention rate is 60% or more
  B: Case where the capacity retention rate is 40% or more and less than 60%
  C: Case where the capacity retention rate is less than 40%

(5-3) Charging/Discharging Cycle Test at 25° C. of Single-Layered Laminate Battery For the battery subjected to the initial charging/discharging treatment by the method mentioned in (5-1), a cycle test was carried out. This cycle test was carried out by setting the ambient temperature of the battery at 25° C. and maintaining this temperature until completion of the test.

The battery was first charged with a constant current of 23 mA corresponding to 1 C to reach 4.35 V, and then charged with a constant voltage of 4.35 V for a total of 3 hours. Then, the battery was discharged to 3 V with a constant current of 23 mA. With this process of carrying out charging and discharging once each serving as one cycle, charging/discharging was carried out for 100 cycles. The discharge capacity in the 100th cycle when the discharge capacity in the 1st cycle was 100% was defined as the capacity retention rate, and evaluation was carried out according to the following criteria.

Evaluation Criteria:
  A: Case where the capacity retention rate is 90% or more
  B: Case where the capacity retention rate is 80% or more and less than 90%
  C: Case where the capacity retention rate is less than 80%

(5-4) Charging/Discharging Cycle Test at −10° C. of Single-Layered Laminate Battery For the battery subjected to the initial charging/discharging treatment by the method mentioned in (5-1), a cycle test was carried out. This cycle test was started 3 hours after setting the ambient temperature of the battery at −10° C. and maintaining −10° C. until completion of the test.

The battery was first charged with a constant current of 4.6 mA corresponding to 0.2 C to reach 4.35 V, and then charged with a constant voltage of 4.35 V until the current attenuated to 0.46 mA corresponding to 0.02 C. Then, the battery was discharged to 2.5 V with a constant current of 4.6 mA. With this process of carrying out charging and discharging once each serving as one cycle, charging/discharging was carried out for 40 cycles. The discharge capacity in the 40th cycle when the discharge capacity in the 1st cycle was 100% was defined as the capacity retention rate, and evaluation was carried out according to the following criteria.

Evaluation Criteria:
  A: Case where the capacity retention rate is 80% or more
  B: Case where the capacity retention rate is 70% or more and less than 80%
  C: Case where the capacity retention rate is less than 70%

Examples 4-2 to 4-4, and Comparative Example 4-1

In the same manner as in Example 4-1, except that the composition of the nonaqueous electrolyte solution was changed as shown in Table 34, a nonaqueous electrolyte solution was prepared, and using this nonaqueous electrolyte solution, a single-layer laminated battery was prepared and evaluated.

Example 4-5

In the same manner as in Example 4-1, except that 1-propene-1,3-sultone was further added in the amount corresponding to 0.2 part by weight based on 100 parts by weight of the total amount of the nonaqueous electrolyte solution, a nonaqueous electrolyte solution was prepared, and using this nonaqueous electrolyte solution, a single-layer laminated battery was prepared and evaluated.

Table 34 shows the composition of the nonaqueous electrolyte solution and the evaluation results of the nonaqueous secondary battery in the above Examples and Comparative Examples.

In Table 34, abbreviations of each component have the following meanings.

<Nonaqueous Solvent>
  AcN: acetonitrile
  DEC: diethyl carbonate
  EC: ethylene carbonate
  VC: vinylene carbonate <Additives>
  SAH: succinic anhydride
  TTSPA: tris(trimethylsilyl)phosphate
  MTSPI: mono(trimethylsilyl)phosphite
  TTFSB: tris(2,2,2-trifluoroethylsilyl)borate
  PES: 1-propene-1,3-sultone

TABLE 34

| | Composition of nonaqueous electrolyte solution | | | | | | | | | | Evaluation results of secondary battery | | |
|---|---|---|---|---|---|---|---|---|---|---|---|---|---|
| | Composition of nonaqueous solvent (% by volume) | | | | Li salt (molar amount per 1 L of nonaqueous solvent) | | Additives | | | | Output test 10 C/1 C | Cycle test 25° C. | Cycle test −10° C. |
| | AcN | DEC | EC | VC | LiPF$_6$ | LiN(SO$_2$F)$_2$ | Type | Amount (% by weight) | Type | Amount (% by weight) | capacity retention rate | Capacity retention rate at 100th cycle | Capacity retention rate at 40th cycle |
| Example 4-1 | 49 | 28 | 21 | 2 | 0.3 | 1.0 | SAH | 0.2 | TTSPA | 0.2 | A | A | A |
| Example 4-2 | 49 | 28 | 21 | 2 | 0.3 | 1.0 | — | 0 | TTSPA | 1.0 | A | A | A |
| Example 4-3 | 49 | 28 | 21 | 2 | 0.3 | 1.0 | — | 0 | MTSPI | 0.2 | A | A | A |
| Example 4-4 | 49 | 28 | 21 | 2 | 0.3 | 1.0 | — | 0 | TTFSB | 0.2 | A | A | A |
| Example 4-5 | 49 | 28 | 21 | 2 | 0.3 | 1.0 | PES | 0.2 | TTSPA | 0.2 | A | A | A |
| Comparative Example 4-1 | 0 | 68 | 30 | 2 | 0.3 | 1.0 | — | 0 | TTFEB | 0.2 | C | A | C |

[Example of Analysis of Negative Electrode]
(1) Fabrication of Negative Electrode Extract The nonaqueous secondary battery fabricated in Example 4-1 was subjected to the initial charge/discharge treatment by the method mentioned in (5-1) and then disassembled in an argon atmosphere, and the negative electrode was taken out.

Subsequently, the negative electrode taken out was cut in an argon atmosphere and the weight equivalent to 130 mg including the current collector was placed in a screw tube, and then 1 mL of heavy water was injected into the screw tube, which was sealed with a lid. After allowing to stand for 72 hours, extraction was carried out and cotton plug filtration was carried out by a Pasteur pipette filled with glass wool to obtain an extract.

This extract was subjected to $^1$H-NMR analysis by the following method.

(2) $^1$H-NMR Analysis

The extract thus obtained was charged in an NMR tube having a diameter of 3 mm and sealed.

Separately, tetrafluorobenzene as a reference material was dissolved in deuterated chloroform containing tetramethylsilane as a chemical shift standard, and the solution thus obtained was charged in an NMR tube having a diameter of 5 mm. The NMR tube having a diameter of 3 mm was inserted into this NMR tube, and $^1$H NMR measurement was carried out by the double tube method. A heavy water solution of dimethyl sulfoxide (0.398 mg/mL) was prepared as a reference material for quantification, and $^1$H NMR measurement was carried out in the same manner.

As a result, Li(CO$_3$)CH$_2$CH$_2$(CO$_3$)Li (compound represented by formula (1)), Li(CO$_3$)CH$_2$CH$_3$ (compound represented by formula (2)), and Li(CO$_3$)CH$_3$ (compound represented by formula (3)) were detected.

Example 4-6

(1) Preparation of Nonaqueous Electrolyte Solution

In an inert atmosphere, acetonitrile, diethyl carbonate, ethylene carbonate and vinylene carbonate were mixed at a volume ratio of 49:28:21:2 as nonaqueous solvents. In this mixed solution, 0.3 mol of lithium hexafluorophosphate (LiPF$_6$) and 1.0 mol of lithium bis(fluorosulfonyl)imide (LiN(SO$_2$F)$_2$) were dissolved as the amount per a total of 1 L of the nonaqueous solvents, and 5.0% by weight of 4-fluoro-1,3-dioxolan-2-one (FEC) and 0.2% by weight of tris(trimethylsilyl)phosphate (TTSPA) as the additives, followed by mixing to obtain a nonaqueous electrolyte solution.

Visual observation of nonaqueous electrolyte solution thus obtained revealed that all the lithium salts and additives were dissolved.

(2) Fabrication of Positive Electrode

A composite oxide of lithium, nickel, manganese and cobalt (LiNi$_{0.8}$Mn$_{0.1}$Co$_{0.1}$O$_2$) as the positive electrode active material, acetylene black powder having a number-average particle size of 48 nm (density of 1.95 g/cm$^3$) as the conductive aid, and polyvinylidene fluoride (PVDF; density of 1.75 g/cm$^3$) as the binder were mixed at a weight ratio of 92:4:4 to obtain a positive electrode mixture.

N-methyl-2-pyrrolidone was added as the solvent to the positive electrode mixture thus obtained, followed by mixing to prepare a positive electrode mixture-containing slurry. While adjusting the basis weight of this positive electrode mixture-containing slurry, the positive electrode mixture-containing slurry was coated on one side of an aluminum foil having a thickness of 20 μm, which will serve as a positive electrode current collector and then the solvent was dried and removed in a hot air drying furnace. When the positive electrode mixture-containing slurry was coated on the aluminum foil, an uncoated region was formed so that a part of the aluminum foil was exposed. Both sides of the electrode roll thus obtained were subjected to trimming cut, followed by drying under reduced pressure at 130° C. for 8 hours. Then, the electrode roll was rolled by a roll press so that the density of the positive electrode active material layer was 2.8 g/cm$^3$ to obtain a positive electrode composed of a positive electrode active material layer and a positive electrode current collector. The basis weight was 18.1 mg/cm$^2$ and the weight of the positive electrode active material was 16.7 mg/cm$^2$.

Then, this positive electrode was cut such that the positive electrode mixture layer had an area of 14 mm×20 mm and included the exposed portion of the aluminum foil. A lead piece formed of aluminum for extracting a current was welded to the exposed portion of the aluminum foil, and vacuum drying was carried out at 120° C. for 12 hours to obtain a lead-attached positive electrode.

(3) Fabrication of Negative Electrode

A mixture of Si/SiO$_2$/graphite (weight ratio of 3.19:6.81:90, Si:O=1:1 (molar ratio)) as the negative electrode active material powder, acetylene black powder having a number-average particle size of 48 nm (density of 1.95 g/cm$^3$) as the conductive aid, carboxymethyl cellulose and latex of a styrene-butadiene rubber as the binders were mixed at a weight ratio of 92:4.0:1.5:2.5 to obtain a negative electrode mixture.

An appropriate amount of water was added to the negative electrode mixture thus obtained, followed by mixing to prepare a negative electrode mixture-containing slurry. The solid content concentration of the negative electrode mixture-containing slurry thus obtained was 39.8% by weight. While adjusting the basis weight of this negative electrode mixture-containing slurry, the slurry was coated on one side of a copper foil having a thickness of 10 μm at a given thickness, and then the solvent was dried and removed in a hot air drying furnace. When the negative electrode mixture-containing slurry was coated on the copper foil, an uncoated region was formed so that a part of the copper foil was exposed. Both sides of the electrode roll thus obtained were subjected to trimming cut, followed by drying under reduced pressure at 130° C. for 8 hours. Then, rolling was carried out using a roll press so that the density of the negative electrode active material layer was 1.43 g/cm$^3$ to obtain a negative electrode composed of a negative electrode active material layer and a negative electrode current collector. The basis weight was 7.14 mg/cm$^2$ and the weight of the positive electrode active material was 6.57 mg/cm$^2$.

Then, this negative electrode was cut such that the negative electrode mixture layer had an area of 15 mm×21 mm and included the exposed portion of the copper foil. A lead body formed of nickel for extracting a current was welded to the exposed portion of the copper foil, and vacuum drying was carried out at 80° C. for 12 hours to obtain a lead-attached negative electrode.

(4) Fabrication of Single-Layered Laminate Battery

The lead-attached positive electrode and the lead-attached negative electrode were overlapped by interposing a polyethylene microporous membrane separator (thickness of 21 μm, air permeability of 285 s/100 cc, porosity of 41% by volume) while the mixture coated surfaces of each electrode face each other to fabricate a laminated electrode structure. This laminated electrode structure was housed in an aluminum laminated sheet outer package body of 50 mm×100 mm, and vacuum drying was carried out at 80° C. for 5 hours in order to remove moisture.

Subsequently, an electrolyte solution was injected into an outer package body and the outer package body was sealed to fabricate a single-layered laminated type (pouch type) nonaqueous secondary battery (single-layered laminate battery). The single-layered laminate battery thus obtained has a design capacity value of 7.5 mAh and a rated voltage value of 4.2 V.

(5) Evaluation of Single-Layered Laminate Battery

The thus-obtained batteries for evaluation were first subjected to the initial charging/discharging treatment according to the following procedure (5-1). Then, according to the following procedures (5-2) and (5-3), each battery was evaluated. The charging/discharging was carried out using a charging/discharging apparatus ACD-01 (trade name) manufactured by Aska Electronics Co., Ltd., and a thermostatic bath PLM-63S (trade name) manufactured by Futaba Science Co., Ltd.

(5-1) Initial Charging/Discharging Treatment of Single-Layered Laminate Battery

After setting the ambient temperature of the battery at 25° C., the battery was charged with a constant current of 0.188 mA corresponding to 0.025 C for 2 hours. After resting for 3 hours, the battery was charged with a constant current of 0.375 mA corresponding to 0.05 C to reach 4.2 V, and then charged with a constant voltage of 4.2 V until the current attenuated to a current of 0.15 mA corresponding to 0.02 C. Then, the battery was discharged to 2.7 V with a constant current of 0.375 mA corresponding to 0.05 C.

(5-2) Output Test of Single-Layered Laminate Battery

For the battery subjected to the initial charging/discharging treatment by the method mentioned in (5-1), the ambient temperature of the battery was set at 25° C., and after charging with a constant current of 1.5 mA corresponding to 0.2 C to reach 4.2 V, the battery was charged with a constant voltage of 4.2 V until the current attenuated to a current of 0.15 mA corresponding to 0.02 C. Then, the battery was discharged to 2.7 V at a current value of 1.5 mA corresponding to 0.2 C. The same charging/discharging as above was carried out, except that the current value during discharging with a constant current was changed to 30 mA corresponding to 4 C, the capacity retention rate was calculated by the following formula.

$$\text{Capacity retention rate} = (\text{capacity during 4 C discharging/capacity during 0.2 C discharging}) \times 100[\%]$$

Evaluation Criteria:
  A: Case where the capacity retention rate is 60% or more
  B: Case where the capacity retention rate is 40% or more and less than 60%
  C: Case where the capacity retention rate is less than 40%

(5-3) Charging/Discharging Cycle Test of Single-Layered Laminate Battery

For the battery subjected to the initial charging/discharging treatment by the method mentioned in (5-1), the ambient temperature of the battery was set at 25° C., and after charging with a constant current of 3.75 mA corresponding to 0.5 C to reach 4.2 V, the battery was charged with a constant voltage of 4.2 V until the current attenuated to 0.15 mA corresponding to 0.02 C. Then, the battery was discharged to 2.7 V with a constant current of 3.75 mA corresponding to 0.5 C. With this process of carrying out charging and discharging once each serving as one cycle, charging/discharging was carried out for 100 cycles. The discharge capacity in the 100th cycle when the discharge capacity in the 1st cycle was 100% was defined as the capacity retention rate, and evaluation was carried out according to the following criteria.

Evaluation Criteria:
  A: Case where the capacity retention rate is 90% or more
  B: Case where the capacity retention rate is 80% or more and less than 90%
  C: Case where the capacity retention rate is less than 80%

Comparative Example 4-2

In the same manner as in Example 4-6, except that the composition of the nonaqueous electrolyte solution was changed as shown in Table 35, a nonaqueous electrolyte solution was prepared, and using this nonaqueous electrolyte solution, a single-layer laminated battery was fabricated and evaluated.

Table 35 shows the formulation of the nonaqueous electrolyte solution in Example 4-6 and Comparative Example 4-2, and the evaluation results of the nonaqueous secondary battery.

In "(5-3) Charging/Discharging Cycle Test of Single-Layer Laminated Battery" of Comparative Example 4-2, the capacity retention rate rapidly decreased at the 25th cycle and was rated "C".

In Table 35, abbreviations of each component have the following meanings.

<Nonaqueous Solvent>
  AcN: acetonitrile
  DEC: diethyl carbonate
  EC: ethylene carbonate
  VC: vinylene carbonate
<Additives>
  FEC: 4-fluoro-1,3-dioxolan-2-one
  TTSPA: tris(trimethylsilyl)phosphate was 2.74 g/cm$^3$ to obtain a positive electrode composed of a positive electrode active material layer and a positive electrode current collector.

Then, this positive electrode was cut such that the positive electrode mixture layer had an area of 30 mm×50 mm and included the exposed portion of the aluminum foil. A lead piece formed of aluminum for extracting a current was welded to the exposed portion of the aluminum foil, and vacuum drying was carried out at 120° C. for 12 hours to obtain a lead-attached positive electrode.

TABLE 35

| | Composition of nonaqueous electrolyte solution | | | | | | | | | Evaluation results of secondary battery | |
|---|---|---|---|---|---|---|---|---|---|---|---|
| | Composition of nonaqueous solvent (% by volume) | | | | Li salt (molar amount per 1 L of nonaqueous solvent) | | Additives | | | Output test | Cycle test 25° C. |
| | AcN | DEC | EC | VC | LiPF$_6$ | LiN(SO$_2$F)$_2$ | Type | Amount (% by weight) | Type | Amount (% by weight) | 10 C/1 C capacity retention rate | Capacity retention rate at 100th cycle |
| Example 4-6 | 49 | 28 | 21 | 2 | 0.3 | 1.0 | FEC | 5.0 | TTSPA | 0.2 | A | B |
| Comparative Example 4-2 | 49 | 28 | 21 | 2 | 0.3 | 1.0 | — | 0 | — | 0 | A | C |

Another Example (No. 5)

Examples 5-1 to 5-5 and Comparative Examples 5-1 to 5-2 will be described below.

Example 5-1

(1) Preparation of Nonaqueous Electrolyte Solution

In an inert atmosphere, acetonitrile, diethyl carbonate, ethylene carbonate and vinylene carbonate were mixed at a volume ratio of 49:28:21:2 as the nonaqueous solvents. In this mixed solution, 0.3 mol of lithium hexafluorophosphate (LiPF$_6$) and 1.0 mol of lithium bis(fluorosulfonyl)imide (LiN(SO$_2$F)$_2$) were dissolved as the amount per a total of 1 L of the nonaqueous solvents, and 0.2% by weight of succinic anhydride and 0.2% by weight of tris(2,2,2-trifluoroethyl)borate were added as the additives, followed by mixing to obtain a nonaqueous electrolyte solution.

Visual observation of nonaqueous electrolyte solution thus obtained revealed that all the lithium salts and additives were dissolved.

(2) Fabrication of Positive Electrode

A composite oxide of lithium, nickel, manganese and cobalt (LiNi$_{0.5}$Mn$_{0.3}$Co$_{0.2}$O$_2$) as the positive electrode active material, acetylene black powder as the conductive aid, and polyvinylidene fluoride (PVDF) as the binder were mixed at a weight ratio of 100:3.5:3 to obtain a positive electrode mixture. N-methyl-2-pyrrolidone was added as the solvent to the positive electrode mixture thus obtained, followed by mixing to prepare a positive electrode mixture-containing slurry. While adjusting the basis weight to about 95.0 g/m$^2$, this positive electrode mixture-containing slurry was coated on one side of an aluminum foil having a thickness of 15 μm, which will serve as a positive electrode current collector. When the positive electrode mixture-containing slurry was coated on the aluminum foil, an uncoated region was formed so that a part of the aluminum foil was exposed. Then, rolling was carried out using a roll press so that the density of the positive electrode active material layer (3) Fabrication of Negative Electrode Graphite as the negative electrode active material, carboxymethyl cellulose as the binder, and latex of a styrene-butadiene rubber which is also the binder, were mixed at a weight ratio of 100:1.1:1.5 to obtain a negative electrode mixture. An appropriate amount of water was added to the negative electrode mixture thus obtained, followed by sufficient mixing to prepare a negative electrode mixture-containing slurry. While adjusting the basis weight to about 61.0 g/m$^2$, this slurry was coated on one side of a copper foil having a thickness of 10 μm at a given thickness. When the negative electrode mixture-containing slurry was coated on the copper foil, an uncoated region was formed so that a part of the copper foil was exposed. Then, rolling was carried out using a roll press so that the density of the negative electrode active material layer was 1.35 g/cm$^3$ to obtain a negative electrode composed of a negative electrode active material layer and a negative electrode current collector.

Then, this negative electrode was cut such that the negative electrode mixture layer had an area of 32 mm×52 mm and included the exposed portion of the copper foil. A lead body formed of nickel for extracting a current was welded to the exposed portion of the copper foil, and vacuum drying was carried out at 80° C. for 12 hours to obtain a lead-attached negative electrode.

(4) Fabrication of Single-Layered Laminate Battery

The lead-attached positive electrode and the lead-attached negative electrode were overlapped by interposing a polyethylene microporous membrane separator (thickness of 21 μm, air permeability of 285 s/100 cc, porosity of 41% by volume) while the mixture coated surfaces of each electrode face each other to fabricate a laminated electrode structure. This laminated electrode structure was housed in an aluminum laminated sheet outer package body of 90 mm×80 mm, and vacuum drying was carried out at 80° C. for 5 hours in order to remove moisture. Subsequently, an electrolyte solution was injected into an outer package body and the outer package body was sealed to fabricate a single-layered laminated type (pouch type) nonaqueous secondary battery (hereinafter also simply referred to as "single-layered laminate battery").

The single-layered laminate battery thus obtained has a design capacity value of 23 mAh and a rated voltage value of 4.2 V.

(5) Evaluation of Single-Layered Laminate Battery

The thus-obtained batteries for evaluation were first subjected to the initial charging/discharging treatment according to the following procedure (5-1). Then, according to the following procedures (5-2), (5-3) and (5-4), each battery was evaluated. The charging/discharging was carried out using a charging/discharging apparatus ACD-01 (trade name) manufactured by Aska Electronics Co., Ltd., and a thermostatic bath PLM-63S (trade name) manufactured by Futaba Science Co., Ltd.

Here, "1 C" refers to the current value at which a fully charged battery is expected to be discharged in one hour with a constant current to terminate discharging.

(5-1) Initial Charging/Discharging Treatment of Single-Layered Laminate Battery

After setting the ambient temperature of the battery at 25° C. and charging with a constant current of 2.3 mA corresponding to 0.1 C to reach 4.2 V, the battery was charged with a constant voltage of 4.2 V until the current attenuated to a current of 0.46 mA corresponding to 0.02 C. Then, the battery was discharged to 3.0 V with a constant current of 6.9 mA corresponding to 0.3 C.

(5-2) Output Test of Single-Layered Laminate Battery

For the battery subjected to the initial charging/discharging treatment by the method mentioned in (5-1), the ambient temperature of the battery was set at 25° C., and after charging with a constant current of 23 mA corresponding to 1 C to reach 4.2 V, the battery was charged with a constant voltage of 4.2 V for a total of 3 hours. Then, the battery was discharged to 3.0 V with a constant current of 23 mA corresponding to 1 C. The same charging/discharging as above was carried out, except that the current value during discharging with a constant current was changed to 230 mA corresponding to 10 C, the capacity retention rate was calculated by the following formula.

Capacity retention rate=(capacity during 10 C discharging/capacity during 1 C discharging)×100 [%]

Evaluation Criteria:
A: Case where the capacity retention rate is 60% or more
B: Case where the capacity retention rate is 40% or more and less than 60%
C: Case where the capacity retention rate is less than 40%

(5-3) Charging/Discharging Cycle Test at 25° C. of Single-Layered Laminate Battery For the battery subjected to the initial charging/discharging treatment by the method mentioned in (5-1), a cycle test was carried out. This cycle test was carried out by setting the ambient temperature of the battery at 25° C. and maintaining this temperature until completion of the test.

The battery was first charged with a constant current of 23 mA corresponding to 1 C to reach 4.2 V, and then charged with a constant voltage of 4.2 V for a total of 3 hours. Then, the battery was discharged to 3 V with a constant current of 23 mA. With this process of carrying out charging and discharging once each serving as one cycle, charging/discharging was carried out for 100 cycles. The discharge capacity in the 100th cycle when the discharge capacity in the 1st cycle was 100% was defined as the capacity retention rate, and evaluation was carried out according to the following criteria.

Evaluation Criteria:
A: Case where the capacity retention rate is 90% or more
B: Case where the capacity retention rate is 80% or more and less than 90%
C: Case where the capacity retention rate is less than 80%

(5-4) Charging/Discharging Cycle Test at −10° C. of Single-Layered Laminate Battery For the battery subjected to the initial charging/discharging treatment by the method mentioned in (5-1), a cycle test was carried out. This cycle test was started 3 hours after setting the ambient temperature of the battery at −10° C. and maintaining −10° C. until completion of the test.

The battery was first charged with a constant current of 4.6 mA corresponding to 0.2 C to reach 4.2 V, and then charged with a constant voltage of 4.2 V until the current attenuated to 0.46 mA corresponding to 0.02 C. Then, the battery was discharged to 2.5 V with a constant current of 4.6 mA. With this process of carrying out charging and discharging once each serving as one cycle, charging/discharging was carried out for 40 cycles. The discharge capacity in the 40th cycle when the discharge capacity in the 1st cycle was 100% was defined as the capacity retention rate, and evaluation was carried out according to the following criteria.

Evaluation Criteria:
A: Case where the capacity retention rate is 80% or more
B: Case where the capacity retention rate is 70% or more and less than 80%
C: Case where the capacity retention rate is less than 70%

Examples 5-2 to 5-4, and Comparative Example 5-1

In the same manner as in Example 5-1, except that the composition of the nonaqueous electrolyte solution was changed as shown in Tables 36 to 37, a nonaqueous electrolyte solution was prepared, and using this nonaqueous electrolyte solution, a single-layer laminated battery was prepared and evaluated.

Tables 36 to 37 show the composition of the nonaqueous electrolyte solution and the evaluation results of the nonaqueous secondary battery in the above Examples and Comparative Examples.

In Tables 36 to 37, abbreviations of each component have the following meanings.

<Nonaqueous Solvent>
AcN: acetonitrile
DEC: diethyl carbonate
EC: ethylene carbonate
VC: vinylene carbonate <Additives>
SAH: succinic anhydride
TTFEB: tris(2,2,2-trifluoroethyl)borate
NPGDB: bis(neopentylglycolato)diboron
BTMDB: bis(trimethylene)diborate

TABLE 36

| | Composition of nonaqueous electrolyte solution | | | | | | | | |
|---|---|---|---|---|---|---|---|---|---|
| | Composition of nonaqueous solvent (% by volume) | | | | Li salt (molar amount per 1 L of nonaqueous solvent) | | Additives | | |
| | AcN | DEC | EC | VC | LiPF$_6$ | LiN(SO$_2$F)$_2$ | Type | Amount (% by weight) | Type | Amount (% by weight) |
| Example 5-1 | 49 | 28 | 21 | 2 | 0.3 | 1.0 | SAH | 0.2 | TTFEB | 0.2 |
| Example 5-2 | 49 | 28 | 21 | 2 | 0.3 | 1.0 | — | 0 | TTFEB | 1.0 |
| Example 5-3 | 49 | 28 | 21 | 2 | 0.3 | 1.0 | — | 0 | NPGDB | 0.2 |
| Example 5-4 | 49 | 28 | 21 | 2 | 0.3 | 1.0 | — | 0 | BTMDB | 0.2 |
| Comparative Example 5-1 | 0 | 68 | 30 | 2 | 0.3 | 1.0 | — | 0 | TTFEB | 0.2 |

TABLE 37

| | Evaluation results of secondary battery | | |
|---|---|---|---|
| | Output test 10 C/1 C capacity retention rate | Cycle test 25° C. Capacity retention rate at 100th cycle | −10° C. Capacity retention rate at 40th cycle |
| Example 5-1 | A | A | A |
| Example 5-2 | A | A | A |
| Example 5-3 | A | A | A |
| Example 5-4 | A | A | A |
| Comparative Example 5-1 | C | A | C |

[Example of Analysis of Negative Electrode]

(1) Preparation of Negative Electrode Extract

The nonaqueous secondary battery fabricated in Example 5-1 was subjected to the initial charge/discharge treatment by the method mentioned in (5-1) and then disassembled in an argon atmosphere, and the negative electrode was taken out.

Subsequently, the negative electrode taken out was cut in an argon atmosphere and the weight equivalent to 130 mg including the current collector was placed in a screw tube, and then 1 mL of heavy water was injected into the screw tube, which was sealed with a lid. After allowing to stand for 72 hours, extraction was carried out and cotton plug filtration was carried out by a Pasteur pipette filled with glass wool to obtain an extract.

This extract was subjected to $^1$H-NMR analysis by the following method.

(2) $^1$H-NMR Analysis

The extract thus obtained was charged in an NMR tube having a diameter of 3 mm and sealed.

Separately, tetrafluorobenzene as a reference material was dissolved in deuterated chloroform containing tetramethylsilane as a chemical shift standard, and the solution thus obtained was charged in an NMR tube having a diameter of 5 mm. The NMR tube having a diameter of 3 mm was inserted into this NMR tube, and $^1$H NMR measurement was carried out by the double tube method. A heavy water solution of dimethyl sulfoxide (0.398 mg/mL) was prepared as a reference material for quantification, and $^1$H NMR measurement was carried out in the same manner.

As a result, Li(CO$_3$)CH$_2$CH$_2$(CO$_3$)Li (compound represented by formula (1)), Li(CO$_3$)CH$_2$CH$_3$ (compound represented by formula (2)), and Li(CO$_3$)CH$_3$ (compound represented by formula (3)) were detected.

Example 5-5

(1) Preparation of Nonaqueous Electrolyte Solution

In an inert atmosphere, acetonitrile, diethyl carbonate, ethylene carbonate and vinylene carbonate were mixed at a volume ratio of 49:28:21:2 as nonaqueous solvents. In this mixed solution, 0.3 mol of lithium hexafluorophosphate (LiPF$_6$) and 1.0 mol of lithium bis(fluorosulfonyl)imide (LiN(SO$_2$F)$_2$) were dissolved as the amount per a total of 1 L of the nonaqueous solvents, and 5.0% by weight of 4-fluoro-1,3-dioxolan-2-one (FEC) and 0.2% by weight of tris(2,2,2-trifluoroethyl)borate as the additives, followed by mixing to obtain a nonaqueous electrolyte solution.

Visual observation of nonaqueous electrolyte solution thus obtained revealed that all the lithium salts and additives were dissolved.

(2) Fabrication of Positive Electrode

A composite oxide of lithium, nickel, manganese and cobalt (LiNi$_{0.8}$Mn$_{0.1}$Co$_{0.1}$O$_2$) as the positive electrode active material, acetylene black powder having a number-average particle size of 48 nm (density of 1.95 g/cm$^3$) as the conductive aid, and polyvinylidene fluoride (PVDF; density of 1.75 g/cm$^3$) as the binder were mixed at a weight ratio of 92:4:4 to obtain a positive electrode mixture.

N-methyl-2-pyrrolidone was added as the solvent to the positive electrode mixture thus obtained, followed by mixing to prepare a positive electrode mixture-containing slurry. While adjusting the basis weight of this positive electrode mixture-containing slurry, the positive electrode mixture-containing slurry was coated on one side of an aluminum foil having a thickness of 20 μm, which will serve as a positive electrode current collector and then the solvent was dried and removed in a hot air drying furnace. When the positive electrode mixture-containing slurry was coated on the aluminum foil, an uncoated region was formed so that a part of the aluminum foil was exposed. Both sides of the electrode roll thus obtained were subjected to trimming cut, followed by drying under reduced pressure at 130° C. for 8 hours. Then, the electrode roll was rolled by a roll press so that the density of the positive electrode active material layer was 2.8 g/cm$^3$ to obtain a positive electrode composed of a positive electrode active material layer and a positive electrode current collector. The basis weight was 18.1 mg/cm$^2$ and the weight of the positive electrode active material was 16.7 mg/cm$^2$.

Then, this positive electrode was cut such that the positive electrode mixture layer had an area of 14 mm×20 mm and included the exposed portion of the aluminum foil. A lead piece formed of aluminum for extracting a current was welded to the exposed portion of the aluminum foil, and vacuum drying was carried out at 120° C. for 12 hours to obtain a lead-attached positive electrode.

(3) Fabrication of Negative Electrode

A mixture of Si/SiO$_2$/graphite (weight ratio of 3.19:6.81:90, Si:O=1:1 (molar ratio)) as the negative electrode active material powder, acetylene black powder having a number-average particle size of 48 nm (density of 1.95 g/cm$^3$) as the conductive aid, carboxymethyl cellulose and latex of a styrene-butadiene rubber as the binders were mixed at a weight ratio of 92:4.0:1.5:2.5 to obtain a negative electrode mixture.

An appropriate amount of water was added to the negative electrode mixture thus obtained, followed by mixing to prepare a negative electrode mixture-containing slurry. The solid content concentration of the negative electrode mixture-containing slurry thus obtained was 39.8% by weight. While adjusting the basis weight of this negative electrode mixture-containing slurry, the slurry was coated on one side of a copper foil having a thickness of 10 μm at a given thickness, and then the solvent was dried and removed in a hot air drying furnace. When the negative electrode mixture-containing slurry was coated on the copper foil, an uncoated region was formed so that a part of the copper foil was exposed. Both sides of the electrode roll thus obtained were subjected to trimming cut, followed by drying under reduced pressure at 130° C. for 8 hours. Then, rolling was carried out using a roll press so that the density of the negative electrode active material layer was 1.43 g/cm$^3$ to obtain a negative electrode composed of a negative electrode active material layer and a negative electrode current collector. The basis weight was 7.14 mg/cm$^2$ and the weight of the positive electrode active material was 6.57 mg/cm$^2$.

Then, this negative electrode was cut such that the negative electrode mixture layer had an area of 15 mm×21 mm and included the exposed portion of the copper foil. A lead body formed of nickel for extracting a current was welded to the exposed portion of the copper foil, and vacuum drying was carried out at 80° C. for 12 hours to obtain a lead-attached negative electrode.

(4) Fabrication of Single-Layered Laminate Battery

The lead-attached positive electrode and the lead-attached negative electrode were overlapped by interposing a polyethylene microporous membrane separator (thickness of 21 μm, air permeability of 285 s/100 cc, porosity of 41% by volume) while the mixture coated surfaces of each electrode face each other to fabricate a laminated electrode structure. This laminated electrode structure was housed in an aluminum laminated sheet outer package body of 50 mm×100 mm, and vacuum drying was carried out at 80° C. for 5 hours in order to remove moisture. Subsequently, an electrolyte solution was injected into an outer package body and the outer package body was sealed to fabricate a single-layered laminated type (pouch type) nonaqueous secondary battery (single-layered laminate battery). The single-layered laminate battery thus obtained has a design capacity value of 7.5 mAh and a rated voltage value of 4.2 V.

(5) Evaluation of Single-Layered Laminate Battery

The thus-obtained batteries for evaluation were first subjected to the initial charging/discharging treatment according to the following procedure (5-1). Then, according to the following procedures (5-2) and (5-3), each battery was evaluated. The charging/discharging was carried out using a charging/discharging apparatus ACD-01 (trade name) manufactured by Aska Electronics Co., Ltd., and a thermostatic bath PLM-63S (trade name) manufactured by Futaba Science Co., Ltd.

(5-1) Initial Charging/Discharging Treatment of Single-Layered Laminate Battery

After setting the ambient temperature of the battery at 25° C., the battery was charged with a constant current of 0.188 mA corresponding to 0.025 C for 2 hours. After resting for 3 hours, the battery was charged with a constant current of 0.375 mA corresponding to 0.05 C to reach 4.2 V, and then charged with a constant voltage of 4.2 V until the current attenuated to a current of 0.15 mA corresponding to 0.02 C. Then, the battery was discharged to 2.7 V with a constant current of 0.375 mA corresponding to 0.05 C.

(5-2) Output Test of Single-Layered Laminate Battery

For the battery subjected to the initial charging/discharging treatment by the method mentioned in (5-1), the ambient temperature of the battery was set at 25° C., and after charging with a constant current of 1.5 mA corresponding to 0.2 C to reach 4.2 V, the battery was charged with a constant voltage of 4.2 V until the current attenuated to a current of 0.15 mA corresponding to 0.02 C. Then, the battery was discharged to 2.7 V at a current value of 1.5 mA corresponding to 0.2 C. The same charging/discharging as above was carried out, except that the current value during discharging with a constant current was changed to 30 mA corresponding to 4 C, the capacity retention rate was calculated by the following formula.

$$\text{Capacity retention rate} = (\text{capacity during 4 C discharging}/\text{capacity during 0.2 C discharging}) \times 100[\%]$$

Evaluation Criteria:
A: Case where the capacity retention rate is 60% or more
B: Case where the capacity retention rate is 40% or more and less than 60%
C: Case where the capacity retention rate is less than 40%

(5-3) Charging/Discharging Cycle Test of Single-Layered Laminate Battery

For the battery subjected to the initial charging/discharging treatment by the method mentioned in (5-1), the ambient temperature of the battery was set at 25° C., and after charging with a constant current of 3.75 mA corresponding to 0.5 C to reach 4.2 V, the battery was charged with a constant voltage of 4.2 V until the current attenuated to 0.15 mA corresponding to 0.02 C. Then, the battery was discharged to 2.7 V with a constant current of 3.75 mA corresponding to 0.5 C. With this process of carrying out charging and discharging once each serving as one cycle, charging/discharging was carried out for 100 cycles. The discharge capacity in the 100th cycle when the discharge capacity in the 1st cycle was 100% was defined as the capacity retention rate, and evaluation was carried out according to the following criteria.

Evaluation Criteria:
A: Case where the capacity retention rate is 90% or more
B: Case where the capacity retention rate is 80% or more and less than 90%
C: Case where the capacity retention rate is less than 80%

Comparative Example 5-2

In the same manner as in Example 5-5, except that the composition of the nonaqueous electrolyte solution was changed as shown in Tables 38 to 39, a nonaqueous electrolyte solution was prepared, and using this nonaqueous electrolyte solution, a single-layer laminated battery was fabricated and evaluated.

Tables 38 to 39 show the formulation of the nonaqueous electrolyte solution in Example 5-5 and Comparative Example 5-2, and the evaluation results of the nonaqueous secondary battery.

In "(5-3) Charging/Discharging Cycle Test of Single-Layer Laminated Battery" of Comparative Example 5-2, the capacity retention rate rapidly decreased at the 25th cycle and was rated "C".

In Tables 38 to 39, abbreviations of each component have the following meanings.

<Nonaqueous Solvent>
AcN: acetonitrile
DEC: diethyl carbonate
EC: ethylene carbonate
VC: vinylene carbonate
<Additives>
FEC: 4-fluoro-1,3-dioxolan-2-one
TTFEB: tris(2,2,2-trifluoroethyl)borate

TABLE 38

| | Composition of nonaqueous electrolyte solution | | | | | | | | |
|---|---|---|---|---|---|---|---|---|---|
| | Composition of nonaqueous solvent (% by volume) | | | | Li salt (molar amount per 1 L of nonaqueous solvent) | | Additives | | |
| | | | | | | | | Amount (% by weight) | Amount (% by weight) |
| | AcN | DEC | EC | VC | LiPF$_6$ | LiN(SO$_2$F)$_2$ | Type | Type | |
| Example 5-5 | 49 | 28 | 21 | 2 | 0.3 | 1.0 | FEC | 5 | TTFEB | 0.2 |
| Comparative Example 5-2 | 49 | 28 | 21 | 2 | 0.3 | 1.0 | — | 0 | — | 0 |

TABLE 39

| | Evaluation results of secondary battery | |
|---|---|---|
| | Output test 4 C/0.2 C capacity retention rate | Cycle test at 25° C. Capacity retention rate at 100th cycle |
| Example 5-5 | A | B |
| Comparative Example 5-2 | A | C |

INDUSTRIAL APPLICABILITY

The nonaqueous secondary battery of the present invention is expected to be used as, for example, batteries for mobile devices such as a mobile phone, a mobile audio device, a personal computer and an integrated circuit (IC) tag; automotive batteries for a hybrid car, a plug-in hybrid car, an electric car, etc.; low-voltage power sources such as 12V, 24V and 48V class power sources; and residential power storage systems, IoT devices, etc., although there is no particular limitation. The nonaqueous secondary battery prepared of the present invention can also be applied to cold weather applications and outdoor applications in the summer.

REFERENCE SIGNS LIST

100: Nonaqueous secondary battery
110: Battery outer package
120: Space of battery outer package
130: Positive electrode lead body
140: Negative electrode lead body
150: Positive electrode
160: Negative electrode
170: Separator

The invention claimed is:

1. A nonaqueous secondary battery comprising:

a positive electrode containing one or more positive electrode active materials capable of occluding and releasing lithium ions;

a negative electrode containing a negative electrode active material which is at least one selected from the group consisting of a carbon material capable of occluding and releasing lithium ions, and a Si material-containing carbon material; and a nonaqueous electrolyte solution; wherein a surface of the negative electrode is coated with at least one compound selected from the group consisting of compounds represented by the following general formula (1):

[Chemical Formula 1]

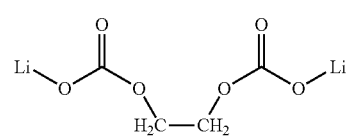

(1)

the following general formula (2):

[Chemical Formula 2]

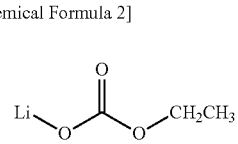

(2)

and the following general formula (3):

[Chemical Formula 3]

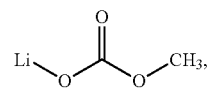

(3)

wherein a content of at least one compound selected from the group consisting of the compounds represented by the general formulas (1) to (3) is 0.1 to 10 mg as an amount per 1 g of the negative electrode active material, wherein a sum of contents of the compounds represented by the general formulas (2) and (3) is 0.01 to 2.5 mg as an amount per 1 g of the negative electrode active material, wherein the nonaqueous electrolyte solution contains acetonitrile, and wherein a content of acetonitrile is 5% by volume or more and 95% by volume or less as an amount per total amount of the nonaqueous electrolyte solution.

2. The nonaqueous secondary battery according to claim 1, wherein the nonaqueous electrolyte solution contains a fluorine-containing lithium salt.

3. The nonaqueous secondary battery according to claim 2, wherein the nonaqueous electrolyte solution contains an imide salt represented by $LiN(SO_2C_mF_{2m+1})_2$ wherein m is an integer of 0 to 8.

4. The nonaqueous secondary battery according to claim 2, wherein the negative electrode contains $PF_6$ anions.

5. The nonaqueous secondary battery according to claim 3, wherein the negative electrode contains $N(SO_2F)_2$ anions and/or $N(SO_2CF_3)_2$ anions.

6. The nonaqueous secondary battery according to claim 3, wherein the negative electrode contains a decomposition product of a cyclic acid anhydride, and the decomposition product of the cyclic acid anhydride contains at least one compound selected from the group consisting of compounds represented by the following general formula (4):

[Chemical Formula 4]

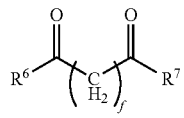

(4)

wherein $R^6$ and $R^7$ represent an alkoxy group which may be substituted with a halogen atom, an OH group or an OLi group, and f is an integer of 1 to 3;

the following general formula (5):

[Chemical Formula 5]

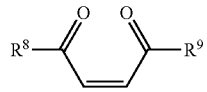

(5)

wherein $R^1$ and $R^9$ represent an alkoxy group which may be substituted with a halogen atom, an OH group or an OLi group;

the following general formula (6):

[Chemical Formula 6]

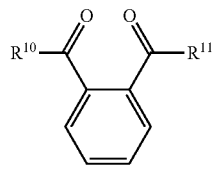

(6)

wherein $R^{10}$ and $R^{11}$ represent an alkoxy group which may be substituted with a halogen atom, an OH group or an OLi group;

the following general formula (7):

[Chemical Formula 7]

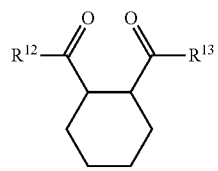

(7)

wherein $R^{12}$ and $R^{13}$ represent an alkoxy group which may be substituted with a halogen atom, an OH group or an OLi group;

the following general formula (8):

[Chemical Formula 8]

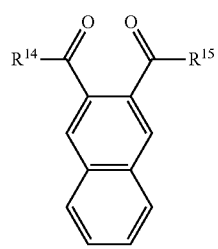

(8)

wherein $R^{14}$ and $R^{15}$ represent an alkoxy group which may be substituted with a halogen atom, an OH group or an OLi group; and the following general formula (9):

[Chemical Formula 9]

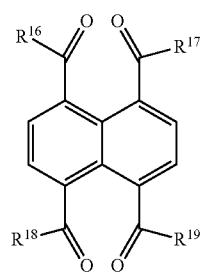

(9)

wherein $R^{16}$ to $R^{19}$ represent an alkoxy group which may be substituted with a halogen atom, an OH group or an OLi group.

7. The nonaqueous secondary battery according to claim 6, wherein the cyclic acid anhydride contains at least one selected from the group consisting of malonic anhydride, succinic anhydride, glutaric anhydride, maleic anhydride, phthalic anhydride, 1,2-cyclohexanedicarboxylic anhydride, 2,3-naphthalenedicarboxylic anhydride and naphthalene-1,4,5,8-tetracarboxylic dianhydride.

8. The nonaqueous secondary battery according to claim 1, wherein the nonaqueous electrolyte solution contains a nonaqueous solvent, and the nonaqueous solvent contains a cyclic carbonate, and the cyclic carbonate contains vinylene carbonate and/or fluoroethylene carbonate.

9. The nonaqueous secondary battery according to claim 1, wherein the negative electrode active material contains:

at least one element capable of forming an alloy with lithium; and/or silicon.

10. The nonaqueous secondary battery according to claim 1, wherein the nonaqueous electrolyte solution has an ionic conductivity at 20° C. of 15 mS/cm or more.

11. The nonaqueous secondary battery according to claim 1, wherein a separator used in the nonaqueous secondary battery has a thickness of 3 μm or more and 25 μm or less; a porosity of 40% or more and 70% or less; and/or an air permeability of 100 s/100 cm$^3$ or more and 350 s/100 cm$^3$ or less.

12. The nonaqueous secondary battery according to claim 1, wherein the nonaqueous electrolyte solution contains at least one nitric acid compound selected from the group consisting of a nitrate and a nitric acid ester.

13. The nonaqueous secondary battery according to claim 1, wherein the nonaqueous electrolyte solution contains at least one additive selected from the group consisting of:

a polymer compound including a repeating unit represented by any one of the following general formula (P1):

[Chemical Formula 10]

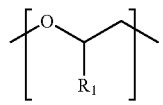

(P1)

wherein $R_1$ is a hydrogen atom or an alkyl group;

the following general formula (P2):

[Chemical Formula 11]

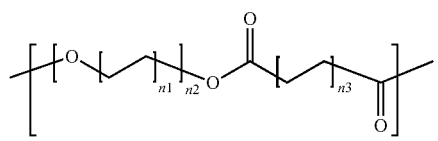

(P2)

wherein n1 to n3 are the number of repeating units and each independently represent an integer of 0 to 4;

the following general formula (P3):

[Chemical Formula 12]

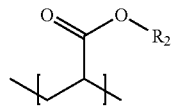

(P3)

wherein $R_2$ is an alkyl group having 1 to 20 carbon atoms or a fluoroalkyl group having 1 to 20 carbon atoms; and the following general formula (P4):

[Chemical Formula 13]

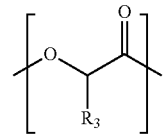

(P4)

wherein $R_3$ is a hydrogen atom or an alkyl group having 1 to 20 carbon atoms; and a carboxylic acid ester compound.

14. The nonaqueous secondary battery according to claim 1, wherein the nonaqueous electrolyte solution contains at least one additive selected from the group consisting of an organometal hydride and a dicarbonate compound.

15. The nonaqueous secondary battery according to claim 1, wherein the nonaqueous electrolyte solution contains a silyl group-containing additive.

16. The nonaqueous secondary battery according to claim 1, wherein the nonaqueous electrolyte solution contains a boron atom-containing additive.

17. The nonaqueous secondary battery according to claim 3, wherein the nonaqueous electrolyte solution contains a nonaqueous solvent, the nonaqueous solvent contains a cyclic carbonate, and the cyclic carbonate contains vinylene carbonate and/or fluoroethylene carbonate, and the nonaqueous electrolyte solution contains:

at least one nitric acid compound selected from the group consisting of a nitrate and a nitric acid ester, at least one additive selected from the group consisting of:

a polymer compound including a repeating unit represented by any one of the following general formula (P1):

[Chemical Formula 10]

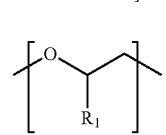

(P1)

wherein $R_1$ is a hydrogen atom or an alkyl group;

the following general formula (P2):

[Chemical Formula 11]

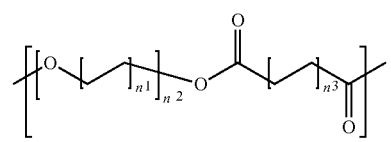

(P2)

wherein n1 to n3 are the number of repeating units and each independently represent an integer of 0 to 4;

the following general formula (P3):

[Chemical Formula 12]

(P3)

wherein $R_2$ is an alkyl group having 1 to 20 carbon atoms or a fluoroalkyl group having 1 to 20 carbon atoms; and
the following general formula (P4):

[Chemical Formula 13]

(P4)

wherein $R_3$ is a hydrogen atom or an alkyl group having 1 to 20 carbon atoms; and
   a carboxylic acid ester compound,
   at least one additive selected from the group consisting of an organometal hydride and a dicarbonate compound,
   a silyl group-containing additive, or
   a boron atom-containing additive.

* * * * *